United States Patent
Usui

(10) Patent No.: US 8,007,066 B2
(45) Date of Patent: Aug. 30, 2011

(54) PRINTING APPARATUS, PRINTING METHOD AND METHOD OF MANUFACTURING PRINTING APPARATUS

(75) Inventor: Toshiki Usui, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1225 days.

(21) Appl. No.: 11/709,033

(22) Filed: Feb. 22, 2007

(65) Prior Publication Data
US 2008/0049277 A1 Feb. 28, 2008

(30) Foreign Application Priority Data
Feb. 23, 2006 (JP) .................................. 2006-047252

(51) Int. Cl.
*B41J 2/01* (2006.01)
(52) U.S. Cl. .............................. 347/12; 347/13; 347/19
(58) Field of Classification Search .................. 347/5, 9, 347/12, 13, 19
See application file for complete search history.

(56) References Cited

U.S. PATENT DOCUMENTS

| 6,601,940 B2 * | 8/2003 | Akama et al. ................... 347/19 |
| 2002/0021316 A1 * | 2/2002 | Nakayama ....................... 347/12 |

FOREIGN PATENT DOCUMENTS

| JP | 9-11457 A | 1/1997 |
| JP | 2001-162901 A | 6/2001 |
| JP | 2002-283556 A | 10/2002 |

* cited by examiner

*Primary Examiner* — Lam S Nguyen

(57) ABSTRACT

A printing apparatus of this invention includes: an output section that has a predetermined number of output terminals, and that outputs pixel data from each of the output terminals respectively; a cable that has the predetermined number of transmission lines for transmitting the pixel data that are outputted from the predetermined number of the output terminals respectively; a head that can eject a plurality of colors of inks, and that has nozzle groups for the respective colors of the inks; and a plurality of head controllers that cause the ink to be ejected from the nozzle groups based on the pixel data, a plurality of the head controllers each being provided corresponding to each of the colors of the inks. Wherein the number of the output terminals is larger than the number of the colors of the inks, and at least one of the head controllers causes the ink to be ejected from the nozzle group of a corresponding color, based on the pixel data transmitted via two or more of the transmission lines.

7 Claims, 30 Drawing Sheets

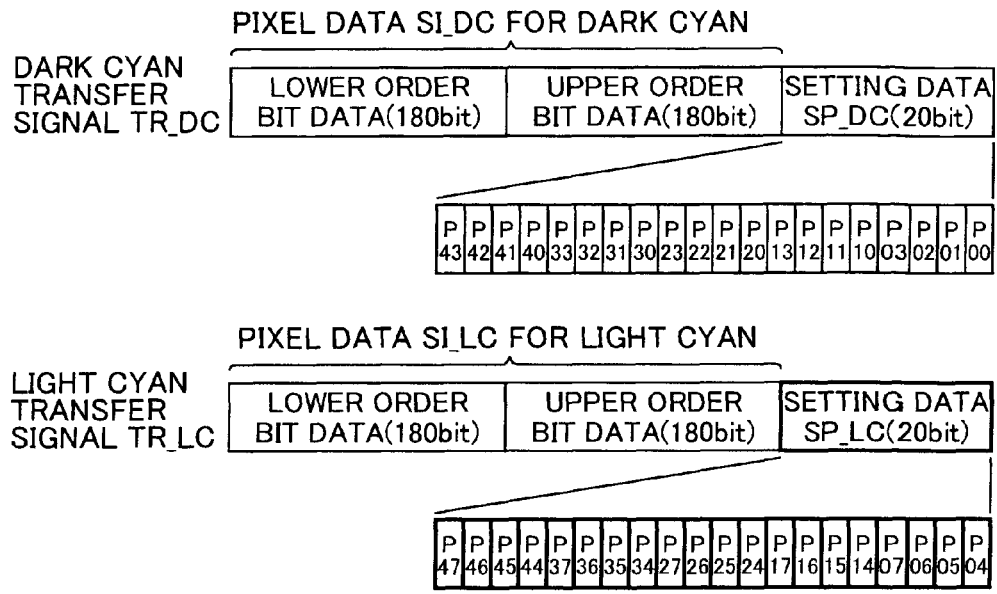
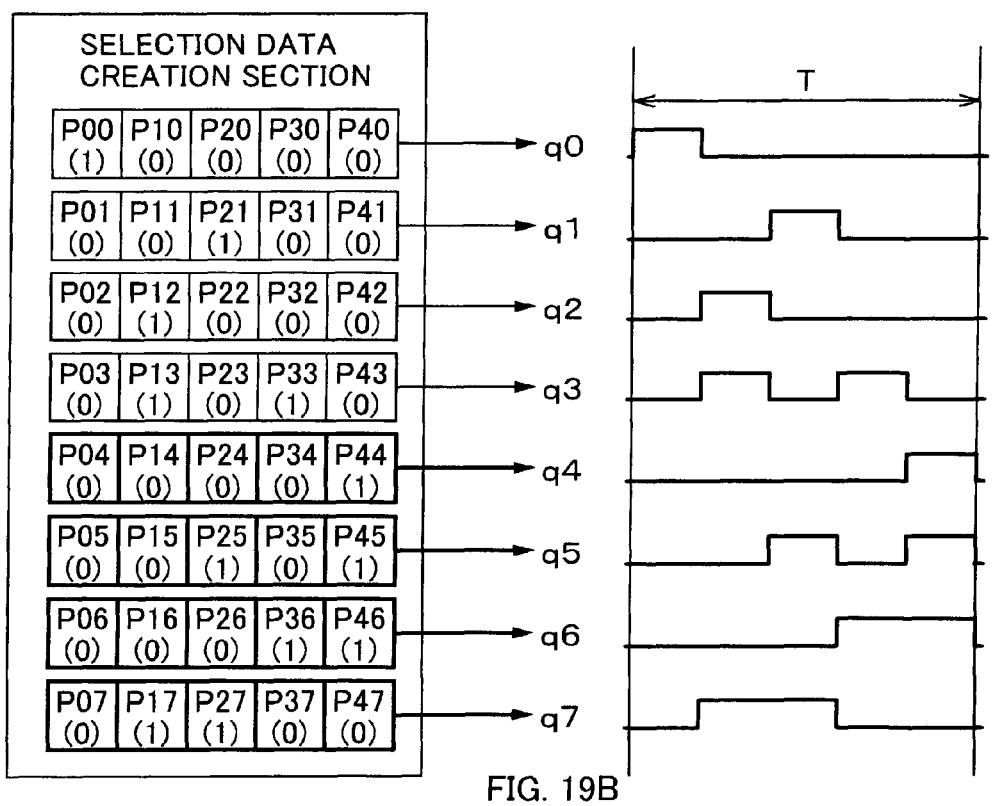
FIG. 19A
FIG. 19B

| TONE | INK DROPLET | BEFORE DECODING | | | AFTER DECODING |
|---|---|---|---|---|---|
| | | LIGHT | DARK | | |
| 0 | (MINUTE VIBRATION) | 00 | 00 | → | 000 |
| 1 | (1.5pl) | 01 | 00 | → | 100 |
| 2 | (3pl) | 10 | 00 | → | 001 |
| 3 | (4.5pl) | 11 | 00 | → | 101 |
| 4 | (7pl) | 00 | 01 | → | 010 |
| 5 | (8.5pl) | 01 | 01 | → | 110 |
| 6 | (10pl) | 10 | 01 | → | 111 |
| 7 | (14pl) | 11 | 01 | → | 011 |

FIG. 21

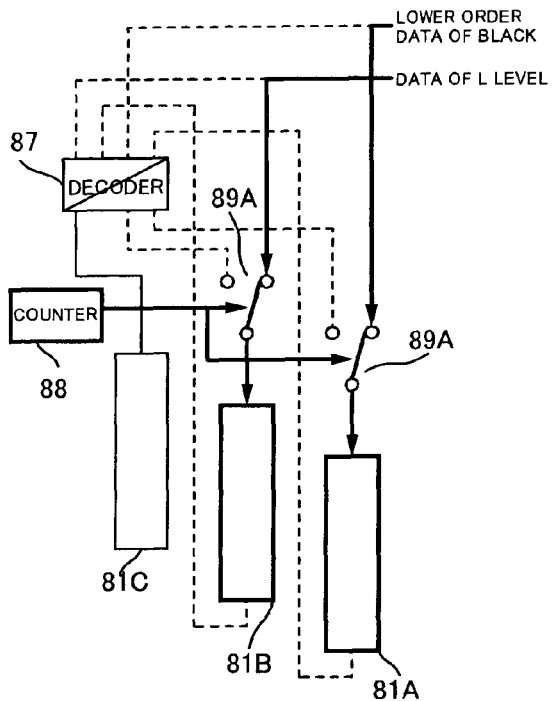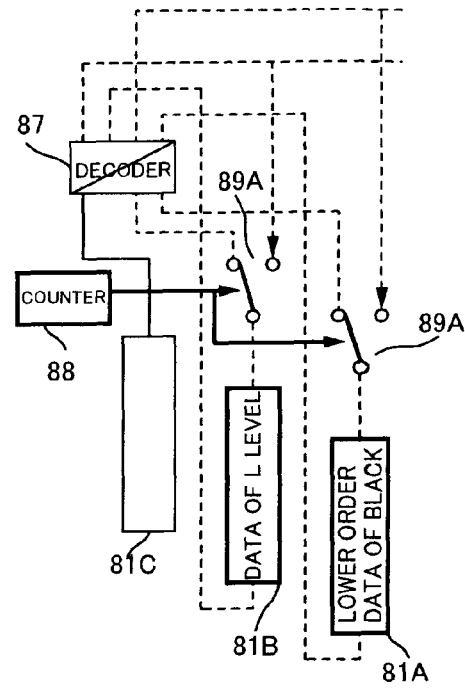
FIG. 24A  FIG. 24B
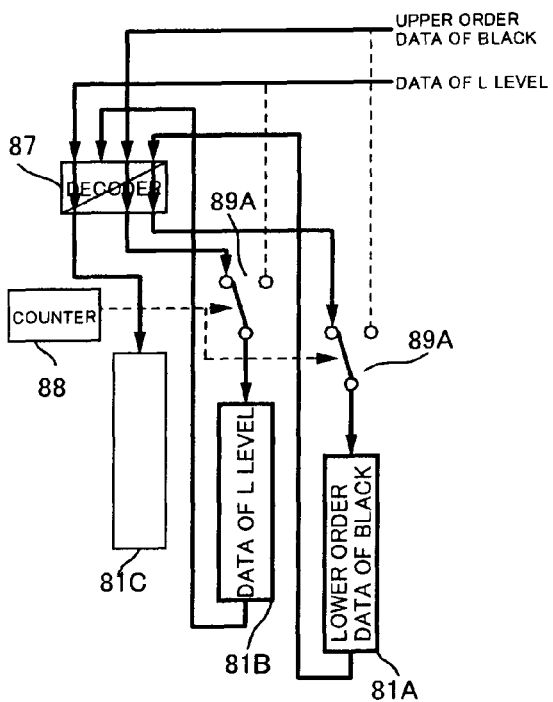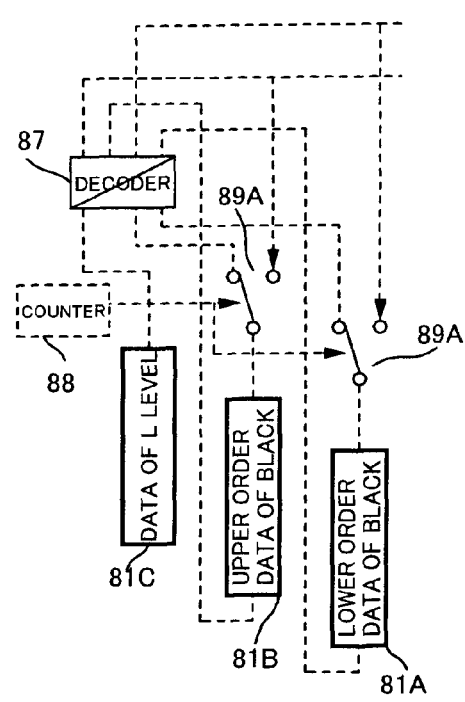
FIG. 24C  FIG. 24D

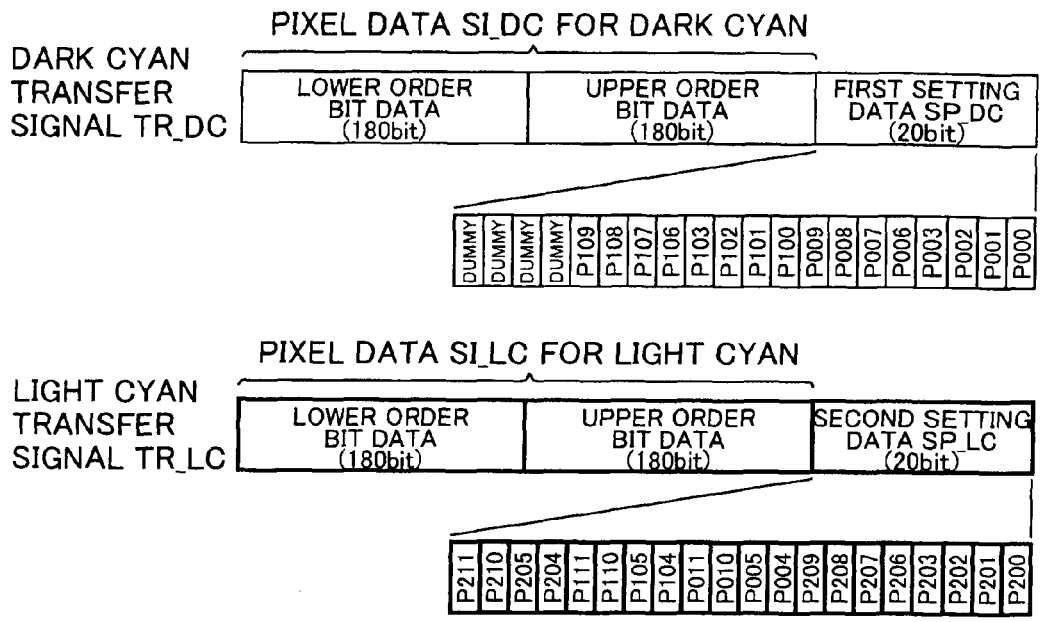
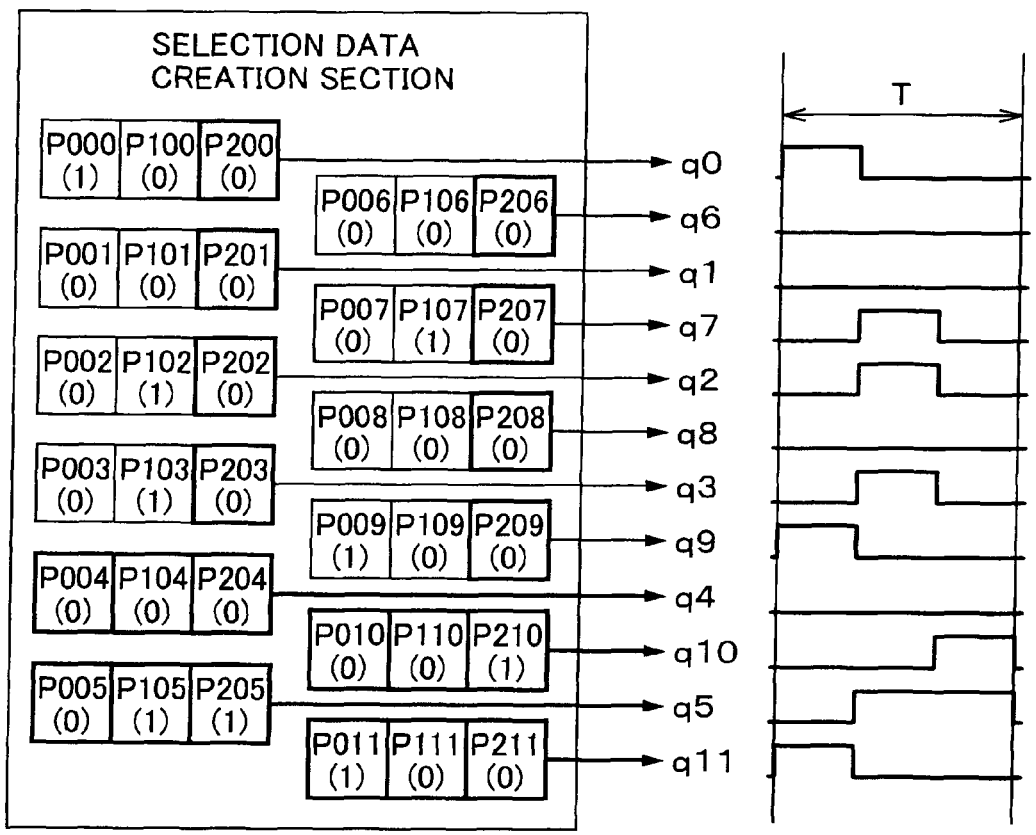
FIG. 27A
FIG. 27B

| TONE | INK DROPLET | BEFORE DECODING | | AFTER DECODING |
|---|---|---|---|---|
| | | LIGHT | DARK | |
| 0 | (MINUTE VIBRATION) | 00 | 00 | → 000 |
| 1 | (1.5pl) | 01 | 00 | → 100 |
| 2 | (3pl) | 10 | 00 | → 001 |
| 3 | (7pl) | 11 | 00 | → 010 |
| 4 | (14pl) | 00 | 01 | → 011 |
| 5 | (21pl) | 01 | 01 | → 101 |

FIG. 28

| 3-BIT DATA | FIRST SWITCH SIGNAL SW_A | SECOND SWITCH SIGNAL SW_B |
|---|---|---|
| 000 | q0 | q6 |
| 001 | q1 | q7 |
| 010 | q2 | q8 |
| 011 | q3 | q9 |
| 100 | q4 | q10 |
| 101 | q5 | q11 |

FIG. 29

PRINTING APPARATUS, PRINTING METHOD AND METHOD OF MANUFACTURING PRINTING APPARATUS

CROSS-REFERENCE TO RELATED APPLICATIONS

The present application claims priority upon Japanese Patent Application No. 2006-047252 filed on Feb. 23, 2006, which is herein incorporated by reference.

FIELD OF THE INVENTION

The present invention relates to printing apparatuses, printing methods and methods of manufacturing a printing apparatus.

DESCRIPTION OF THE RELATED ART

Inkjet printers are known as printing apparatuses that eject droplets of liquid. The inkjet printer forms dots on a paper by ejecting ink droplets from each nozzle, thereby printing a print image that is made of many dots on the paper.

In a head unit that ejects ink droplets, a drive element such as a piezo element or a heater is provided for each nozzle in order to make an ink droplet be ejected from the nozzle. The head unit is also provided with a head controller that controls the driving of each drive element (see JP-A-9-11457).

By the way, in order to make the head unit eject ink, pixel data is transmitted from the printing apparatus main body side to the head unit. When a plurality of colors of ink are to be ejected from the head, the pixel data of the number of the colors of ink are to be transmitted from the printing apparatus main body side to the head unit.

Here, for example, if pixel data of six colors are transmitted using six transmission lines in a six-color printer, and if pixel data of four colors are transmitted using four transmission lines in a four-color printer, the configuration of the printing apparatus main body side needs to be changed according to the printer, and the printers cannot share common parts.

SUMMARY OF THE INVENTION

It is an object of the invention to configure printing apparatuses so that the parts can be made common.

An aspect of the invention for achieving the foregoing object includes: an output section that has a predetermined number of output terminals, and that outputs pixel data from each of the output terminals respectively; a cable that has the predetermined number of transmission lines for transmitting the pixel data that are outputted from the predetermined number of the output terminals respectively; a head that can eject a plurality of colors of inks, and that has nozzle groups for the respective colors of the inks; and a plurality of head controllers that cause the ink to be ejected from the nozzle groups based on the pixel data, a plurality of the head controllers each being provided corresponding to each of the colors of the inks, wherein the number of the output terminals is larger than the number of the colors of the inks, and at least one of the head controllers causes the ink to be ejected from the nozzle group of a corresponding color, based on the pixel data transmitted via two or more of the transmission lines.

Features and objects of the present invention other than the above will become clear by reading the description of the present specification with reference to the accompanying drawings.

BRIEF DESCRIPTION OF THE DRAWINGS

FIG. 19A is an explanatory diagram of a dark cyan transfer signal TR_DC input to a first input section 846A and a light cyan transfer signal TR_LC input to a second input section 846B. FIG. 19B is an explanatory diagram of the function of the selection signal creation section 844.

FIG. 21 is an explanation diagram of decoding by a decoder 87 in the first embodiment.

FIG. 24A to FIG. 24D are diagrams describing the state in which black data are set to the first shift registers 81A through the third shift registers 81C.

FIG. 27A is an explanatory diagram of the dark cyan transfer signal TR_DC input to the first input section 846A and the light cyan transfer signal TR_LC input to the second input section 846B. FIG. 27B is an explanatory diagram of the function of the selection signal creation section 844.

FIG. 28 is an explanation diagram of decoding by the decoder 87 of the second embodiment.

FIG. 29 is a table of the relationship between the decoded 3-bit data and the selection signal that should be selected by the signal selection section.

DESCRIPTION OF EXEMPLARY EMBODIMENTS

Figure 1:
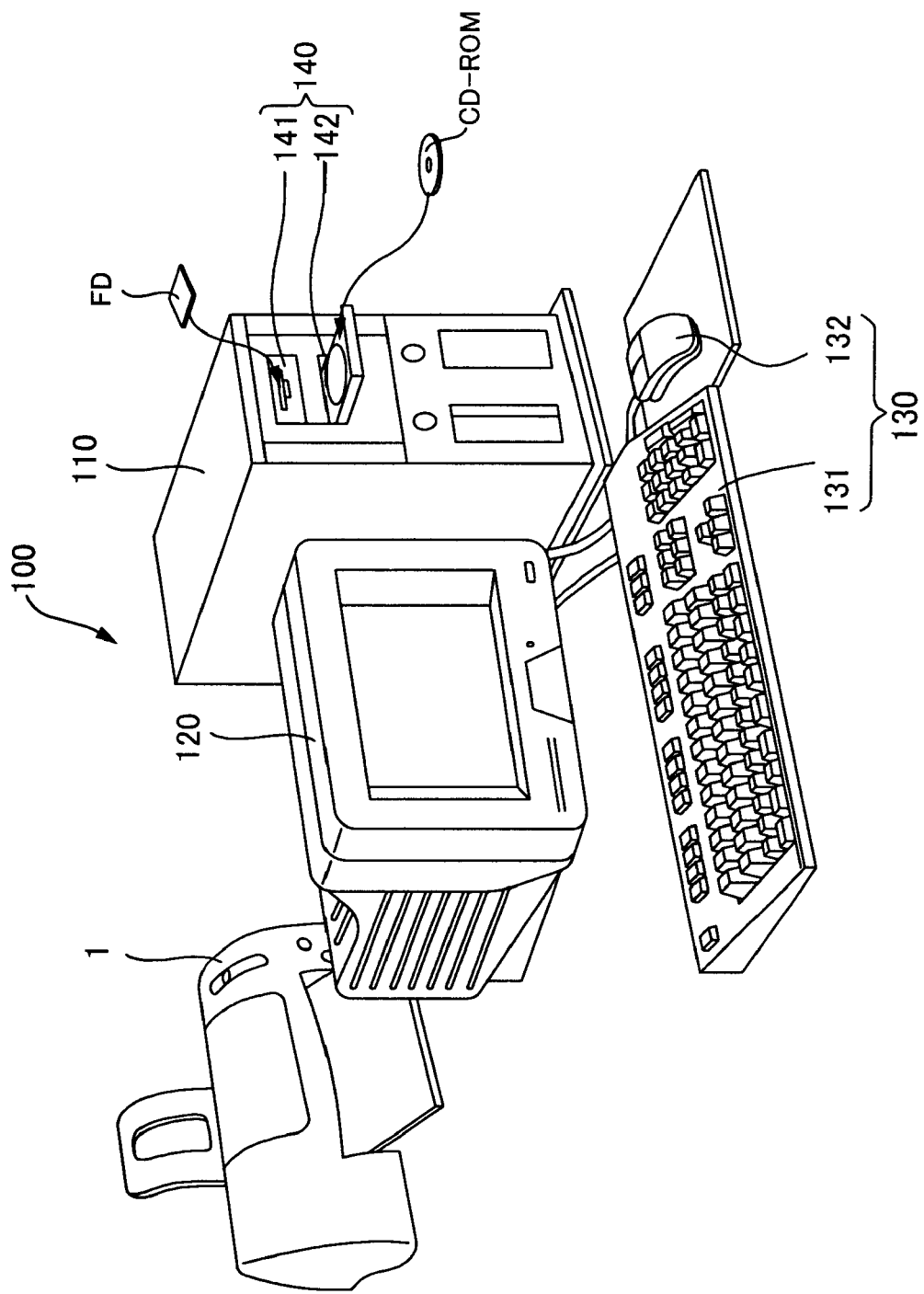
FIG. 1 is a diagram that explains the configuration of a printing system 100.

At least the following matters will become clear through the description of the present specification and the accompanying drawings.

A printing apparatus including an output section that has a predetermined number of output terminals, and that outputs pixel data from each of the output terminals respectively;

a cable that has the predetermined number of transmission lines for transmitting the pixel data that are outputted from the predetermined number of the output terminals respectively;

a head that can eject a plurality of colors of inks, and that has nozzle groups for the respective colors of the inks; and a plurality of head controllers that cause the ink to be ejected from the nozzle groups based on the pixel data, a plurality of the head controllers each being provided corresponding to each of the colors of the inks, wherein the number of the output terminals is larger than the number of the colors of the inks, and at least one of the head controllers causes the ink to be ejected from the nozzle group of a corresponding color, based on the pixel data transmitted via two or more of the transmission lines.

According to such a printing apparatus, parts can be made common.

A printing apparatus is preferable, wherein each head controller is provided with a first input section and a second input section respectively, wherein the first input section and the second input section of the head controller that corresponds to a certain color are inputted with the pixel data transmitted by the transmission line respectively, and wherein, of the head controller that corresponds to another color, the first input section is inputted with the pixel data transmitted by the transmission line, and the second input section is inputted with a signal of a constant potential.

According to such a printing apparatus, the structure of the head controller can be made common.

A printing apparatus is preferable, wherein the head controller has a selection signal creation section that creates a plurality of selection signals, a signal selection section that selects the selection signal corresponding to the pixel data, from a plurality of the selection signals, and a switch that applies a drive signal to a drive element according to the selection signal selected by the signal selection section, wherein the signal selection section of the head controller, which is inputted with the signal of the constant potential to the second input section, selects the selection signal from a part of the selection signals of a plurality of the selection signals.

Thus, the head controller, which is inputted with the signal of the constant potential to the second input section, can perform printing in a low tone number.

A printing apparatus is preferable, wherein the head controller corresponding to a certain color forms a dot in each pixel with a first tone number, and wherein the head controller corresponding to another color forms a dot in each pixel with a second tone number that is lower than the first tone number.

Thus, only the color which is needed to be in high tones is printed in a high tone.

A printing apparatus is preferable, wherein the head controller has a decoder that decodes the pixel data, and wherein the pixel data includes a first data and a second data, wherein the head controller includes a pixel data storage section, wherein the output section outputs, from the output terminal, the second data, after the first data has been outputted, wherein the head controller stores the first data in the pixel data storage section when the first data are inputted, inputs the second data to the decoder when the second data are inputted, and inputs the first data that are stored in the pixel data storage section to the decoder, and stores in the pixel data storage section at least a part of the data after decoding that are outputted from the decoder.

Thus, it becomes possible to decrease the data amount which can be stored in the pixel data storage section.

A printing apparatus is preferable, wherein the output section outputs pixel data for a dark color from the output terminal, and outputs pixel data for a light color from another output terminal, and wherein based on the pixel data for the dark color and the pixel data for the light color, ejects inks of colors relating to the pixel data for the dark color and the pixel data for the light color.

Since it is considered that the colors relating to the pixel data for dark color and the pixel data for light color are colors with which printing with a high tone number are preferred, by increasing the data amount of the pixel data corresponding to these colors, the tone of the colors can be shown with a high tone number.

A printing method of a printing apparatus including an output section that has a predetermined number of output terminals, and that outputs pixel data from each of the output terminals respectively, a cable that has the predetermined number of transmission lines for transmitting the pixel data that are outputted from the predetermined number of the output terminals respectively, a head that can eject a plurality of colors of inks, and that has nozzle groups for the respective colors of the inks, and a plurality of head controllers that cause the ink to be ejected from the nozzle groups based on the pixel data, a plurality of the head controllers each being provided corresponding to each of the colors of the inks, wherein the printing method includes, in the case of manufacturing a printing apparatus with the number of the output terminals that is the same as the number of the colors of the inks, each of the head controllers causes the ink to be ejected from the nozzle group of a corresponding color, based on the pixel data transmitted by one transmission line, and in the case of manufacturing a printing apparatus with the number of the output terminals that is larger than the number of colors of the inks, at least one of the head controllers causes the ink to be ejected from the nozzle group of a corresponding color, based on the pixel data transmitted via two or more of the transmission lines.

According to such printing method, parts can be made common, and thus cut down on cost of the printer becomes possible.

A method of manufacturing a printing apparatus including an output section that has a predetermined number of output terminals, and that outputs pixel data from each of the output terminals respectively, a cable that has the predetermined number of transmission lines for transmitting the pixel data that are outputted from the predetermined number of the output terminals respectively, a head that can eject a plurality of colors of inks, and that has nozzle groups for the respective colors of the inks, and a plurality of head controllers that cause the ink to be ejected from the nozzle groups based on the pixel data, a plurality of the head controllers each being provided corresponding to each of the colors of the inks, wherein the method of manufacturing a printing apparatus includes, in the case of manufacturing a printing apparatus with the number of the output terminals that is the same as the number of the colors of the inks, each of the head controllers causes the ink to be ejected from the nozzle group of a corresponding color, based on the pixel data transmitted by one transmission line, and in the case of manufacturing a printing apparatus with the number of the output terminals that is larger than the number of colors of the inks, at least one of the head controllers causes the ink to be ejected from the nozzle group of a corresponding color, based on the pixel data transmitted via two or more of the transmission lines.

According to such method of manufacturing a printing apparatus, parts can be made common, and thus cut down on cost of the printer becomes possible.

Configuration of the Printing System

Regarding the Overall Configuration

FIG. 1 is a diagram that explains the configuration of a printing system 100. The printing system 100 of this example includes a printer 1 as a printing apparatus and a computer 110 as a print control apparatus. Specifically, the printing system 100 has the printer 1, the computer 110, a display device 120, an input device 130, and a recording and reproducing device 140.

The printer 1 prints images on media such as paper, cloth, and film. The computer 110 is communicably connected to the printer 1. To print images with the printer 1, the computer 110 outputs print data that correspond to the image to the printer 1. Computer programs such as an application program and a printer driver are installed on the computer 110. The display device 120 has a display. The display device 120 is a device for displaying a user interface of the computer programs, for example. The input device 130 is, for example, a keyboard 131 and a mouse 132. The recording and reproducing device 140 is, for example, a flexible disk drive device 141 and a CD-ROM drive device 142.

Computer

Figure 2:
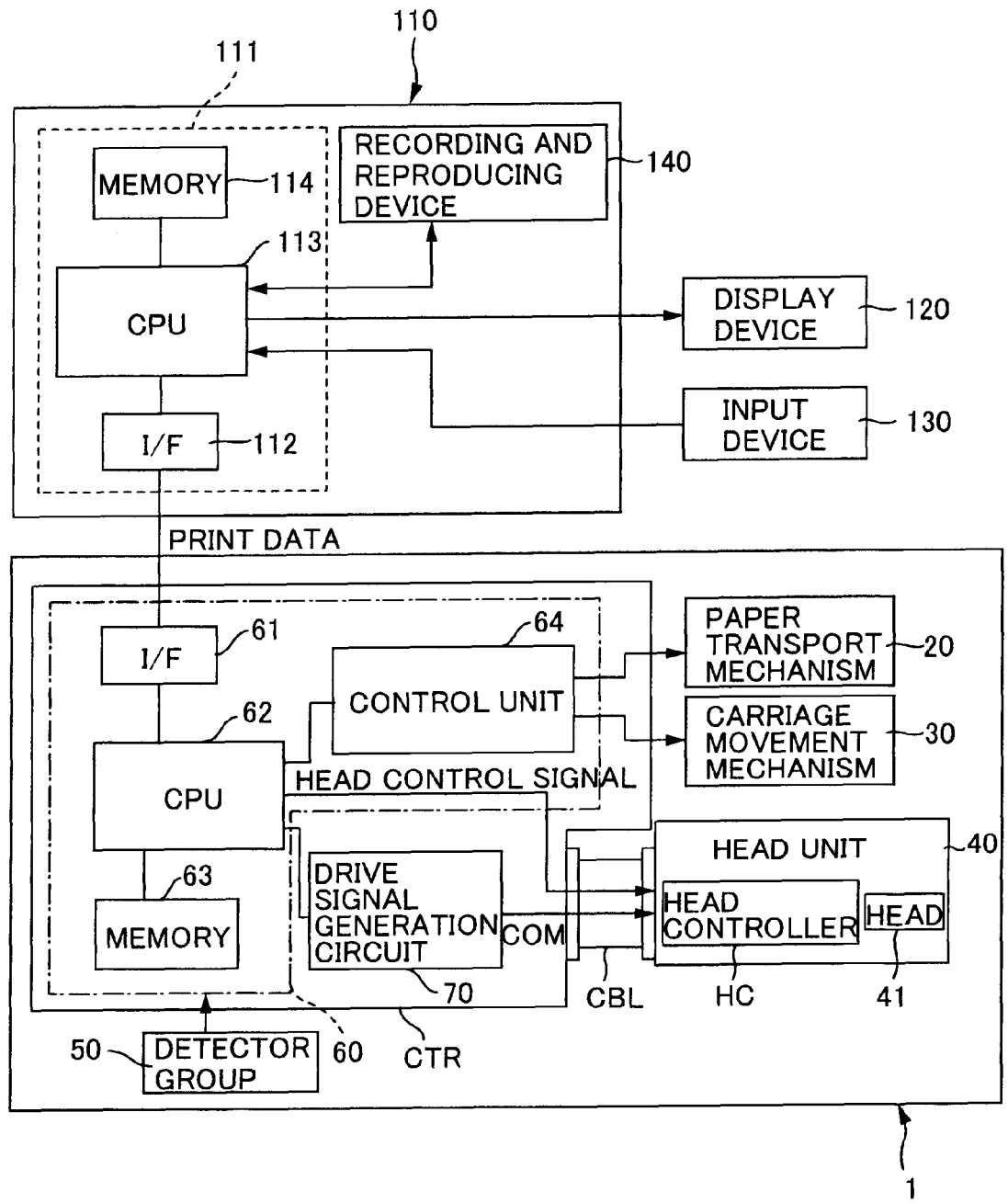
FIG. 2 is a block diagram that explains the configuration of a computer 110 and a printer 1.

FIG. 2 is a block diagram for explaining the configuration of the computer 110 and the printer 1. First, the configuration of the computer 110 is described in brief. The computer 110 has the recording and reproducing device 140 described above and a host-side controller 111. The recording and reproducing device 140 is communicably connected to the host-side controller 111, and for example is attached to the housing of the computer 110. The host-side controller 111 performs various controls in the computer 110, and is also communicably connected to the display device 120 and the input device 130 mentioned above. The host-side controller 111 has an interface section 112, a CPU 113, and a memory 114. The interface section 112 is interposed between the computer 110 and the printer 1, and sends and receives data between the two. The CPU 113 is a computation processing device for performing overall control of the computer 110. The memory 114 is for securing a working region and a region for storing computer programs used by the CPU 113, and is constituted by a RAM, EEPROM, ROM, or magnetic disk device, for example. Examples of computer programs that are stored on the memory 114 include the application program and the printer driver mentioned above. The CPU 113 performs various controls in accordance with the computer programs stored on the memory 114.

The printer driver causes the computer 110 to convert the image data into print data and send these print data to the printer 1. The print data are data in a form that can be understood by the printer 1, and include various command data and pixel data. Command data are data for ordering the printer 1 to execute a specific operation. Examples of the command data include command data for directing the feeding of paper, command data for indicating the carry amount, and command data for directing the discharge of paper. The pixel data are data relating to the pixels of the image to be printed.

Here, a pixel refers to a unit pixel that is part of an image, and images are formed by arranging pixels in rows in two dimensions. The pixel data of the print data are data relating to the dots that are formed on the paper S (for example, they are tone values).

In this embodiment, the pixel data are 2 bits of data per pixel, for example. 2-bit pixel data can express a single pixel in four tones.

Printer

Regarding the Configuration of the Printer 1

Figure 3:
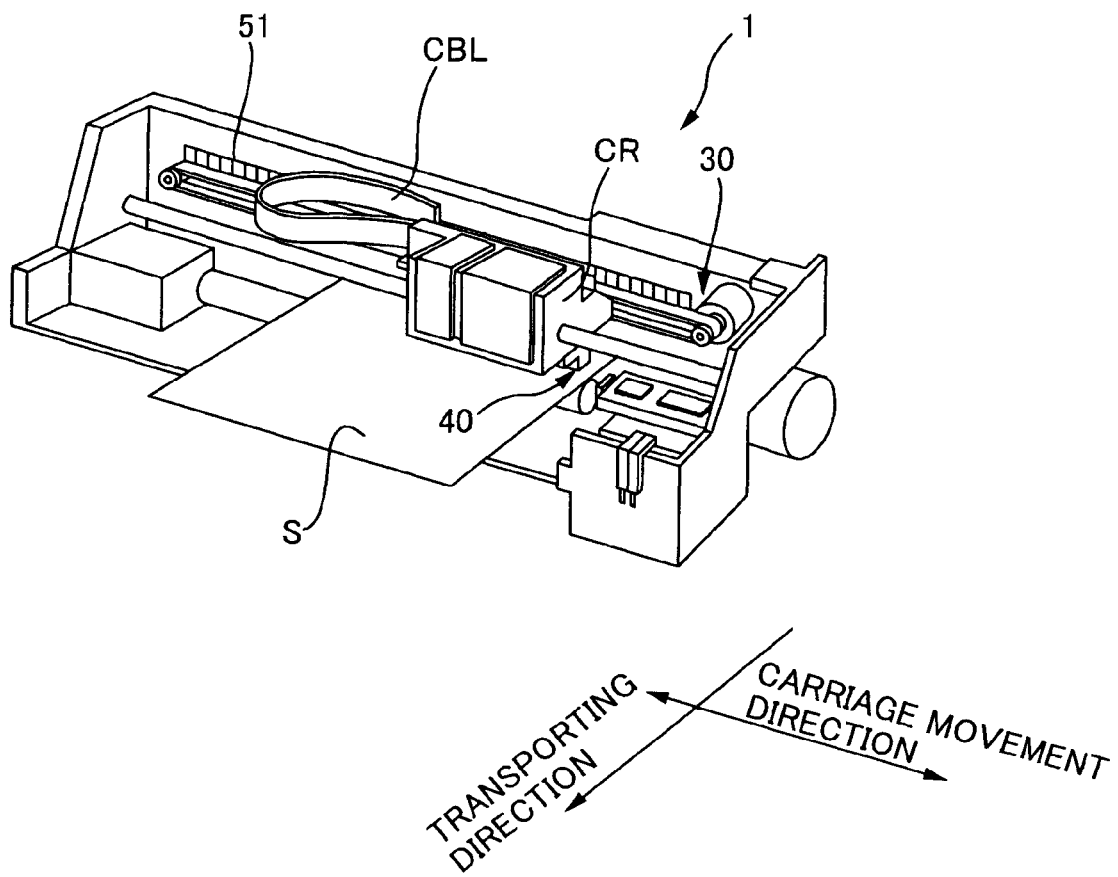
FIG. 3 is a diagram showing the configuration of the printer 1 of the present embodiment.

FIG. 3 is a diagram showing the configuration of the printer 1 of the present embodiment. It should be noted that in the following description, reference is also made to FIG. 2.

The printer 1 has a paper transport mechanism 20, a carriage movement mechanism 30, a head unit 40, a detector group 50, a printer-side controller 60, and a drive signal generation circuit 70. In the present embodiment, the printer-side controller 60 and the drive signal generation circuit 70 are provided on a common controller board CTR. Moreover, the head unit 40 has a head controller HC and a head 41.

In the printer 1, the printer-side controller 60 controls the sections to be controlled, i.e., the paper transport mechanism 20, the carriage movement mechanism 30, the head unit 40 (head controller HC, head 41), and the drive signal generation circuit 70. Thus, based on the print data received from the computer 110, the printer-side controller 60 causes the image to be printed on the paper S. Moreover, the detectors in the detector group 50 monitor the conditions in the printer 1. The detectors output the detection results to the printer-side controller 60. The printer-side controller 60 receives the detection results from the detectors, and controls the sections to be controlled based on the detection results.

The paper transport mechanism 20 is for carrying media in the carrying direction. The paper transport mechanism 20 feeds the paper S up to a printable position, and also carries the paper S in a carrying direction by a predetermined carry amount. The carrying direction is a direction that intersects the carriage movement direction.

The carriage movement mechanism 30 is for moving a carriage CR to which the head unit 40 is attached in the carriage movement direction. The carriage movement direction includes a movement direction from one side to the other side and a movement direction from the other side to the one side. It should be noted that since the head unit 40 has the head 41, the carriage movement direction corresponds to the movement direction of the head 41, and the carriage movement mechanism 30 moves the head 41 in the movement direction.

The head unit 40 is for ejecting ink toward the paper S. The head unit 40 is attached to the carriage CR. The head 41 of the head unit 40 is provided on the lower surface of a head case. Moreover, the head controller HC of the head unit 40 is provided inside the head case. The head controller HC is described in greater detail later.

The detector group 50 is for monitoring the conditions in the printer 1. The detector group 50 includes, among others, a linear encoder 51 for detecting the position of the carriage CR in the movement direction. Additionally, the detector group 50 also includes a sensor for detecting the carry amount of the paper (such as an encoder that detects the amount of rotation of the carry roller for carrying the paper).

The printer-side controller 60 performs control of the printer 1. The printer-side controller 60 has an interface section 61, a CPU 62, a memory 63, and a control unit 64. The interface section 61 exchanges data with the computer 110, which is an external apparatus. The CPU 62 is a computer processing unit for performing overall control of the printer 1. The memory 63 is for reserving an area for storing programs for the CPU 62 and a working area, for example, and is constituted by a storage element such as a RAM, an EEPROM, or a ROM. The CPU 62 controls the sections to be controlled according to the computer programs stored on the memory 63. For example, the CPU 62 controls the paper transport mechanism 20 and the carriage movement mechanism 30 via the control unit 64. Moreover, the CPU 62 outputs head control signals for controlling the operation of the head 41 to the head controller HC and outputs a generation signal for generating a drive signal COM to the drive signal generation circuit 70. When printing, the printer-side controller 60 alternately repeats a dot formation operation of ejecting ink from the head 41 while moving the carriage CR so as to form dots on a paper, and a carrying operation of causing the paper transport mechanism 20 to carry the paper, thereby printing an image on the paper.

The drive signal generation circuit 70 generates drive signals COM. The drive signal generation circuit 70, depending on the embodiments described later, generates one type of drive signal COM or generates two types of drive signals COM (first drive signal COM_A, second drive signal COM_B).

A cable CBL is provided between the controller board CTR and the carriage CR. The head control signal or the drive signal COM is transmitted, via the cable CBL, from the controller board CTR side to the head unit 40 side.

Configuration of the Head 41

Figure 4A:
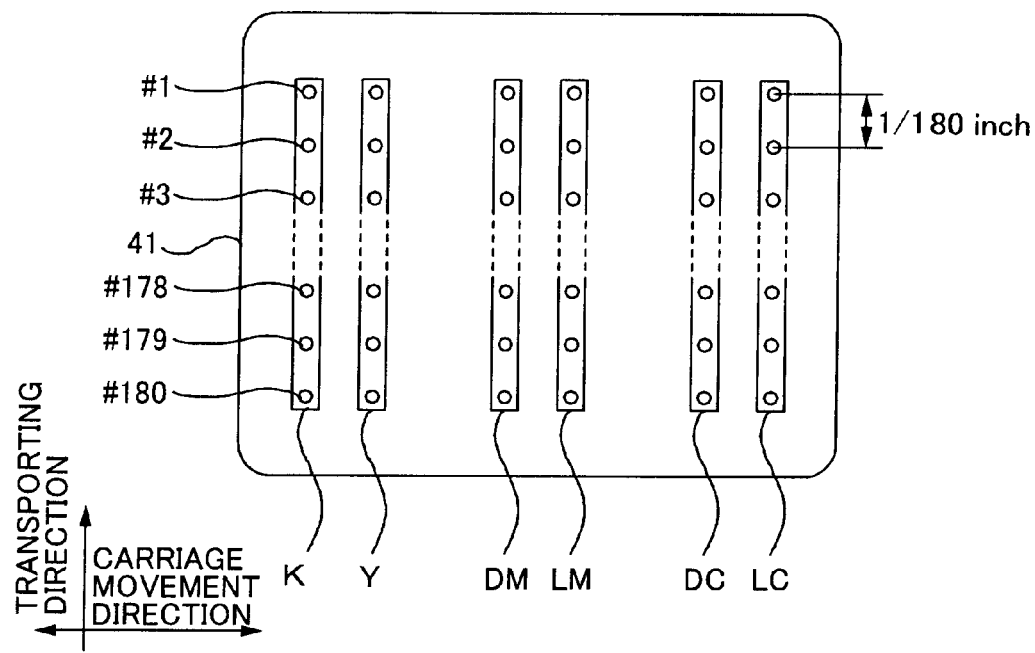
FIG. 4A is an explanatory diagram of the nozzles provided in the head 41 for the six-color printing.

FIG. 4A is an explanatory diagram of the nozzles provided in the head 41 of the six-color printing printer. A black ink nozzle group K, a yellow ink nozzle group Y, a dark magenta ink nozzle group DM, a light magenta ink nozzle group LM, a dark cyan ink nozzle group DC, and a light cyan ink nozzle group LC are formed in the lower surface of the head 41. Each nozzle group is provided with 180 nozzles that are ejection openings for ejecting ink of that color. Each nozzle is provided with an ink chamber (not shown) and a piezo element.

Driving the piezo element causes the ink chamber to expand and contract, thereby ejecting an ink droplet from the nozzle. From the various nozzles it is possible to eject a plurality of types of ink in differing amounts. Thus, dots of different sizes can be formed on the paper.

Figure 4B:
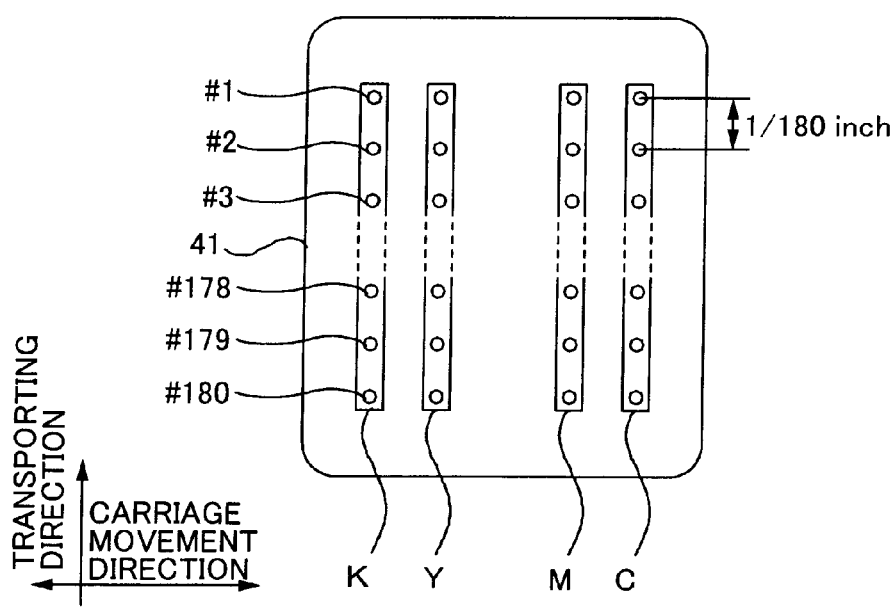
FIG. 4B is an explanatory diagram of the nozzles provided in the head 41 for the four-color printing.

FIG. 4B is an explanatory diagram of the nozzles provided in the head 41 of the four-color print printer. The black ink nozzle group K, the yellow ink nozzle group Y, a magenta ink nozzle group M, and a cyan ink nozzle group C are formed in the lower surface of the head 41. Namely, compared to the head 41 of the six-color print printer, the head 41 of the four-color print printer is provided with the magenta ink nozzle group M instead of the dark magenta ink nozzle group DM and the light magenta ink nozzle group LM, and is provided with the cyan ink nozzle group C instead of the dark cyan ink nozzle group DC and the light cyan ink nozzle group LC.

Figure 5:
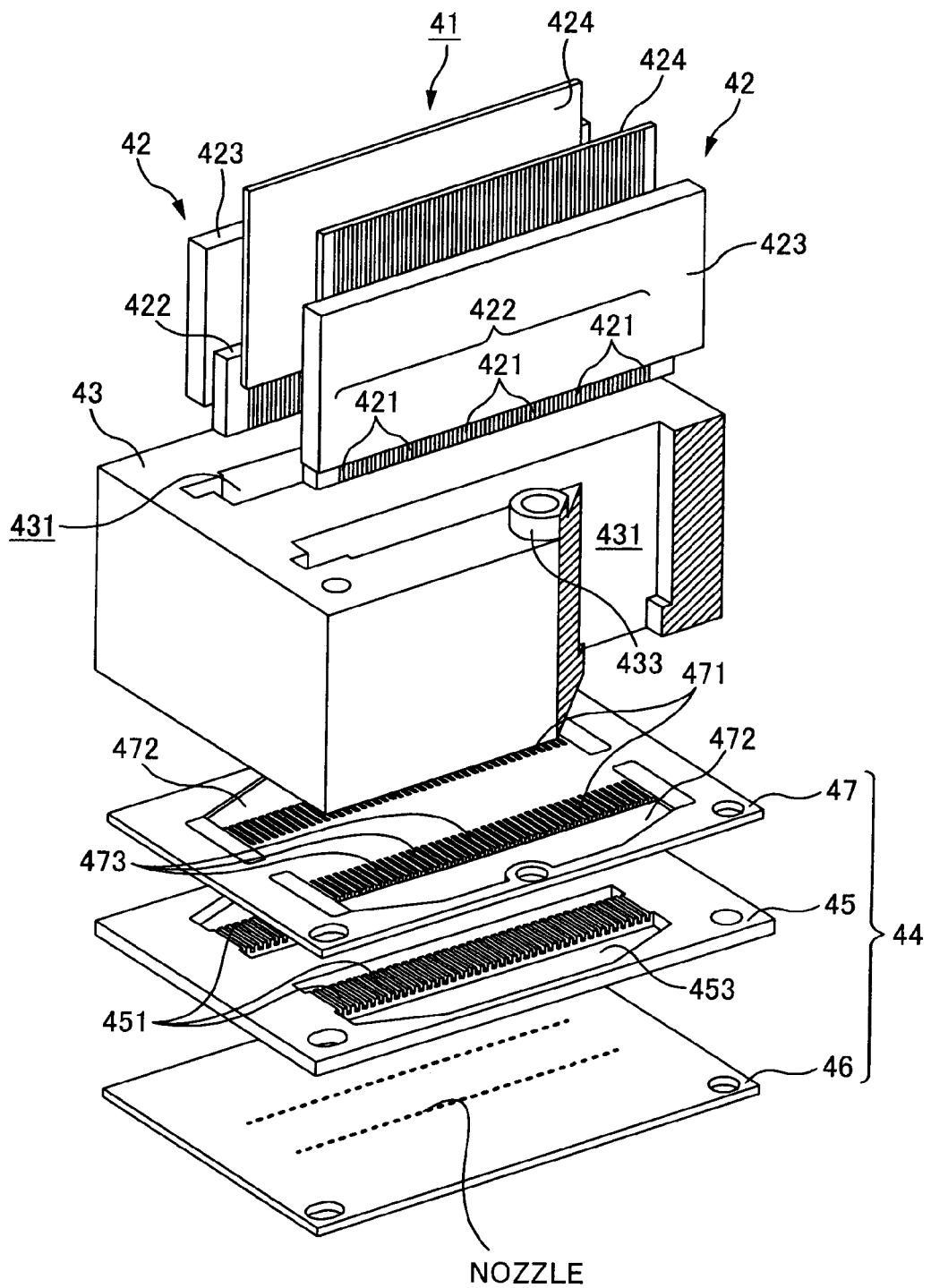
FIG. 5 is an explanatory diagram of the configuration of the area around a black ink nozzle group K and a cyan ink nozzle group C.
Figure 6:
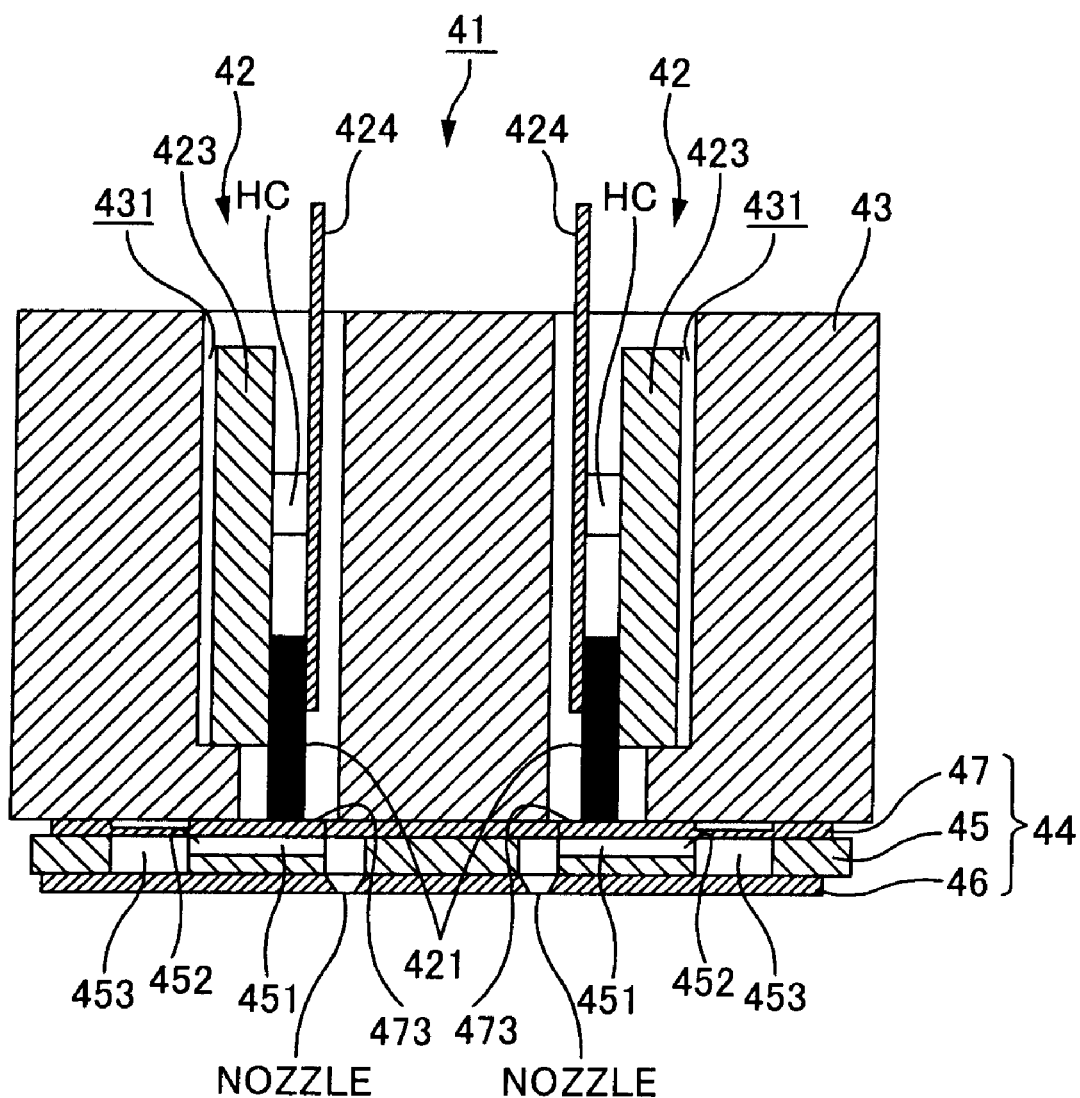
FIG. 6 is a cross-sectional diagram of the area around two nozzle groups.

FIG. 5 is an explanatory diagram of the configuration of the area around the black ink nozzle group K and the yellow ink nozzle group C. FIG. 6 is a cross-sectional diagram of the area around the two nozzle groups.

In the vicinity of the nozzle groups, there are provided drive units 42, a case 43 for storing the drive units 42, and a channel unit 44 in which the case is mounted.

Each drive unit 42 is constituted by a piezo element group 422 made of a plurality of piezo elements 421, a fixing plate 423 onto which the piezo element group 422 is fixed, and a flexible cable 424 for supplying power to each piezo element 421. Each piezo element 421 is attached to the fixing plate 423 in a so-called cantilever fashion. The fixing plate 423 is a plate-shaped member that possesses sufficient rigidity to stop the reaction force from the piezo elements 421. The flexible cable 424 is a sheet-shaped circuit board that is flexible and that is electrically connected to the piezo elements 421 on a lateral face of the fixing end portion that is on the side opposite the fixing plate 423. A head controller HC, which is a control IC for controlling the driving of the piezo elements 421, for example, is mounted on the surface of the flexible cable 424. As shown in the drawings, a head controller HC is provided for each nozzle group, that is, for each color. The head controller HC will be described in greater detail later.

The case 43 has a rectangular block-shaped exterior shape that has storage spaces 431 each of which can store a drive unit 42. The channel unit 44 is joined to the forward end of the case 43. Each storage space 431 is large enough that the drive unit 42 just fits therein. An ink supply tube 433 for introducing ink from an ink cartridge to the channel unit 44 is also formed in the case 43.

The channel unit 44 has a channel forming substrate 45, a nozzle plate 46, and an elastic plate 47, which are stacked on one another and form a single unit in such a manner that the channel forming substrate 45 is sandwiched by the nozzle plate 46 and the elastic plate 47. The nozzle plate 46 is a thin stainless steel plate on which nozzle rows such as those shown in FIG. 4 are formed.

A plurality of pressure chambers 451 and spaces that become ink supply openings 452 are formed, each corresponding to a nozzle, in the channel forming substrate 45. A reservoir 453 is a liquid storage compartment for supplying the ink stored in the ink cartridge to each pressure chamber 451, and it is in communication with the other end of the corresponding pressure chamber 451 via the ink supply port 452. The ink from the ink cartridge is introduced to the reservoir 453 through an ink supply tube 433. The elastic plate 47 is provided with a diaphragm section 471. The elastic plate 47 is also provided with a compliance section 472 that seals one of the open surfaces of the empty space that becomes the reservoir 453. With the elastic plate 47, a support plate is etched away to leave island portions 473. The forward end of the free end portion of the piezo elements 421 is adhered to these island portions 473.

The drive unit 42 is inserted to the storage space 431 with the free end portion of the piezo elements 421 facing the channel unit 44, and the front end surface of the free end portions are adhered to the corresponding island section 473. The rear surface of the fixing plate, which is on the side opposite the piezo element group binding surface, is adhered to the interior wall surface of the case 43, which defines the storage spaces 431. When, in this accommodated state, a drive signal is supplied to a piezo element 421 via the flexible cable 424, the piezo element 421 expands and contracts, increasing and decreasing the volume of its pressure chamber 451. This change in the volume of the pressure chamber 451 alters the pressure of the ink in the pressure chamber 451. In this way, the change in ink pressure can be utilized to cause an ink droplet to be ejected from the nozzle.

To facilitate understanding of the embodiments, first the embodiments are explained with the help of reference examples, and then the embodiments will be described.

First Reference Example

4 Tone Printing

Regarding the Drive Signal COM

Figure 7:
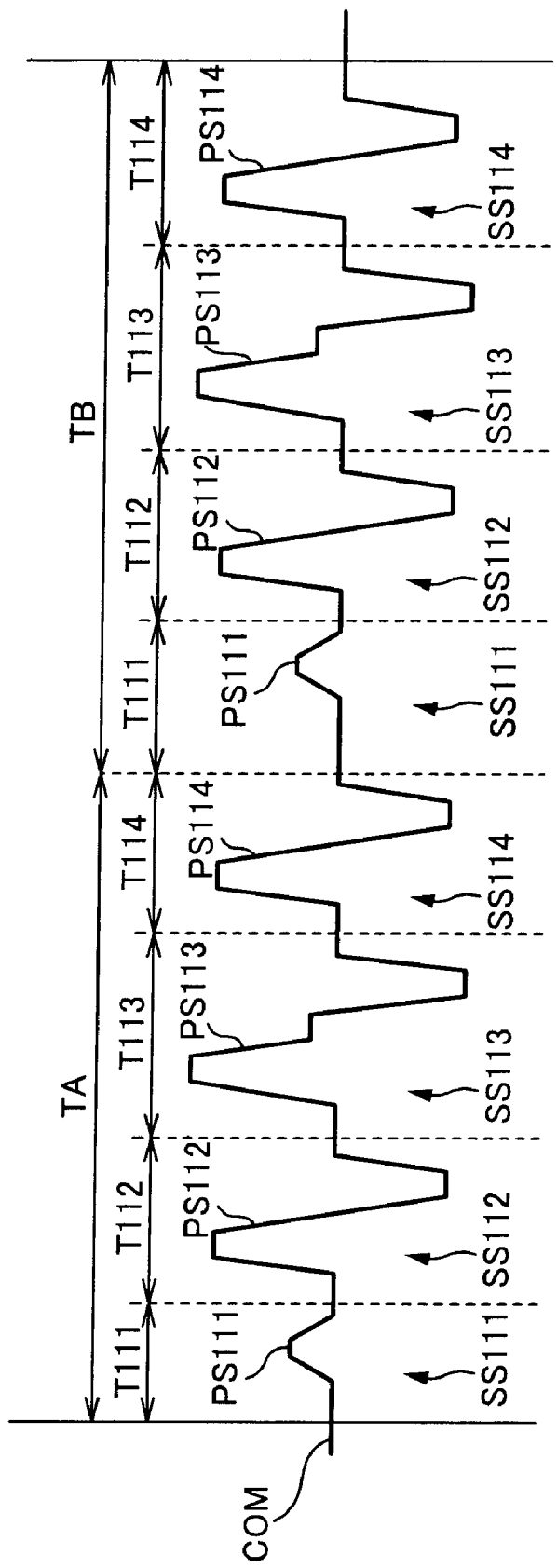
FIG. 7 is an explanatory diagram of a drive signal COM in a first reference example.

FIG. 7 is an explanatory diagram of the drive signal COM in the first reference example.

The drive signal COM is repeatedly generated each repeating period T. The repeating period T is time required for 15, the carriage CR to move a predetermined distance. The drawing shows two consecutive repeating periods T (TA and TB). The drive signal has the same waveform in the early repeating period TA and in the latter repeating period TB. Thus, each time that the carriage CR moves a predetermined distance, a drive signal with a fixed waveform is repeatedly generated by the drive signal generation circuit 70.

Each repeating period T can be divided into four intervals T111 to T114. A first interval signal SS111 that includes a drive pulse PS111 is generated in the first interval T111, a second interval signal SS112 that includes a drive pulse PS112 is generated in the second interval T112, a third interval signal SS113 that includes a drive pulse PS113 is generated in the third interval T113, and a fourth interval signal SS114 that includes a drive pulse PS114 is generated in the fourth interval T114. It should be noted that the waveforms of the drive pulses PS111 to PS114 are determined based on the operation that the piezo element 421 is to perform.

The drive signal COM that is generated in the drive signal generation circuit 70 is input to the head controller HC along with other signals via the cable CBL.

Head Controller HC

Figure 8:
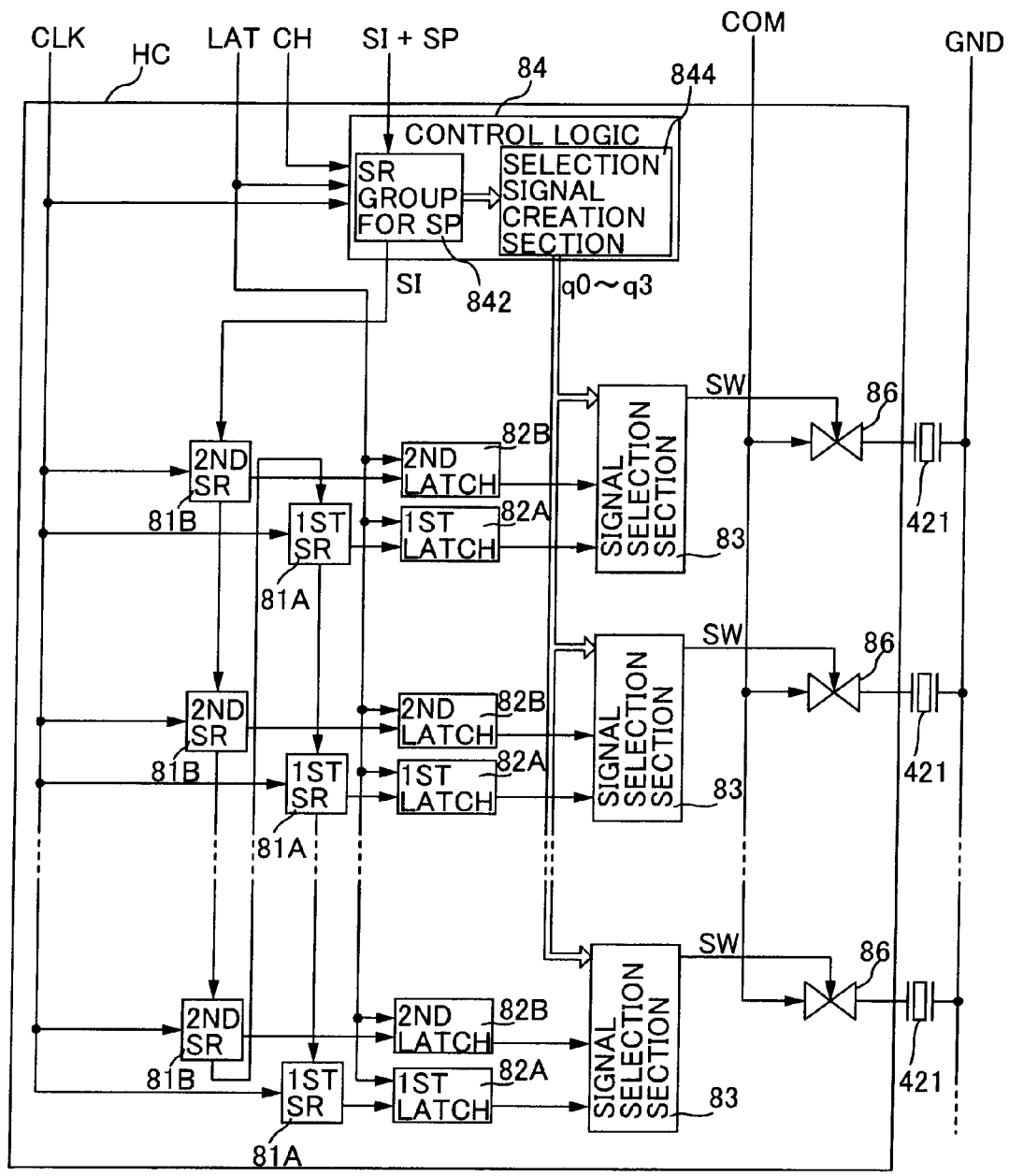
FIG. 8 is a block diagram of a head controller HC in the first reference example.

FIG. 8 is a block diagram of the head controller HC of the first reference example.

The head controller HC is provided with a first shift register 81A, a second shift register 81B, a first latch circuit 82A, a second latch circuit 82B, a signal selection section 83, a control logic 84, and a switch 86. Each one of the sections aside from the control logic 84 (that is, the first shift register 81A, the second shift register 81B, the first latch circuit 82A, the second latch circuit 82B, the signal selection section 83, and the switch 86) is provided for each piezo element 421. The control logic 84 has a shift register group 842 for storing setting data SP, and a selection signal creation section 844 that creates selection signals q0 to q3 based on the selection data SP.

A clock CLK, a latch signal LAT, a change signal CH, and a drive signal COM are input from the printer-side controller 60 to the head controller HC via the cable CBL. A transfer signal TR that includes transfer data TRD, which includes pixel data SI and setting data SP, is also input to the head controller HC from the printer-side controller 60 via the cable CBL.

Figure 9:
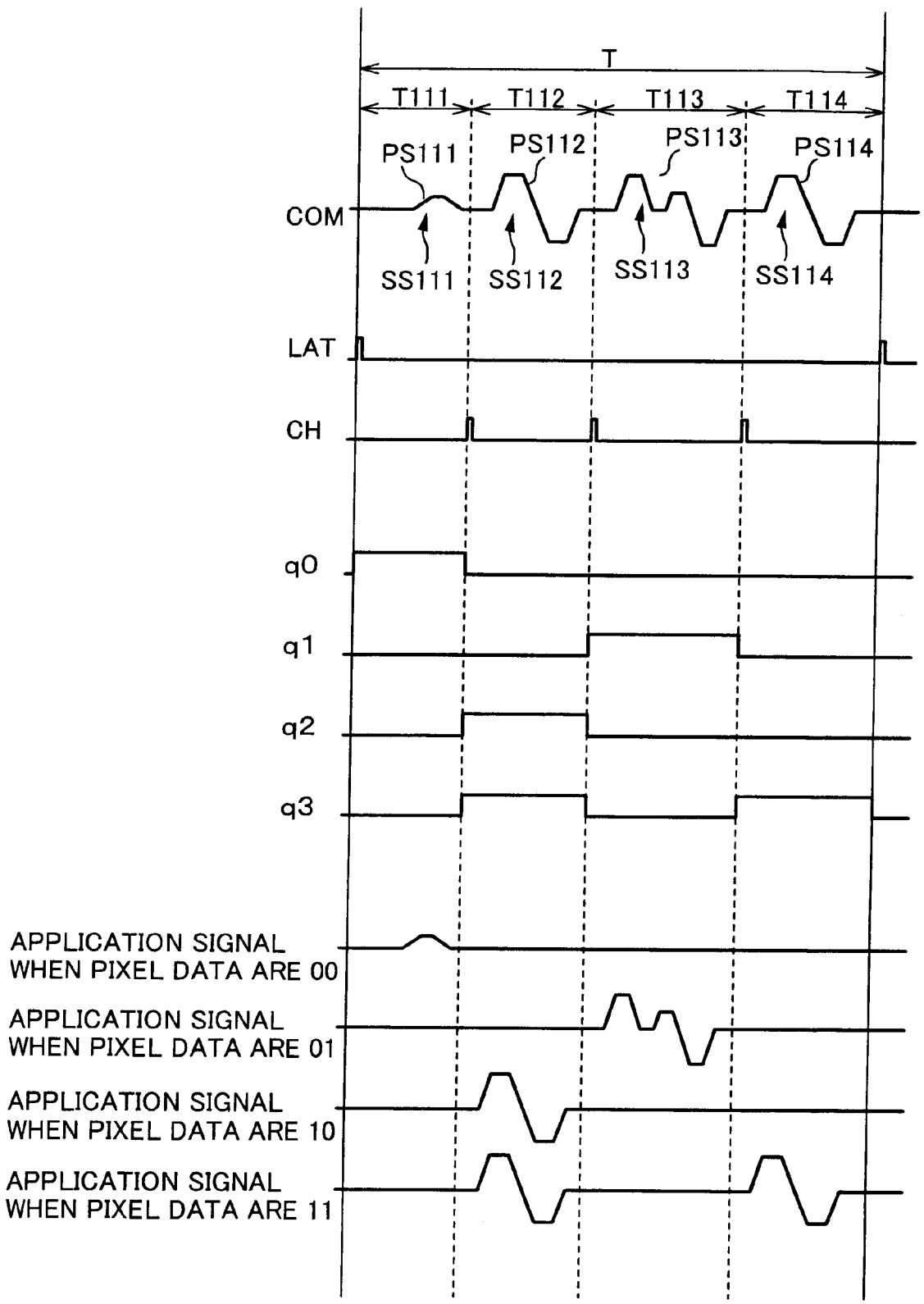
FIG. 9 is an explanatory diagram of various signals in the first reference example.
Figure 10A:
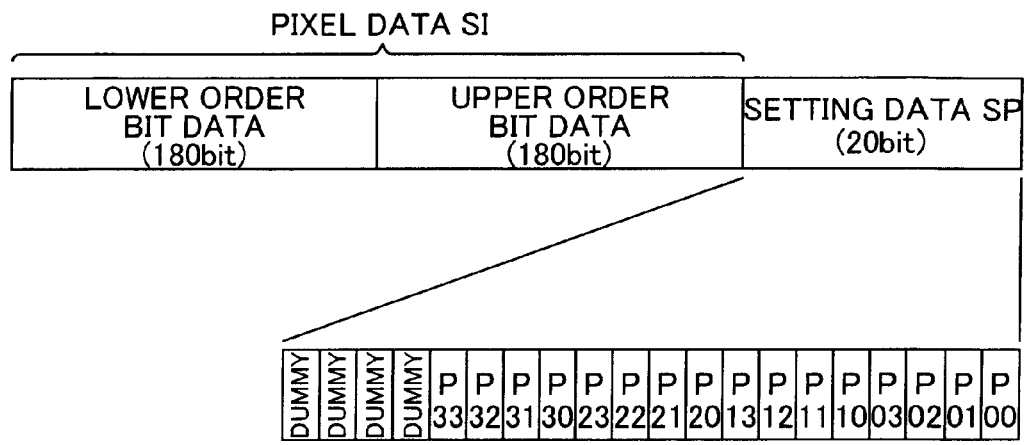
FIG. 10A is an explanatory diagram of transfer data TRD.
Figure 10B:
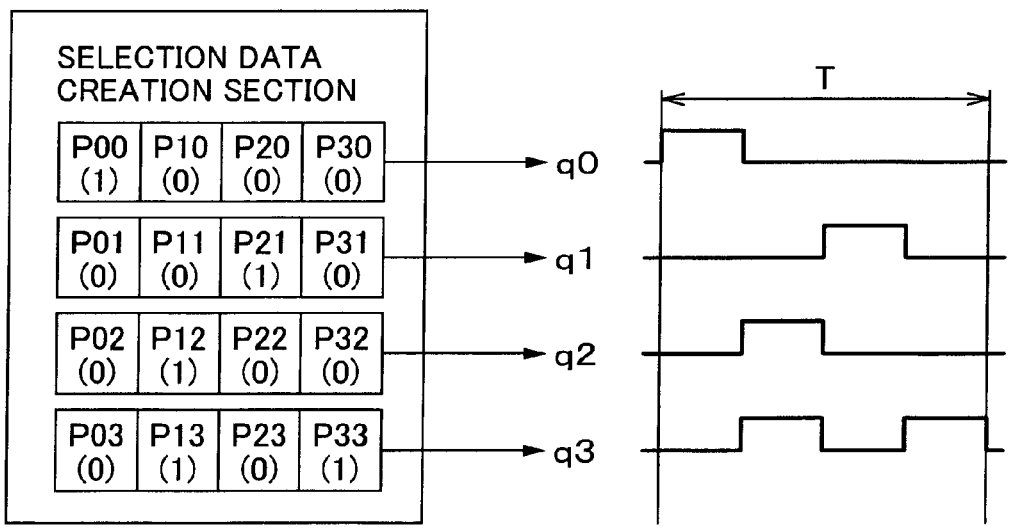
FIG. 10B is an explanatory diagram of the function of a selection signal creation section 844.

FIG. 9 is an explanatory diagram of the various signals of the first reference example. FIG. 10A is an explanatory diagram of the transfer data TRD. FIG. 10B is an explanatory diagram of the function of the selection signal creation section 844.

When the transfer signal TR is input to the head controller HC in synchronization with the clock CLK, the lower order bit data in the transfer data TRD included in the transfer signal are set to the first shift registers 81A, the upper order bit data are set to the second shift registers 81B, and the setting data SP are set to the shift register group 842 of the control logic 84. It should be noted that the lower order bit of the 2 bits of pixel data corresponding to the nozzle is set to the first shift registers 81A, and the upper order bit of the 2 bits of pixel data is set to the second shift registers 81B.

In correspondence with the pulse of the latch signal LAT, the lower order bit data are latched in the first latch circuits 82A, the upper order bit data are latched in the second latch circuits 82B, and the setting data SP are latched in the selection signal creation section 844. It should be noted that the lower order bit of the 2 bits of pixel data that correspond to the nozzle is latched by the first latch circuit 82A, and the upper order bit of the 2 bits of pixel data is latched by the second latch circuit 82B.

The setting data SP of the first reference example are made of 16 bits of data and 4 bits of dummy data (see FIG. 10A). The selection signal creation section 844 creates the selection signal q0 based on predetermined 4 bits of data (data P00, data P10, data P20, data P30) of the 16-bit setting data SP and the change signal CH. Likewise, the selection signal creation section 844 creates the selection signals q1 to q3 based on predetermined 4 bits of data in the 16-bit setting data SP and the change signal CH.

In the first example, of the 16-bit setting data SP, the data P00, the data P12, the data P13, the data P21, and the data P33 are 1, and the other data are 0. Thus, the 4 bits of data (data P00, data P10, data P20, and data P30) for the selection signal q0 are 1000. As a result, the selection signal q0 is H level in the first interval T111, and is L level in the second interval T112 through the fourth interval T114. The selection signals q1 to q3 become the signals that are shown in the drawing.

The signal selection section 83 selects one selection signal q0 to q3 according to the 2-bit pixel data that has been latched by the first latch circuit 82A and the second latch circuit 82B. The selection signal q0 is selected if the pixel data are 00 (the lower order bit is 0 and the upper order bit is 0), the selection signal q1 is selected if the pixel data are 01, the selection signal q2 is selected if the pixel data are 10, and the selection signal q3 is selected if the pixel data are 11. The selection signal that is selected is output from the signal selection section 83 as the switch signal SW.

The drive signal COM and the switch signal SW are input to the switch 86. When the switch signal is H level, the switch 86 becomes on and the drive signal COM is input to the piezo element 421. When the switch signal is L level, the switch 86 becomes off and the drive signal COM is not input to the piezo element 421.

When the pixel data are 00, the switch 86 is switched on or off by the selection signal q0, and the first interval signal SS111 of the drive signal COM is input to the piezo element 421 and the piezo element 421 is driven by the drive pulse PS111. When the piezo element 421 is driven according to the drive pulse PS111, the ink is subjected to a change in pressure to a degree that does not result in the ejection of ink, and the ink meniscus (the free surface of the ink that is exposed at the nozzle portion) is finely vibrated.

When the pixel data are 01, the switch 86 is switched on or off by the selection signal q1, and the third interval signal SS113 of the drive signal COM is input to the piezo element 421 and the piezo element 421 is driven by the drive pulse PS113. When the piezo element 421 is driven according to the drive pulse PS113, a small quantity of ink is ejected and forms a small dot on the paper.

When the pixel data are 10, the switch 86 is switched on or off by the selection signal q2, and the second interval signal SS112 of the drive signal COM is input to the piezo element 421 and the piezo element 421 is driven by the drive pulse PS112. When the piezo element 421 is driven according to the drive pulse PS112, a medium quantity of ink is ejected and forms a medium dot on the paper.

When the pixel data are 11, the switch 86 is switched on or off by the selection signal q3, and the second interval signal SS112 and the fourth interval signal SS114 of the drive signal COM are input to the piezo element 421 and the piezo element 421 is driven by the drive pulse PS112 and the drive pulse PS114. When the piezo element 421 is driven according to the drive pulse PS112 and the drive pulse PS114, a large dot is formed on the paper.

It should be noted that during the time that the piezo element 421 is being driven in the repeating period TA of FIG. 7, the transfer signal TR (a signal including the transfer data TRD, which includes the pixel data SI and the setting data SP) for driving the piezo element 421 in the next repeating period TB is input to the head controller HC. That is to say, during the repeating period TA, it is necessary to set the lower order bit data, the upper order bit data, and the setting data for the next repeating period TB in the various shift registers.

Second Reference Example

Eight Tone Printing

Figure 11:
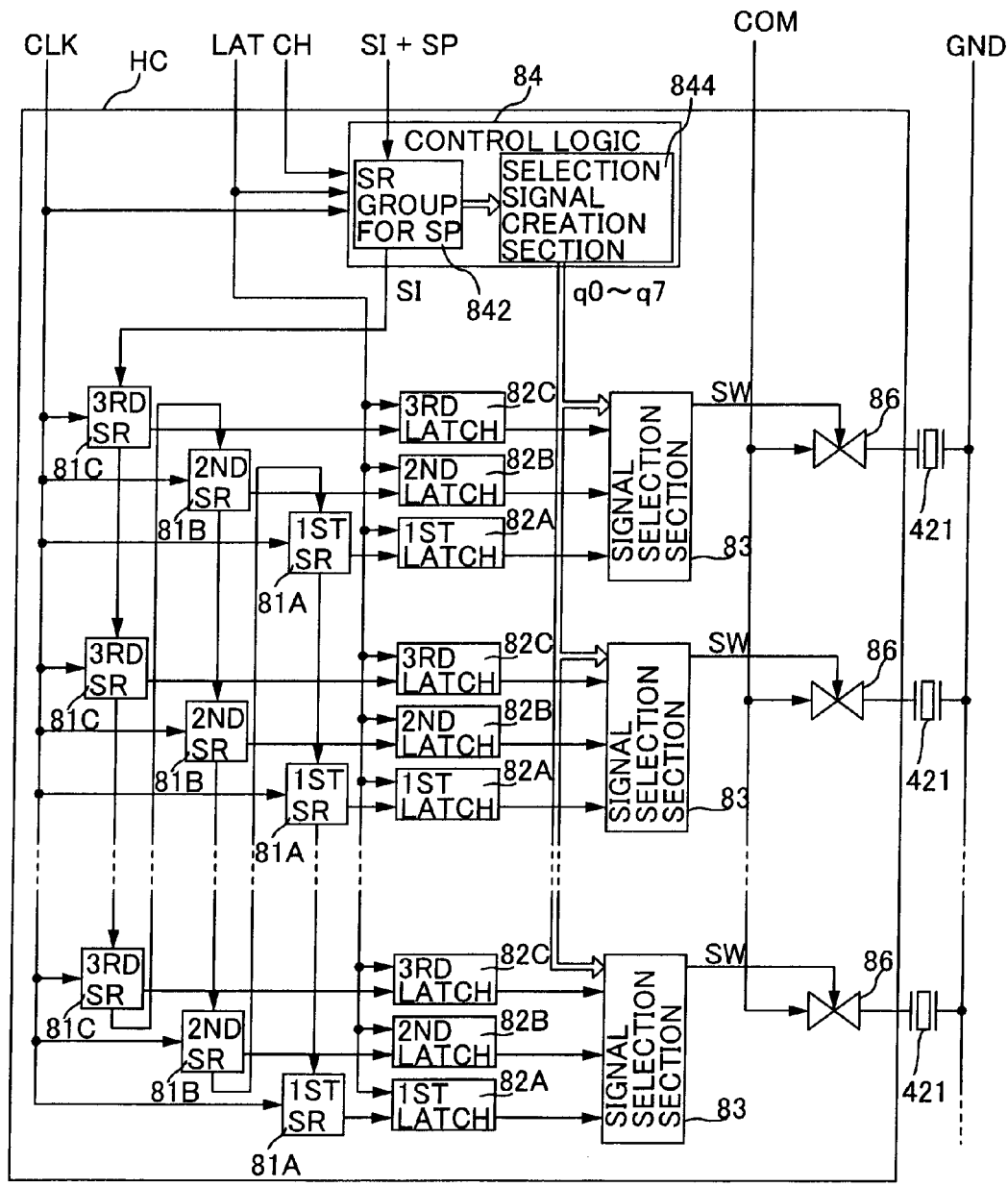
FIG. 11 is a block diagram of the head controller HC in a second reference example.

In the first reference example above, four shades (no dot, small dot, medium dot, large dot) can be formed for each pixel on the paper. In contrast, in the second reference example described below, it is possible to eject ink droplets in amounts of 0 pl (minute vibration with no ejection of ink), 1.5 pl (picoliter), 3 pl, 4.5 pl, 7 pl, 8.5 pl, 10 pl, and 14 pl, to form eight shades for each pixel on the paper.
Regarding the Head Controller HC FIG. 11 is a block diagram of the head controller HC of the second reference example. Compared to that of the first reference example, the head controller HC of the second reference example is further provided with a third shift register 81C and a third latch circuit 82C. Also, the selection signal creation section 844 creates eight types of selection signals q0 to q7.

Figure 12:
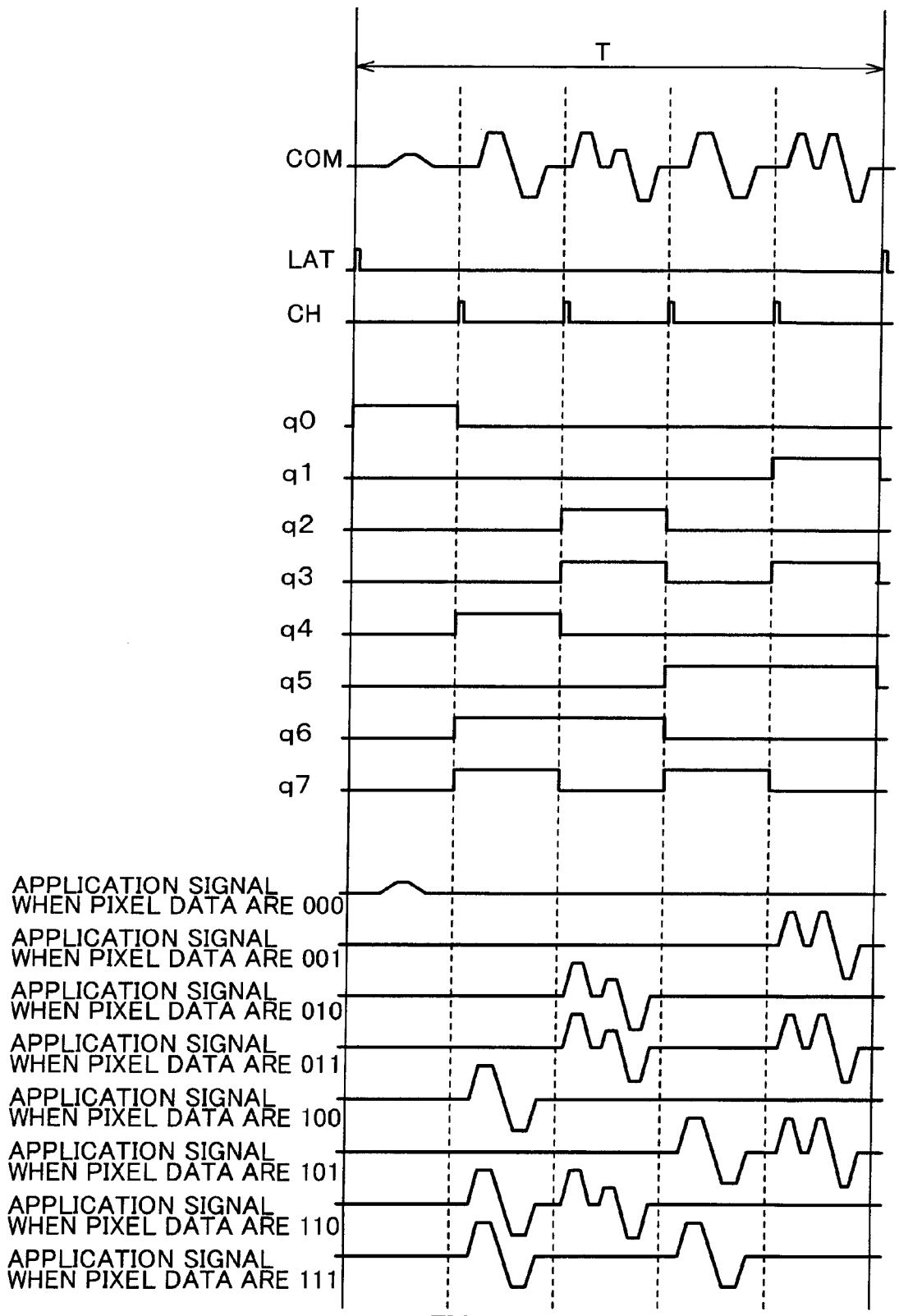
FIG. 12 is an explanatory diagram of various signals in the second reference example.
Figure 13A:
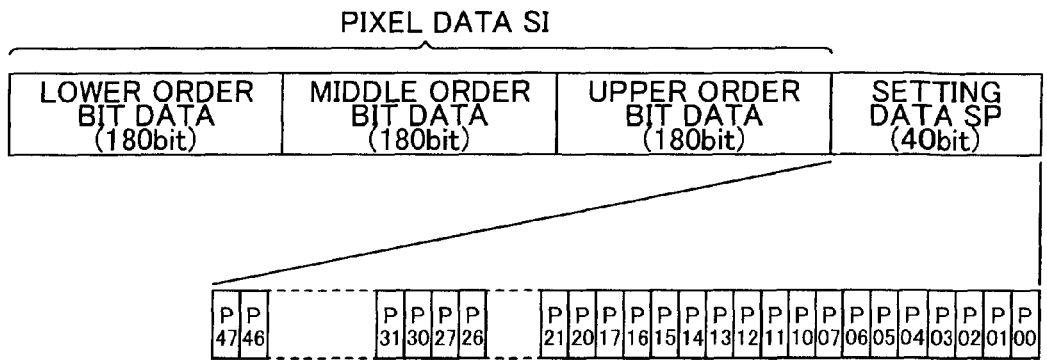
FIG. 13A is an explanatory diagram of transfer data TRD.
Figure 13B:
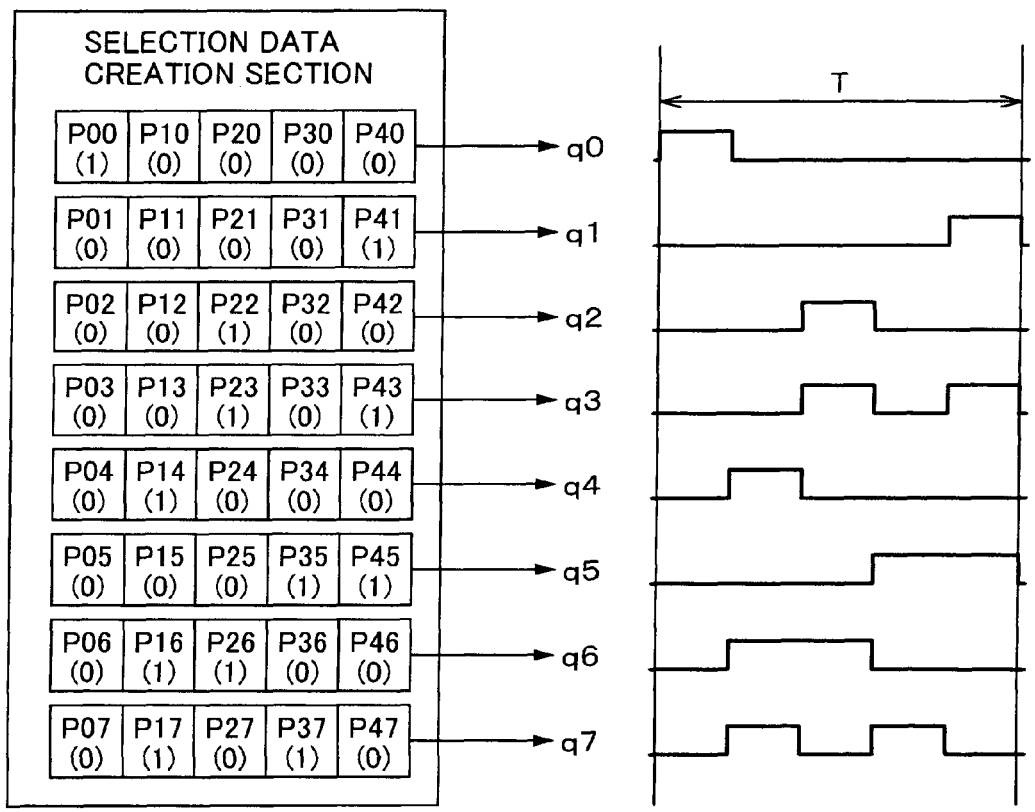
FIG. 13B is an explanatory diagram of the function of the selection signal creation section 844.

FIG. 12 is an explanatory diagram of the various signals of the second reference example. FIG. 13A is an explanatory diagram of the transfer data TRD. FIG. 13B is an explanatory diagram of the function of the selection signal creation section 844.

To express eight tones in the second reference example, it is necessary to correspond 3 bits of pixel data with a single pixel (in the first example, 2 bits of pixel data are corresponded with a single pixel). For this reason, the pixel data SI are made of an upper order bit data, middle order bit data, and lower order bit data (see FIG. 13A).

Further, in the second reference example, the repeating period T is divided into five intervals (in the first reference example, the repeating period T is divided into four intervals) This is because to express eight tones it is necessary to apply eight types of application signals to the piezo elements 421 (see FIG. 12), and thus it is necessary to increase the number of waveforms to be prepared for a repeating period T.

In the second reference example, the setting data SP are 40 bits of data (in the first reference example, the setting data was 16 bits (20 bits including the dummy data)) More specifically, in the second reference example, it is necessary for the selection signal creation section 844 to create eight types of selection signals q0 to q7 in order to create eight types of application signals from the drive signal COM, and it is necessary to determine whether each selection signal is L level or H level in the five intervals, and thus the setting data SP become a data amount of 8 (types)×5 (intervals)=40 (bits).

Then, when the transfer signal TR is input to the head controller HC of the second reference example, the lower order bit data are set to the first shift registers 81A, the middle order bit data are set to the second shift registers 81B, and the upper order bit data are set to the third shift registers 81C, and the setting data SP are set to the shift register group 842 of the control logic 84. Then, in accordance with the pulse of the latch signal LAT, the lower order bit data are latched by the first latch circuits 82A, the middle order bit data are latched by the second latch circuits 82B, and the upper order bit data are latched by the third latch circuits 82C, and the setting data SP are latched by the selection signal creation section 844.

The selection signal creation section 844 creates the selection signals q0 to q7 based on predetermined 4-bit data of the 40 bits of setting data and the change signal CH. The signal selection section 83 selects one of the selection signals q0 to q7 according to the 3 bits of pixel data latched by the first latch circuit 82A through the third latch circuit 82C. The selection signal that has been selected is output from the signal selection section 83 as the switch signal SW.

Thus, the piezo elements 421 are driven according to 3-bit pixel data, and an ink droplet that corresponds to the 3-bit pixel data is ejected (or not ejected), forming a dot that corresponds to the 3-bit pixel data on the paper.

Comparative Example

Figure 14:
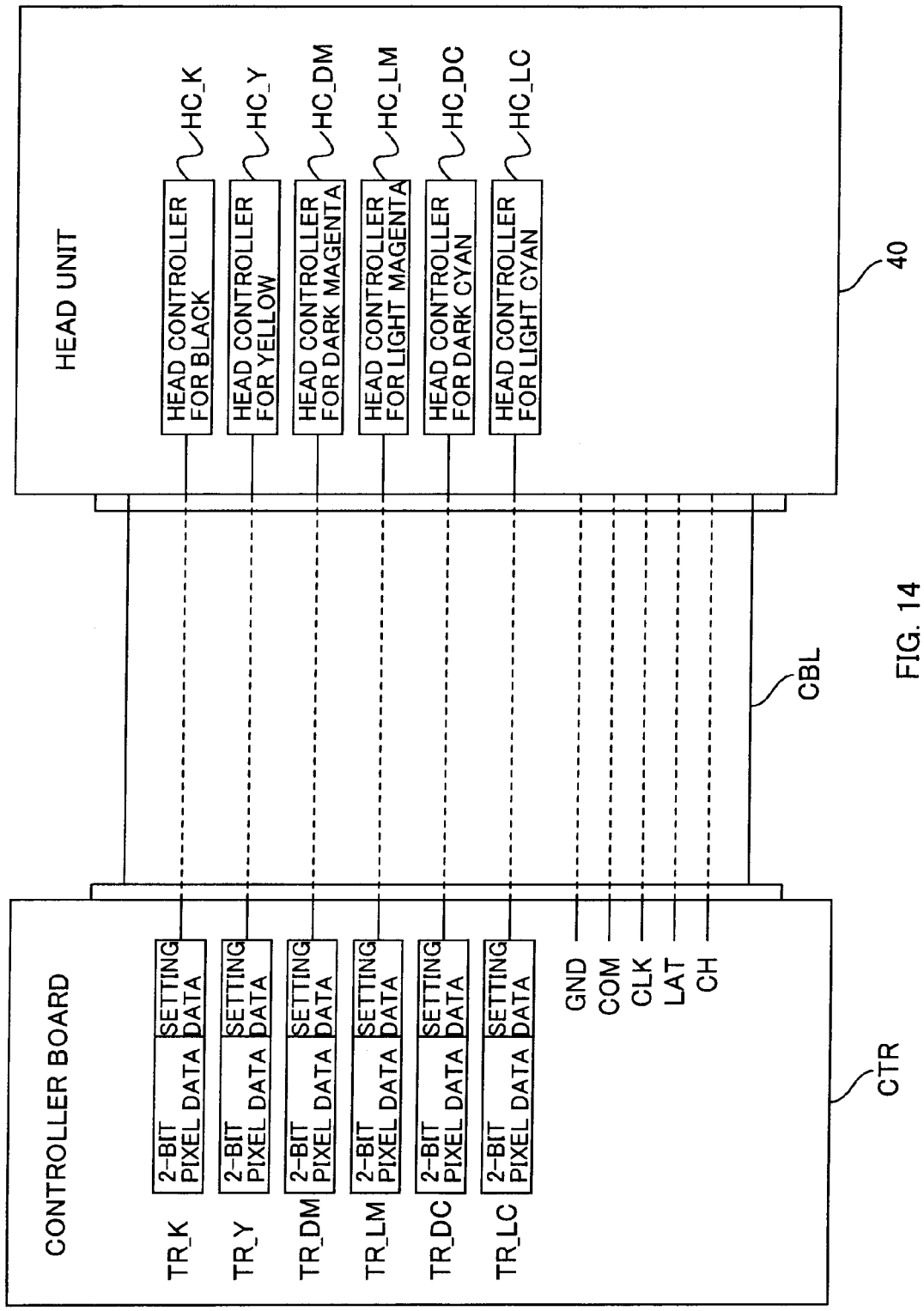
FIG. 14 is an explanatory diagram of input and output of signals in a six-color four tone printer.

Input and Output of Signals in Six-Color Four Tone Printer
FIG. 14 is an explanatory diagram of input and output of signals in a six-color four tone printer. The signals output from the controller board CTR is input to the head unit 40 via the cable CBL.

In the case of the six-color four tone printer, nozzle groups of six colors are provided in the head 41 (refer to FIG. 4A), and the head controller HC of six colors are provided in the head unit 40, and the transfer signal TR is input to each head controller HC. Namely, six types of the transfer signals TR are transmitted by the cable CBL. Furthermore, the transfer signals TR in the drawing have an index according to the color (for example, the transfer signal input to the head controller for black is written as "TR-K").

The transfer signals TR of each color, as shown in FIG. 10A, all consist of 180 bits of the lower order bit data, 180 bits of the upper order bit data, and the setting data SP. In other words, the transfer signal TR of each color consists of 2 bits of pixel data SI corresponding to each of the 180 nozzles and the setting data SP.

Namely, in the case of the six-color four tone printer, the controller board CTR is configured to output the transfer signal TR that consists of 180 bits of the lower order bit data, 180 bits of the upper order bit data, and the setting data SP, for six colors. In other words, in the case of the six-color four tone printer, the controller board CTR is configured to output the transfer signal TR that consists of 2 bits of pixel data SI corresponding to each of the 180 nozzles and the setting data SP, for six colors.

Comparative Configuration of KY Four Tone and MC Eight Tone Printer

Figure 15:
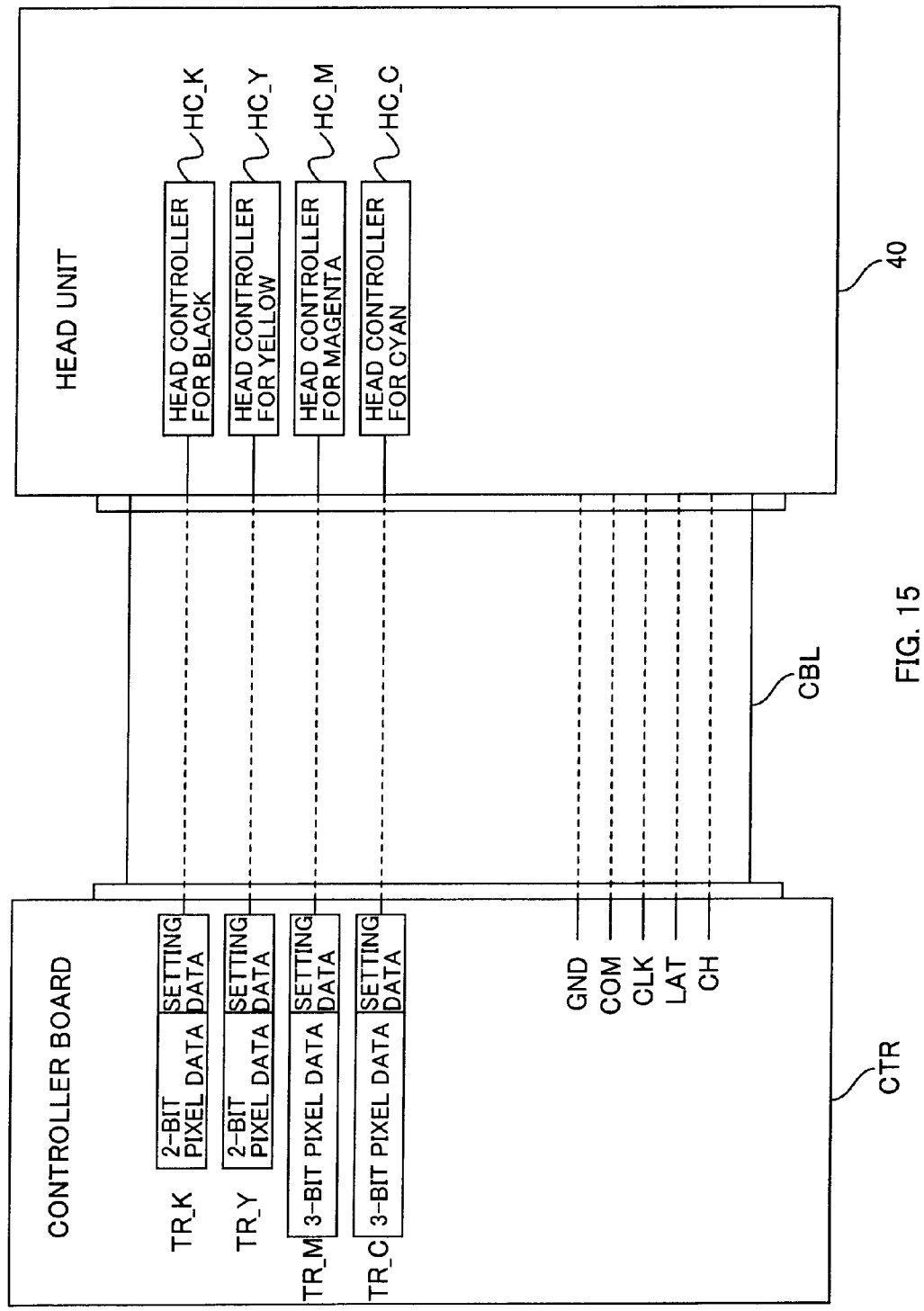
FIG. 15 is an explanatory diagram of input and output of the signals, in a printer that prints black and yellow in four tones, and prints magenta and cyan in eight tones.

FIG. 15 is an explanatory diagram of input and output of the signals, in a printer that prints black and yellow in four tones and prints magenta and cyan in eight tones.

In the case of this printer, the nozzle groups of four colors are provided in the head 41 (see FIG. 4B), so that the head controllers HC of the four colors are provided in the head unit 40, and the transfer signal TR is input to each head controller HC. Namely, four types of the transfer signals TR are transmitted by the cable CBL.

Black transfer signal TR_K and yellow transfer signal TR_Y each consists of 180 bits of the lower order bit data, 180 to the case in FIG. 14. In other words, the black transfer signal TR_K and the yellow transfer signal TR_Y each consists of 2 bits of pixel data SI corresponding to each of the 180 nozzles and the setting data SP.

On the other hand, magenta transfer signal TR_M and cyan transfer signal TR_C each consists of 180 bits of the lower order bit data, 180 bits of the middle order bit data, 180 bits of the upper order bit data, and the setting data SP, as shown in FIG. 13A. In other words, the magenta transfer signal TR_M and the cyan transfer signal TR_C each consists of 3 bits of pixel data SI corresponding to each of the 180 nozzles and the setting data SP.

Namely, in the case of this printer, the controller board CTR, different from the controller board CTR of the six-color four tone printer, is configured to output the transfer signal TR that consists of 3 bits of pixel data SI corresponding to each of the 180 nozzles and the setting data SP, for four colors. Namely, the controller board CTR of this printer needs to have a different configuration from the controller board CTR of the six-color four tone printer.

However, when the configuration of the controller boards of the two types of printers differ from each other, the number of parts which are not common increases, which results in a cost increase in printer manufacturing.

Overview of the Embodiment

Figure 16:
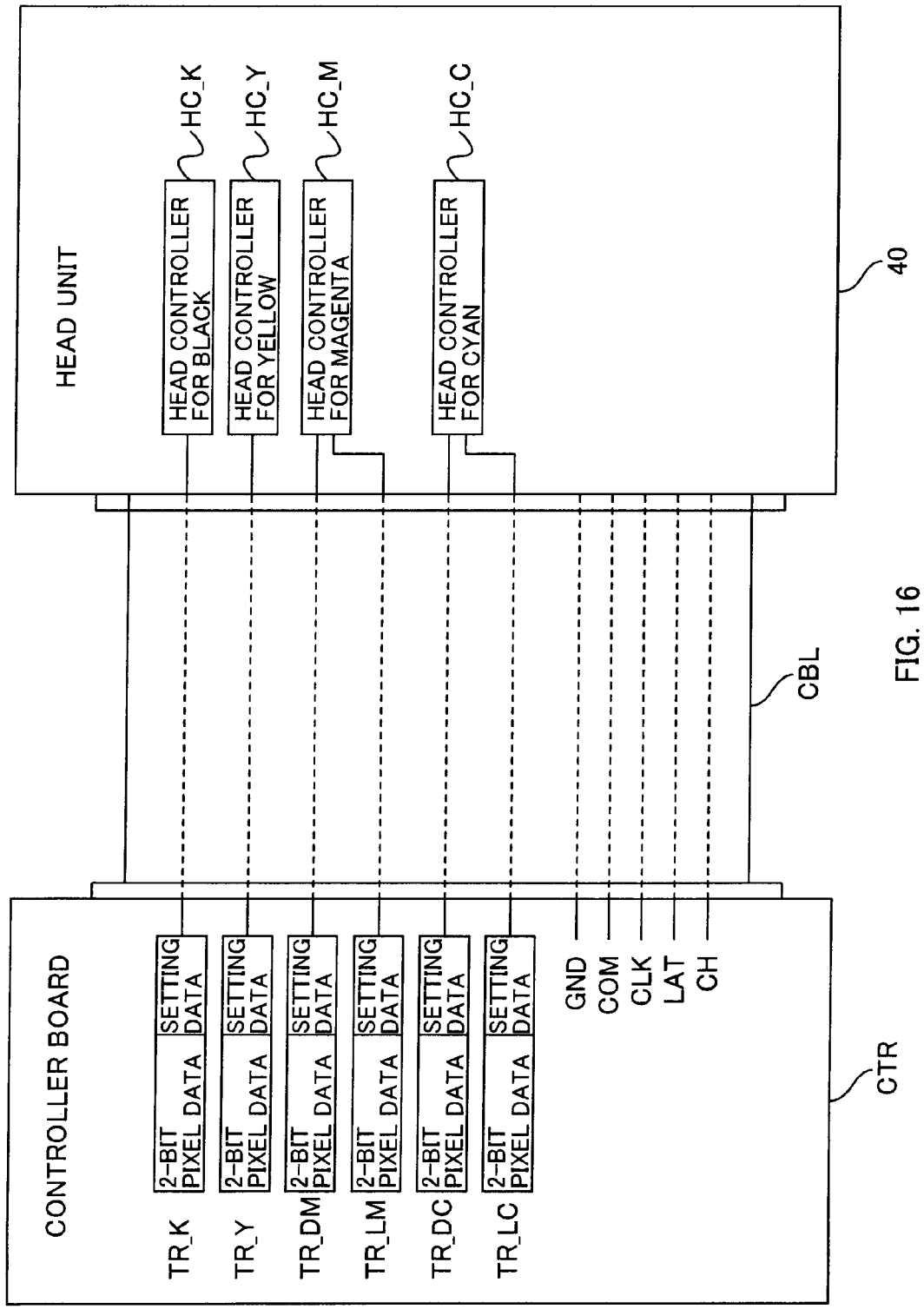
FIG. 16 is an explanatory diagram of an overview of the embodiment.

FIG. 16 is an explanatory diagram of an overview of the embodiment. It should be noted that the printer prints black and yellow in four tones, and prints magenta and cyan in eight tones. Therefore, nozzle groups of the four colors are provided in the head 41 (refer to FIG. 4B), and the head controllers HC of the four colors are provided in the head unit 40.

The controller board CTR of this embodiment, similar to the controller board CTR in FIG. 14, is configured to output the transfer signal TR that consists of 2 bits of pixel data SI corresponding to each of the 180 nozzles and the setting data SP, for six colors. Therefore, the controller board CTR of this embodiment and the controller board CTR of the four-color six-tone printer can be made common.

The controller board CTR of this embodiment, similar to the controller of the four-color six-tone printer, outputs a transfer signal TR_DM for dark magenta and a transfer signal TR_LM for light magenta. The transfer signal TR_DM and the transfer signal TR_LM are input to the head controller HC_M for magenta in the head unit 40 from the controller board CTR, via the cable CBL. Also the controller board CTR of this embodiment, similar to the controller of the four-color six-tone printer, outputs dark cyan transfer signal TR_DC and light cyan transfer signal TR_LC. The transfer signal TR_DC and the transfer signal TR_LC is input to the head controller HC_C for cyan in the head unit 40 from the controller board CTR, via the cable CBL.

Namely, in this embodiment, two transfer signals TR are input to the head controller HC_M for magenta and the head controller HC_C for cyan respectively. In other words, the head controller HC_M for magenta and the head controller HC_C for cyan in this embodiment are provided with two input sections for the transfer signals for inputting the two transfer signals TR.

Furthermore, one transfer signal TR is input to the head controller HC_K for black and the head controller HC_Y for yellow respectively. However, from the point of view of making the parts common, the head controller HC_K for black and the head controller HC_Y for yellow have same configuration as the head controller HC_M for magenta and the head controller HC_C for cyan. That is to say, the head controller HC_K for black and the head controller HC_Y for yellow are provided with two input sections. As described later, the transfer signal TR is input to one of the input sections, and GND is input to the other input section.

First Embodiment

Configuration of Head Controller HC

Figure 17:
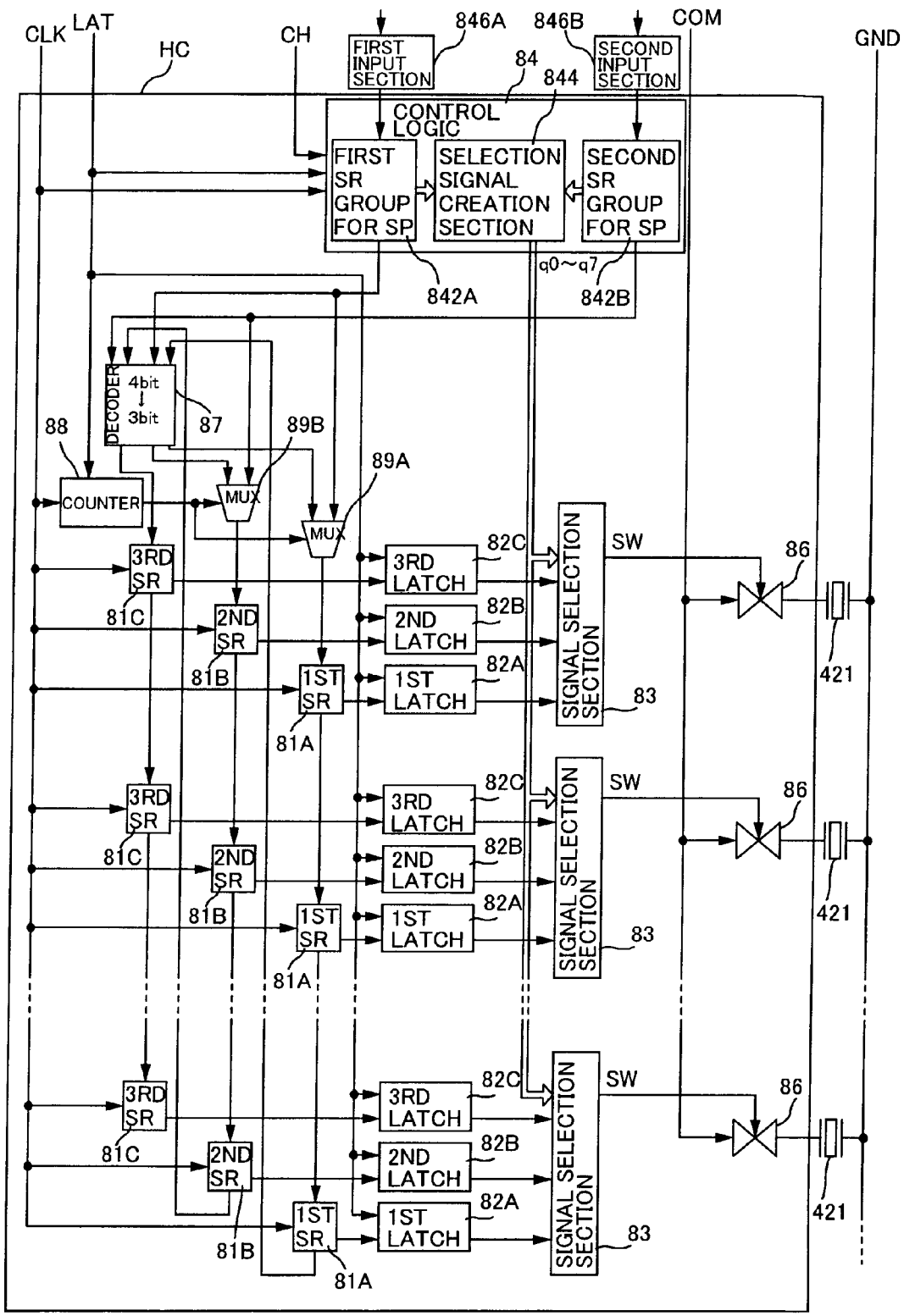
FIG. 17 is a block diagram of the head controller HC in the first embodiment.

FIG. 17 is a block diagram of the head controller HC in the first embodiment.

The head controller HC is provided with the first shift register 81A, the second shift register 81B, the third shift register 81C, the first latch circuit 82A, the second latch circuit 82B, the third latch circuit 82C, the signal selection section 83, the control logic 84, the switch 86, a decoder 87, a counter 88, a first multiplex or 89A, and a second multiplex or 89B. Each section except for the control logic 84, the decoder 87, the counter 88, the first multiplexor 89A, and the second multiplexor 89B (that is, the first shift register 81A, the second shift register 81B, the third shift register 81C, the first latch circuit 82A, the second latch circuit 82B, the third latch circuit 82C, the signal selection section 83, and the switch 86) is provided for each piezo element 421. A first input section 846A and a second input section 846B are provided to the head controller HC. The control logic 84 has a first shift register group 842A, a second shift register group 842B, and the selection signal creation section 844.

The clock CLK, the latch signal LAT, the change signal CH, and the drive signal COM are input from the printer controller board CTR to the head controller HC via the cable CBL. The clock CLK is input to the control logic 84, the counter 88, the first shift register 81A, the second shift register 81B, and the third shift register 81C. The latch signal LAT is input to the control logic 84, the counter 88, the first latch circuit 82A, the second latch circuit 82B, and the third latch circuit 82C. The change signal CH is input to the control logic 84. The drive signal COM is input to one end of each switch 86. It should be noted that the signals input to the first input section and the second input section are described later.

The signals input from the first input section are input to the first shift register group 842A of the control logic 84. The signals output from the first shift register group 842A are input to the decoder 87 and the first multiplexor 89A. The signals input from the second input section are input to the second shift register group 842B of the control logic 84. The signals output from the second shift register group 842B are input to the decoder 87 and the second multiplexor 89B.

The signal from the first shift register group 842A, the signal from the first shift register 81A corresponding to nozzle #180, the signal from the second shift register group 842B, and the signal from the second shift register 81B corresponding to the nozzle #180 are input to the decoder 87. That is, 4 bits of data are input to the decoder 87. The decoder 87 converts the 4 bits of data that has been inputted into 3 bits of data, and outputs a signal of 3 bits. There is described later the kind of 3 bits of data the inputted 4 bits of data will be converted into. The decoder 87 outputs the signals of 3 bits to the first multiplexor 89A, the second multiplexor 89B, and the third shift registers 81C that corresponds to the nozzle #1 respectively.

Further, a decode function of the decoder 87 can be set to off by setting of the decoder 87. When the decode function is set off, the decoder 87 outputs the signal inputted from the first shift register 81A corresponding to the nozzle #180 to the first multiplexor 89A, outputs the signal inputted from the first shift register group 842A to the second multiplexor 89B, and outputs the signal inputted from the second shift register group 842B to the third shift register 81C corresponding to the nozzle #1.

The counter 88 is reset by the latch signal LAT, and increments a count value according to the clock CLK. L level signal is output if the count value is under a predetermined value, and H level signal is output if the count value is equal to or greater than the predetermined value. The output signal of the counter 88 becomes a control input signal of the first multiplexor 89A and the second multiplexor 89B.

The signal from the first shift register group 842A and the signal from the decoder 87 are input to the first multiplexor 89A. When the control input signal from the counter 88 is L level, the first multiplexor 89A outputs the signal inputted from the first shift register group 842A. On the other hand, when the control input signal from the counter 88 is H level, the first multiplexor 89A outputs the signal inputted from the decoder 87. The signal output from the first multiplexor 89A is input to the first shift register 81A corresponding to the nozzle #1.

The signal from the second shift register group 842B and the signal from the decoder 87 are input to the second multiplexor 89B. When the control input signal from the counter 88 is L level, the second multiplexor 89B outputs the signal inputted from the second shift register group 842B. On the other hand, when the control input signal from the counter 88 is H level, the second multiplexor 89B outputs the signal inputted from the decoder 87. The signal output from the second multiplexor 89B is input to the second shift register 81B corresponding to the nozzle #1.

The signal from the first multiplexor 89A is input to the first shift register 81A corresponding to the nozzle #1. According to the clock CLK, data is transferred successively to the first shift register 81A that corresponds to the next nozzle. The first shift register 81A corresponding to the nozzle #180 outputs the held data to the decoder 87. Each of the first shift registers 81A outputs the held data to the first latch circuit 82A corresponding to the same nozzle.

The signal from the second multiplexor 89A is input to the second shift register 81B corresponding to the nozzle #1. According to the clock CLK, data is transferred successively to the second shift register 81B that corresponds to the next nozzle. The second shift register 81B corresponding to the nozzle #180 outputs the held data to the decoder 87. Each of the second shift registers 81B outputs the held data to the second latch circuit 82B corresponding to the same nozzle.

The signal from the decoder 87 is input to the third shift register 81C corresponding to the nozzle #1. According to the clock CLK, data is transferred successively to the third shift register 81C that corresponds to the next nozzle. Each third shift register 81C outputs the held data to the third latch circuit 82C corresponding to the same nozzle.

Each first latch circuit 82A latches the data that the first shift register 81A is holding when the pulse of the latch signal LAT is input. Each second latch circuit 82B latches the data that the second shift register 81B is holding when the pulse of the latch signal LAT is input. Each third latch circuit 82C latches the data that the third shift register 81C is holding when the pulse of the latch signal LAT is input. The first latch circuit 82A to the third latch circuit 82C output the latched data to the signal selection section 83.

The selection signal creation section 844 of the control logic 84 latches the data that the first shift register group 842A and the second shift register group 842B are holding, when the pulse of the latch signal LAT is input to the control logic 84. Then the selection signal creation section 844, based on the latched data, outputs eight selection signals q0 to q7 to each signal selection section 83 respectively.

The signal selection section 83 selects, from the inputted eight selection signals q0 to q7, one selection signal that corresponds to the signals of the first latch circuit 82A to the third latch circuit 82C, and outputs the selected selection signal as the switch signal SW to the switch 86. Namely, the signal selection section 83 functions as a multiplexor, with the signals of the first latch circuit 82A to the third latch circuit 82C as the control input signals, and outputs any of the eight input signals from the selection signal creation section 844.

The drive signal COM and the switch signal SW are input to the switch 86. When the switch signal is H level, the switch 86 is on, and the drive signal COM is applied to the piezo element 421. When the switch signal SW is L level, the switch 86 is off, and the drive signal COM is not applied to the piezo element 421.

Movement of the Head Controller HC in Eight Tone Printing

Next, movement of the head controller HC performing eight tone printing is explained. Here, the movement of the head controller HC for cyan is explained. Note that, the movement of the head controller HC for magenta is also almost the same.

Figure 18:
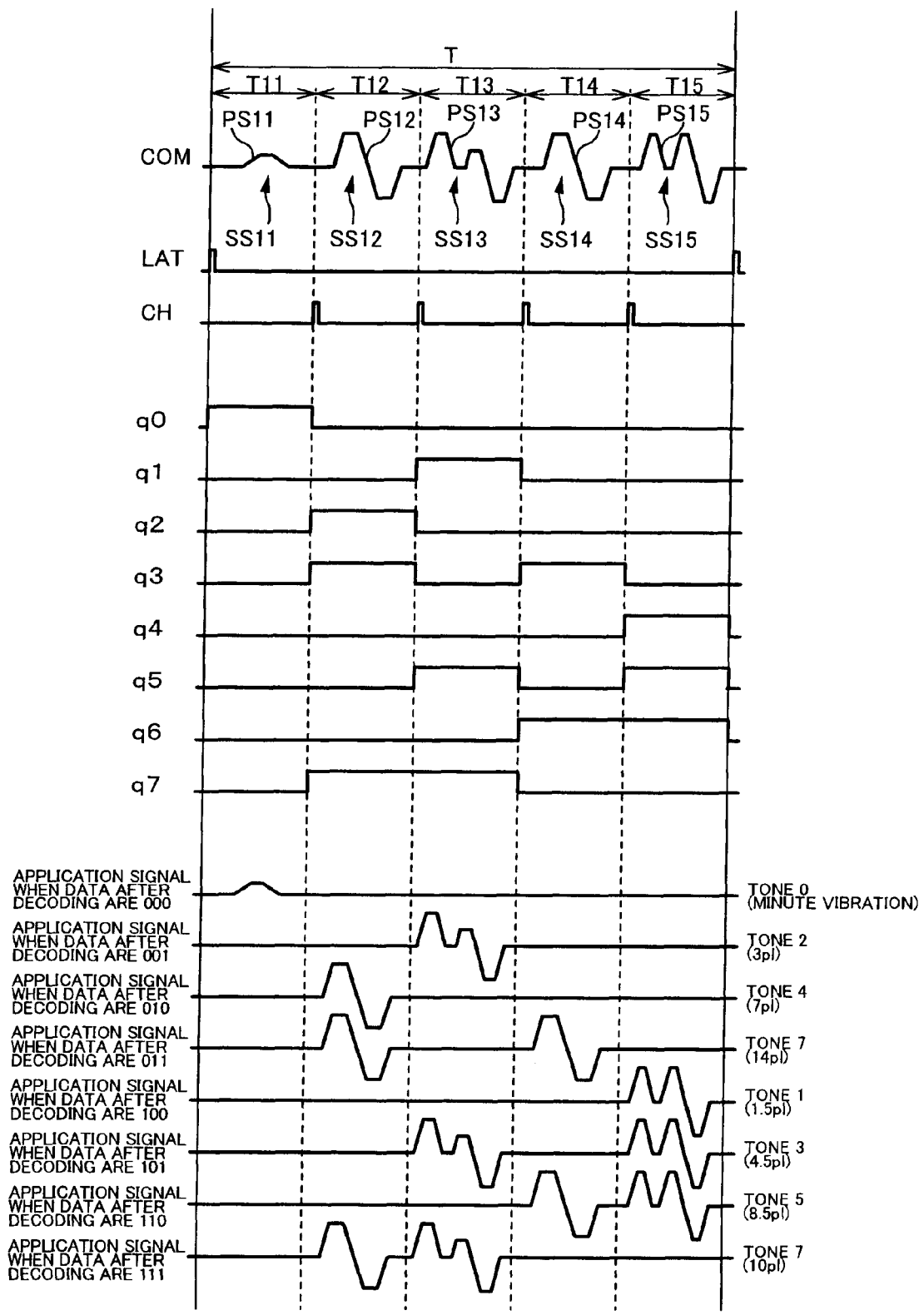
FIG. 18 is an explanatory diagram of the various signals concerning cyan in the first embodiment.

FIG. 18 is an explanatory diagram of the various signals concerning cyan in the first embodiment. FIG. 19A is an explanatory diagram of the dark cyan transfer signal TR_DC input to the first input section 846A, and the light cyan transfer signal TR_LC input to the second input section 846B. FIG. 19B is an explanatory diagram of the function of the selection signal creation section 844.

The drive signal COM is repeatedly generated for each repeating period T which is set by the latch signal LAT. The repeating period T is a period required for the carriage CR to move a predetermined distance. Each repeating period T can be divided into five intervals T11 to T15 by the change signal CH.

The dark cyan transfer signal TR_DC includes pixel data SI_DC for dark cyan and setting data SP_DC. The dark cyan pixel data SI_DC includes the lower order bit data and the upper order bit data. The lower order bit data are data of the lower bit of 2-bit pixel data, which are in number of 180, each corresponding to the 180 nozzles, and have a data amount of 180 bits. The upper order bit data are data of the upper bit of 2-bit pixel data, which are in number of 180, each corresponding to the 180 nozzles, and have a data amount of 180 bits. Note that, when the pixel data are 01, the lower order bit data is 1. The setting data SP_DC are data needed to create the selection signals q0 to q3. As described later, it is necessary to determine whether the four types of the selection signals q0 to q3 are L level or H level in the five intervals, and thus the setting data SP_DC become a data amount of 20 bits.

The light cyan transfer signal TR_LC includes pixel data SI_LC for light cyan and setting data SP_LC. The light cyan pixel data SI_LC includes 180 bits of the lower order bit data and 180 bits of the upper order bit data. The setting data SP_LC are data needed for creating the selection signals q0 to q3. The setting data SP_LC also are a data amount of 20 bits.

When the dark cyan transfer signal TR_DC is input to the first input section 846A, finally, the setting data SP_DC of the transfer signal TR_DC are set to the first shift register group 842A. Further, when the light cyan transfer signal TR_LC is input to the second input section 846B, finally, the setting data SP_LC of the transfer signal TR_LC are set to the second shift register group 842B. After setting the setting data SP to the first shift register group 842A and the second shift register group 842B, in accordance with the pulse of the latch signal LAT input to the control logic 84, the setting data SP_DC and the setting data SP_LC are latched by the selection signal creation section 844.

The selection signal creation section 844 creates the selection signals q0 to q7, based on 40 bits of the setting data that have been latched and the change signal CH for dividing the repeating period T into five intervals. Then, the selection signal creation section 844 creates the selection signals q0 to q3 based on the setting data SP_DC latched from the first shift register group 842A, and, generates the selection signals q4 to q7 based on the setting data SP_LC latched from the second shift register group 842B.

For example, the selection signal creation section 844 creates the selection signal q0, based on predetermined 5 bits of data (data P00, data P10, data P20, data P30, and data P40) included in the dark cyan transfer signal TR_DC. Further, the selection signal creation section 844 creates the selection signal q4, based on predetermined 5 bits of data (data P04, data P14, data P24, data P34, data P44) included in the light cyan transfer signal TR_LC.

Further, L level or H level in the first interval T11 of the selection signal is determined based on a value of data P0* (* is 0 to 7), L level or H level in the second interval T12 of the selection signal is determined based on a value of data P1* (* is 0 to 7), L level or H level in the selection signal in the third interval T13 is determined based on a value of data P2* (* is 0 to 7), L level or H level in the fourth interval T14 of the selection signal is determined based on a value of data P3* (* is 0 to 7), and L level or H level in the fifth interval T15 of the selection signal is determined based on a value of data P4* (* is 0 to 7). For example, the 5 bits of data (data P00, data P10, data P20, data P30, and data P40) for the selection signal q0 are 10000. As a result, the selection signal q0 is H level in the first interval T11, and is L level in the second interval T112 through the fifth interval T15. Further, it is the same for the selection signals q1 to q7 as in the case of the selection signal q0.

FIG. 20A to FIG. 20D are diagrams describing the state in which data are set to the first shift registers 81A through the third shift registers 81C.

Figure 20A:
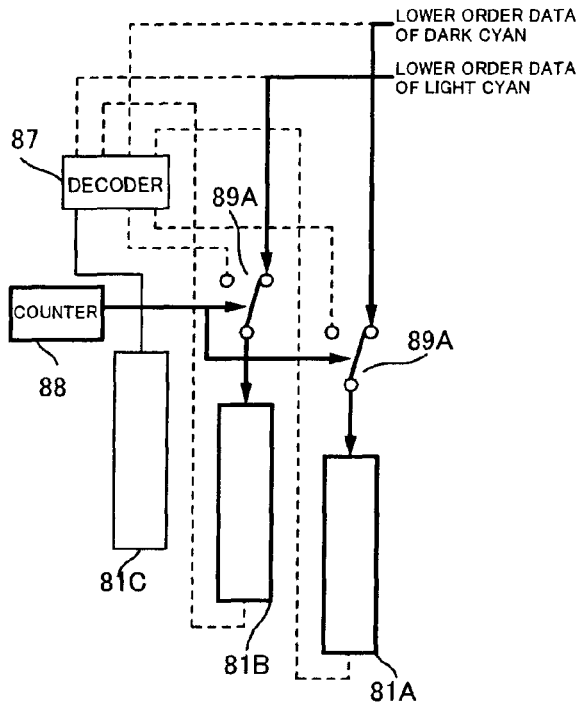
FIG. 20A to FIG. 20D are diagrams describing the state in which data are set to first shift registers 81A through third shift registers 81C.

First, the state in FIG. 20A is explained.

First, the counter 88 is reset by the latch signal LAT, and the counter 88 outputs the L level signal to the first multiplexor 89A and the second multiplexor 89B. For this reason, the first multiplexor 89A outputs the signal from the first shift register group 842A, and the second multiplexor 89B outputs the signal from the second shift register group 842B.

When the dark cyan transfer signal TR_DC is input to the first input section 846A, from the first shift register group 842A of the control logic 84, the lower order bit data of the dark cyan pixel data SI_DC are output in descending order (in order from the lower order bit data corresponding to the nozzle #180). The lower order bit data of the dark cyan pixel data SI_DC are successively transferred to the first shift registers 81A, via the first multiplexor 89A. Further, when the light cyan transfer signal TR_LC is input to the second input section 846B, from the second shift register group 842B of the control logic 84, the lower order bit data of the light cyan pixel data SI_LC are output in descending order. The lower order bit data of the light cyan pixel data SI_LC are successively transferred to the second shift registers 81B, via the second multiplexor 89B.

Figure 20B:
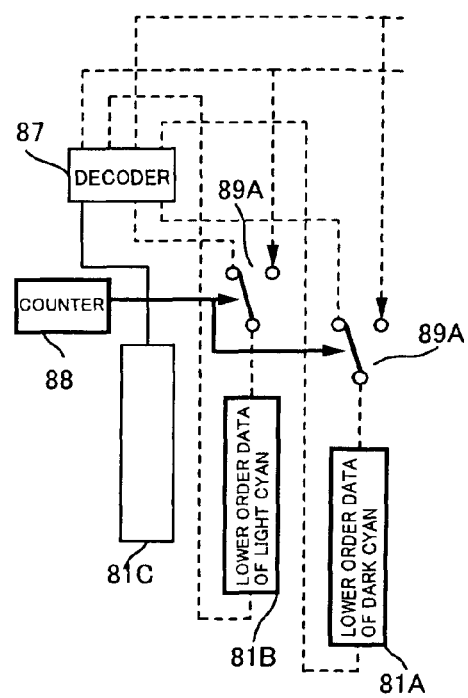

Next, the state in FIG. 20B is explained.

As a result of the lower order bit data of the dark cyan pixel data SI_DC being successively transferred to the first shift registers 81A, the lower order bit data of the pixel data corresponding to each nozzle are held in the first shift registers 81A corresponding to each nozzle. Further, as a result of the lower order bit data of the light cyan pixel data SI_LC being successively transferred to the second shift registers 81B, the lower order bit data of the pixel data corresponding to each nozzle are held in the second shift registers 81B corresponding to each nozzle.

At this timing, the count value of the counter 88 reaches the predetermined value, and the counter 88 outputs the H level signal to the first multiplexor 89A and the second multiplexor 89B. Thus, the first multiplexor 89A outputs the signal from the decoder 87, and the second multiplexor 89B outputs the signal from the decoder 87.

Figure 20C:
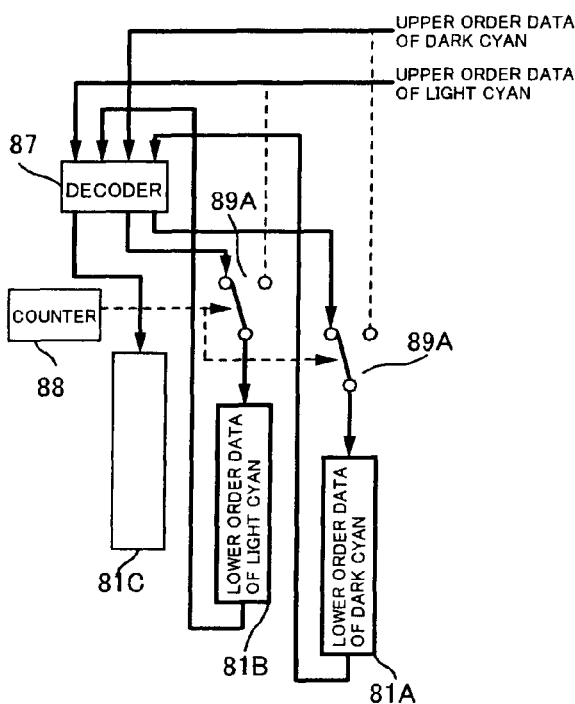

Next, the state in FIG. 20C is explained.

From the first shift register group 842A of the control logic 84, following the lower order bit data of the dark cyan pixel data SI_DC, the upper order bit data of the dark cyan pixel data SI_DC are output in descending order. Further, from the first shift register 81A corresponding to the nozzle #180, the lower order bit data of the dark cyan pixel data SI_DC are output in descending order. Likewise, from the second shift register group 842B of the control logic 84, following the lower order bit data of the light cyan pixel data SI_LC, the upper order bit data of the light cyan pixel data SI_LC are output in descending order. Further, from the second shift register 81B corresponding to the nozzle #180, the lower order bit data of the light cyan pixel data SI_LC are output in descending order.

Namely, the decoder 87 is input with 2 bits of pixel data for dark cyan and 2 bits of pixel data for light cyan, which is a total of 4 bits of data, in descending order. The decoder 87 converts the 4 bits of data that have been input into 3 bits of data. Here, decoding by the decoder 87 is explained.

FIG. 21 is an explanatory diagram of decoding by the decoder 87.

In the eight tone printing, ink droplets are ejected in amounts of 0 pl (minute vibration only with no ejection of ink droplets) when the tone is 0, 1.5 pl (picoliter) when the tone is 1, 3 pl when the tone is 2, 4.5 pl when the tone is 3, 7 pl when the tone is 4, 8.5 pl when the tone is 5, 10 pl when the tone is 6, and 14 pl when the tone is 7.

Further, in the eight tone printing, when showing tone 0 (minute vibration) of a certain pixel, 2 bits of pixel data for light cyan are 00, and 2 bits of pixel data for dark cyan are 00. Likewise, when showing tone 1 (1.5 pl) of a certain pixel, 2 bits of pixel data for light cyan are 01, and 2 bits of pixel data for dark cyan are 00 (other tones are as shown in FIG. 21 so explanation is omitted).

By the way, as described later, in the four tone printing, ink droplets in amounts of 0 pl (minute vibration only with no ejection of ink droplets), 3 pl, 7 pl, and 14 pl are ejected. Namely, the ink droplets which are ejected in the case of tone 0, tone 2, tone 4, and tone 7 in the eight tone printing, are common with the ink droplets which are ejected in the four tone printing.

Therefore, as for the 4 bits of data showing tone 0, tone 2, tone 4, and tone 7, the decoder 87 converts the 4 bits of data into 3 bits of data so that the upper order bit of the 3 bits of data after decoding becomes 0, and the lower two digits of the 3 bits of data after decoding is the same as 2 bits of pixel data in the four tone printing that has common ink droplets. For example, when 4 bits of data showing tone 2 (light cyan pixel data 10, dark cyan pixel data 00) are input, the pixel data of four tone printing which has common ink droplets is 01, and therefore the decoder 87 decodes them to 3 bits of data 001.

Also, as for the 4 bits of data showing tone 1, tone 3, tone 5, and tone 6, the decoder 87 converts the 4 bits of data into 3 bits of data so that the upper order bit of the 3 bits of data after decoding becomes 1, and the value of the pixel data after decoding does not overlap. For example, when the 4 bits of data showing tone 3 (light cyan pixel data 11, dark cyan pixel data 00) are input, the decoder 87 decodes them to 3 bits of data 101.

As a result, the values of the 3 bits of data after decoding are not values in order of tones.

Further, by performing such decoding, the selection signals q0 to q3 at the eight tone printing and the selection signals q0 to q3 at the four tone printing can be made the same. As a result, it is possible to make the setting data for the selection signals q0 to q3 the same at the time of the eight tone printing and the four tone printing.

Explanation is continued by referring back to FIG. 20C. As explained before, the decoder 87 is input with 2 bits of pixel data for dark cyan and 2 bits of pixel data for light cyan, which is a total of 4 bits of data, in descending order. Therefore, the decoder 87 outputs the 3 bits of data after decoding in descending order.

The lower order bit data of the 3 bits of data after decoding are input to the first multiplexor 89A. Since the H level signal is input to the first multiplexor 89A from the counter 88, the lower order bit data of the 3 bits of data after decoding are input to the first shift register 81A corresponding to the nozzle #1. That is, when the 4 bits of data are successively input to the decoder 87, the lower order bit data of the 3 bits of data after decoding are successively transferred to the first shift registers 81A, via the first multiplexor 89A.

The middle order bit data of the 3 bits of data after decoding are input to the second multiplexor 89B. Since the H level signal is input to the second multiplexor 89B from the counter 88, the middle order bit data of the 3 bits of data after decoding are input to the second shift register 81B corresponding to the nozzle #1. That is, when the 4 bits of data are successively input to the decoder 87, the middle order bit data of the 3 bits of data after decoding are successively transferred to the second shift registers 81B, via the second multiplexor 89B.

The upper order bit data of the 3 bits of data after decoding are input to the third shift register 81C corresponding to the nozzle #1. Therefore, when the 4 bits of data are successively input to the decoder 87, the upper order bit data of the 3 bits of data after decoding are successively transferred to the third shift registers 81C.

Figure 20D:
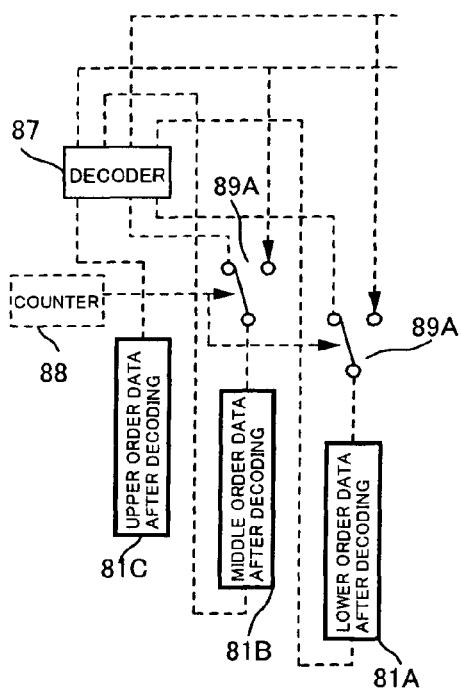

And finally, it turns out to be as shown in FIG. 20D. Namely, the lower order bit data of the 3 bits of data after decoding, which correspond to each of the nozzles, are set to the first shift registers 81A that correspond to each of the nozzles. Further, the middle order bit data of the 3 bits of data after decoding, which correspond to each of the nozzles, are set to the second shift registers 81B that correspond to each of the nozzles. Further, the upper order bit data of 3 bits of data after decoding, which correspond to each of the nozzles, are set to the third shift registers 81C that correspond to each of the nozzles. In this state, when the pulse of the latch signal LAT is input to each of the first latch circuits 82A to the third latch circuits 82C, the lower order bit data after decoding are latched by the first latch circuits 82A, the middle order bit data after decoding are latched by the second latch circuits 82B, and the upper order bit data after decoding are latched by the third latch circuits 82C.

The signal selection section 83 selects one of the selection signals q0 to q7, according to the 3-bit data that has been latched by the first latch circuit 82A to the third latch circuit 82C. The selection signal q0 is selected if the 3-bit data are 000, the selection signal q1 is selected if the 3-bit data are 001, the selection signal q2 is selected if the 3-bit data are 010, and the selection signal q3 is selected if the 3-bit data are 011. Further, the selection signal q4 is selected if the 3-bit data are 100, the selection signal q5 is selected if the 3-bit data are 101, the selection signal q6 is selected if the 3-bit data are 110, and the selection signal q7 is selected if the 3-bit data are 111. Further, any of the selection signals q0 to q3 is selected, if the upper order bit of the 3-bit data (3-bit data after decoding) is 0. Further, any of the selection signals q4 to q7 is selected, if the upper order bit of the 3-bit data is 1. Then, the selection signal that is selected is output from the signal selection section 83 as the switch signal SW.

The drive signal COM and the switch signal SW are input to the switch 86. When the switch signal is H level, the switch 86 becomes on, and the drive signal COM is applied to the piezo element 421. When the switch signal SW is L level, the switch 86 becomes off, and the drive signal COM is not applied to the piezo element 421.

If the tone of cyan of a certain pixel is 0, when pixel data corresponding to the pixel are sent to the head unit 40 from the controller board CTR, they are sent as the pixel data of dark cyan 00 and the pixel data of light cyan 00. The pixel data of dark cyan 00 is input to the first input section 846A, the pixel data of light cyan 00 is input to the second input section 846B, and the total of 4 bits of pixel data are decoded to 3 bits of data 000 by the decoder 87. Since the 3 bits of data after decoding are 000, the signal selection section 83 outputs the selection signal q0 as the switch signal SW. As a result of the switch 86 switching on or off based on the selection signal q0, the piezo element 421 is driven according to the drive pulse PS11, and the ink is subjected to a change in pressure to a degree that does not result in the ejection of ink, and the ink meniscus (the free surface of the ink that is exposed at the nozzle portion) is finely vibrated (refer to FIG. 18).

If the tone of cyan of a certain pixel is 1, the pixel data of dark cyan 00 and the pixel data of light cyan 01 are decoded to 3 bits of data 100 by the decoder 87. Since the 3 bits of data after decoding are 100, the signal selection section 83 selects the selection signal q4, and thus the piezo element 421 is driven according to the drive pulse PS15, and a 1.5 pl ink droplet is ejected from the nozzle (and a dot according to that amount of ink is formed).

If the tone of cyan of a certain pixel is 2, the pixel data of dark cyan 00 and the pixel data of light cyan 10 are decoded to 3 bits of data 001 by the decoder 87. Since the 3 bits of data after decoding are 001, the signal selection section 83 selects the selection signal q1, and thus the piezo element 421 is driven according to the drive pulse PS13, and a 3 pl ink droplet is ejected from the nozzle.

If the tone of cyan of a certain pixel is 3, the pixel data of dark cyan 00 and the pixel data of light cyan 11 are decoded to 3 bits of data 101 by the decoder 87. Since the 3 bits of data after decoding are 101, the signal selection section 83 selects the selection signal q5, and thus the piezo element 421 is driven according to the drive pulse PS13 and the drive pulse PS15, and a 4.5 pl ink droplet is ejected from the nozzle.

If the tone of cyan of a certain pixel is 4, the pixel data of dark cyan 01 and the pixel data of light cyan 00 are decoded to 3 bits of data 010 by the decoder 87. Since the 3 bits of data after decoding are 010, the signal selection section 83 selects the selection signal q2, and the piezo element 421 is driven according to the drive pulse PS12, and a 7 pl ink droplet is ejected from the nozzle.

If the tone of cyan of a certain pixel is 5, the pixel data of dark cyan 01 and the pixel data of light cyan 01 are decoded to 3 bits of data 110 by the decoder 87. Since the 3 bits of data after decoding are 110, the signal selection section 83 selects the selection signal q6, and thus the piezo element 421 is driven according to the drive pulse PS14 and the drive pulse PS15, and a 8.5 pl ink droplet is ejected from the nozzle.

If the tone of cyan of a certain pixel is 6, the pixel data of dark cyan 01 and the pixel data of light cyan 10 are decoded to 3 bits of data 111 by the decoder 87. Since the 3 bits of data after decoding are 111, the signal selection section 83 selects the selection signal q7, and thus the piezo element 421 is driven according to the drive pulse PS12 and the drive pulse PS13, and a 10 pl ink droplet is ejected from the nozzle.

If the tone of cyan of a certain pixel is 7, the pixel data of dark cyan 01 and the pixel data of light cyan 11 are decoded to 3 bits of data 011 by the decoder 87. Since the 3 bits of data after decoding are 011, the signal selection section 83 selects the selection signal q3, and the piezo element 421 is driven according to the drive pulse PS12 and the drive pulse PS14, and a 14 pl ink droplet is ejected from the nozzle.

Movement of the Head Controller HC in Four Tone Printing

Next, movement of the head controller HC performing four tone printing is explained. Here, the movement of the head controller HC for black is explained. Note that, the movement of the head controller HC for yellow is also almost the same.

Figure 22:
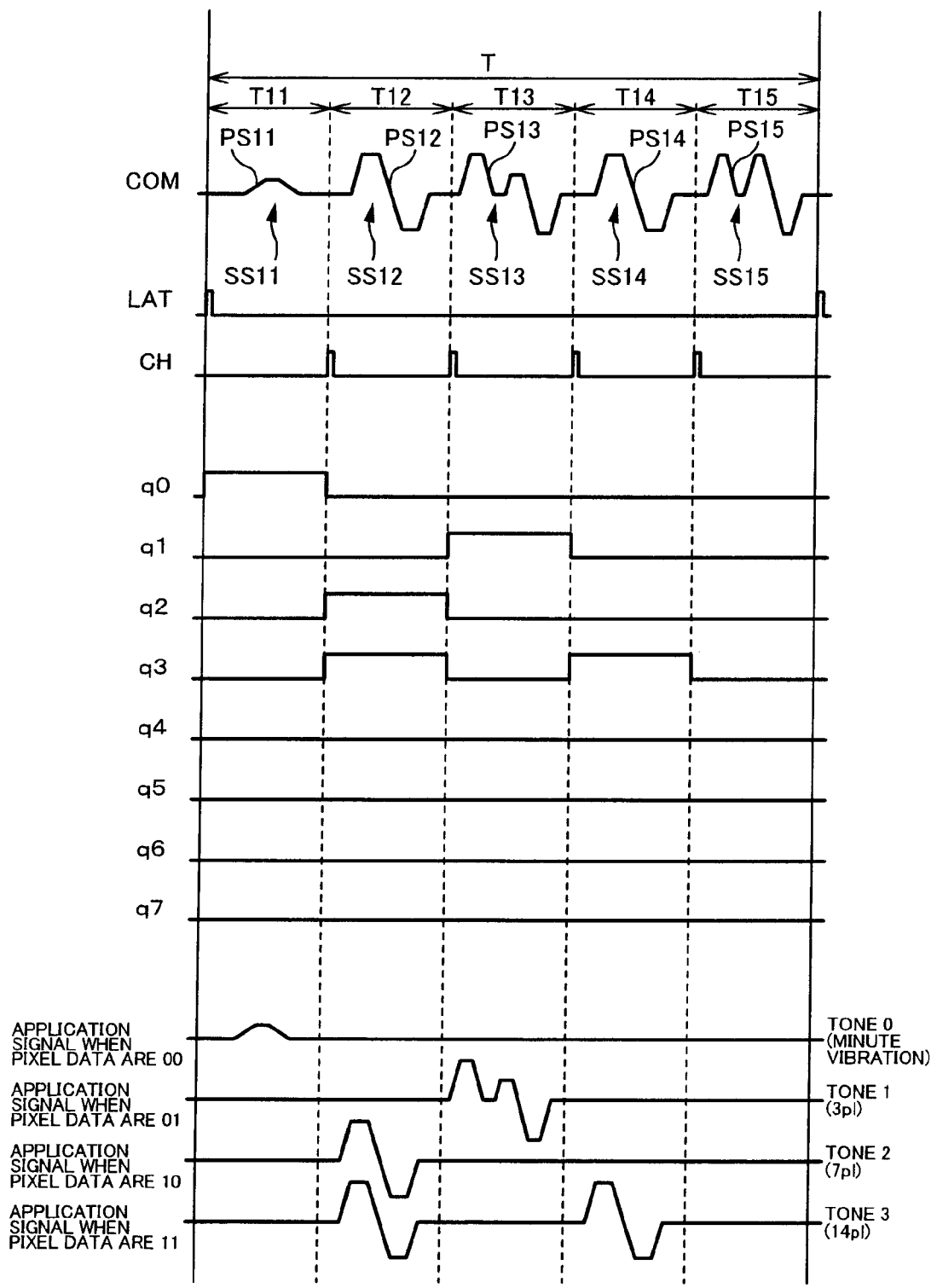
FIG. 22 is an explanatory diagram of the various signals concerning black in the first embodiment.
Figure 23A:
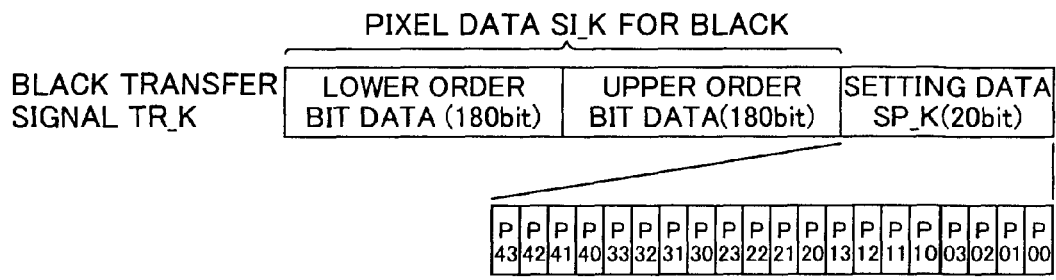
FIG. 23A is an explanatory diagram of a black transfer signal TR_K input to the first input section 846A.
Figure 23B:
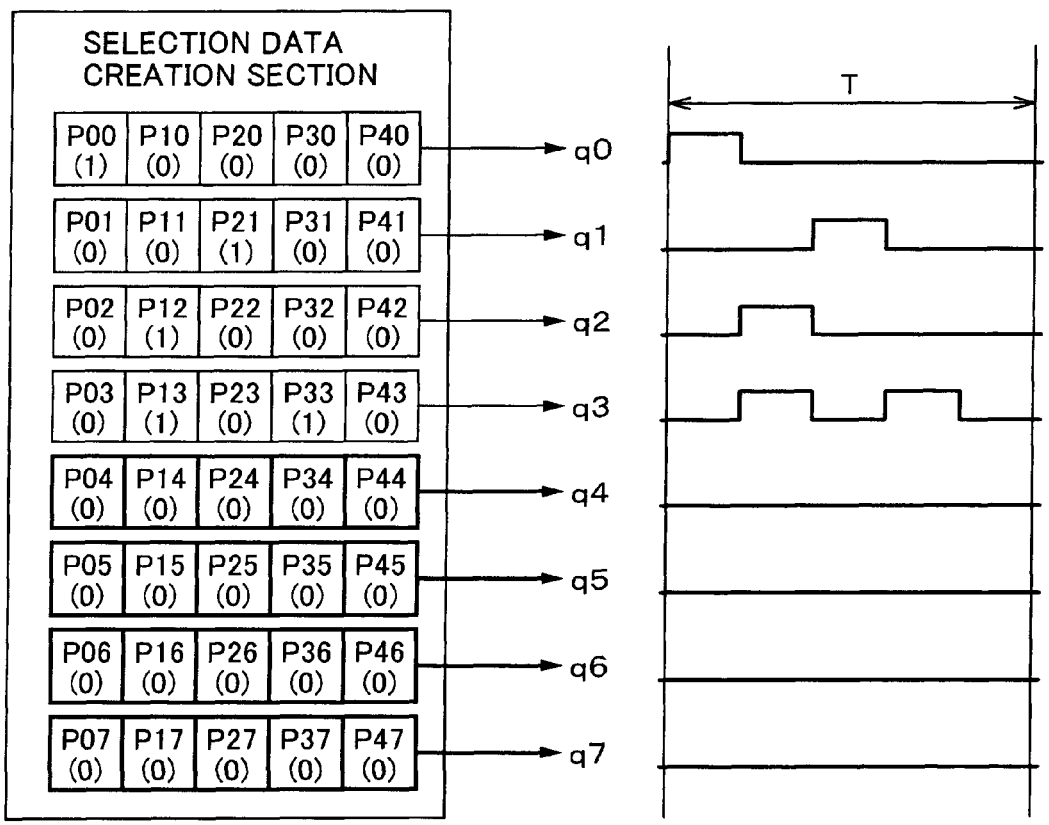
FIG. 23B is an explanatory diagram of the function of the selection signal creation section 844.

FIG. 22 is an explanatory diagram of the various signals concerning black in the first embodiment. FIG. 23A is an explanatory diagram of the black transfer signal TR_K to be input to the first input section 846A. FIG. 23B is an explanatory diagram of the function of the selection signal creation section 844.

The second input section 846B of the head controllers HC of black is connected to GND, and the potential of the second input section 846B becomes L level. The decoder 87 is set so that a decode function is off.

The black transfer signal TR_K includes pixel data SI_K for black and setting data SP_K. The pixel data SI_K is configured with the lower order bit data and the upper order bit data. The lower order bit data are data of the lower bit of 2-bit pixel data, which are in number of 180, each corresponding to the 180 nozzles, and have a data amount of 180 bits. The upper order bit data are data of the upper bit of 2-bit pixel data, which are in number of 180, each corresponding to the 180 nozzles, and have a data amount of 180 bits. The setting data SP_K are data needed to create the selection signals q0 to q3. Since it is necessary to determine whether the four types of the selection signals q0 to q4 are L level or H level in the five intervals T11 through T15, the setting data. SP_K become a data amount of 20 bits.

When the black transfer signal TR_K is input to the first input section 846A, ultimately, the setting data SP_K of the transfer signal TR_K are set to the first shift register group 842A. When the black transfer signal TR_K is input to the first input section 846A, the second input section 846B is connected to GND and is L level. Thus, 0 (data of L level) is set to the second shift register group 842B. After the setting data. SP_K has been set to the first shift register group 842A, in accordance with the pulse of the latch signal LAT to be input to the control logic 84, the setting data SP_K of the first shift register group 842A and 0 of the second shift register group 842B are latched by the selection signal creation section 844.

The selection signal creation section 844 creates the selection signals q0 to q3, based on the setting data SP_K that have been latched from the first shift register group 842A. In this way, as same as in the case of cyan, the selection signal creation section 844 generates the selection signals q0 to q3.

Also, the selection signal creation section 844, as in the case of cyan, generates the selection signals q4 to q7 based on the data latched from the second shift register group 842B. However, since the data latched from the second shift register group 842B is L level, the selection signals q4 to q7 become L level in all the intervals from the first interval T11 through the fifth interval T15.

FIG. 24A to FIG. 24D are diagrams describing the state in which data are set to the first shift registers 81A through the third shift registers 81C.

First, the state in FIG. 24A is explained.

First, the counter 88 is reset by the latch signal LAT, and the counter 88 outputs the L level signal to the first multiplexor 89A and the second multiplexor 89B. For this reason, the first multiplexor 89A outputs the signal from the first shift register group 842A, and the second multiplexor 89B outputs the signal from the second shift register group 842B.

When the black transfer signal TR_K is input to the first input section 846A, from the first shift register group 842A of the control logic 84, the lower order bit data of the black pixel data SI_K are output in descending order, in order from the lower order bit data corresponding to the nozzle #180. The lower order bit data of the black pixel data SI_K are successively transferred to the first shift registers 81A, via the first multiplexor 89A.

On the other hand, since the second input section 846B is connected to GND, the second shift register group 842B of the control logic 84 outputs L level signal. Therefore, the L level data 0 are successively transferred to the second shift registers 81B, via the second multiplexor 89B.

Next, the state in FIG. 24B is explained.

As a result of the lower order bit data of the black pixel data SI_K being successively transferred to the first shift registers 81A, the lower order bit data of the pixel data corresponding to each nozzle are in a state held in the first shift registers 81A corresponding to each nozzle. Further, as a result of the L level data 0 being successively transferred to the second shift registers 81B, the L level data 0 are in a state held in the second shift registers 81B corresponding to each nozzle.

At this timing, the count value of the counter 88 reaches the predetermined value, and the counter 88 outputs the H level signal to the first multiplexor 89A and the second multiplexor 89B. Thus, the first multiplexor 89A outputs the signal from the decoder 87, and the second multiplexor 89B outputs the signal from the decoder 87.

Next, the state in FIG. 24C is explained.

From the first shift register group 842A of the control logic 84, following the lower order bit data of the black pixel data SI_K, the upper order bit data of the black pixel data SI_K are output in descending order. Further, from the first shift register BA corresponding to the nozzle #180, the lower order bit data of the black pixel data SI_DC are output in descending order. Further, the L level data 0 are output from the second shift register group 842B of the control logic 84. The L level data 0 are output from the second shift register 81B corresponding to the nozzle #180.

The decoder 87 of the head controller HC for black is set so that the decode function is off. Therefore, the decoder 87 outputs the signal input from the first shift register 81A corresponding to the nozzle #180 to the first multiplexor 89A, outputs the signal input from the first shift register group 842A to the second multiplexor 89B, and outputs the signal input from the second shift register group 842B to the third shift register 81C corresponding to the nozzle #1.

In other words, the decoder 87 outputs the lower order bit data of the black pixel data SI_K to the first shift registers 81A in descending order via the first multiplexor 89A. Further, the decoder 87 outputs the upper order bit data of the black pixel data SI_K to the second shift registers 81B in descending order, via the second multiplexor 89B. Further, the decoder 87 outputs the L level data 0 to the third shift registers 81C.

And ultimately, the state becomes as shown in FIG. 24D. Namely, the lower order bit data of the pixel data corresponding to each of the nozzles are set to the first shift registers 81A corresponding to each of the nozzles. Further, the upper order bit data of the pixel data corresponding to each of the nozzles are set to the second shift registers 81B corresponding to each of the nozzles. Further, the L level data 0 are set to each of the third shift registers 81C. When the pulse of the latch signal LAT is input to each of the first latch circuits 82A to the third latch circuits 82C in this state, the lower order bit data are latched by the first latch circuits 82A, the upper order bit data are latched by the second latch circuits 82B, and 0 is latched by the third latch circuits 82C.

When seen from the signal selection section 83, the data which are latched by the first latch circuits 82A to the third latch circuits 82C are like 3-bits of data with the upper order bit data as 0. As same as in the case of cyan, the signal selection section 83 selects one of the selection signals q0 to q7, according to the 3-bit data that has been latched by the first latch circuit 82A to the third latch circuit 82C. However, since the upper order bit data is 0 seen from the signal selection section 83, the selection signals q4 to q7 are not selected by the signal selection section 83. Therefore, the signal selection section 83 virtually selects one of the selection signals q0 to q3.

When the black pixel data of a certain pixel are 00 (when the tone is 0), based on the 3-bit-data 000 that has been latched by the first latch circuit 82A to the third latch circuit 82C, the signal selection section 83 selects the selection signal q0, and the first interval signal SS11 of the drive signal COM is applied to the piezo element 421, and the piezo element 421 is driven by the drive pulse PS11. When the piezo element 421 is driven according to the drive pulse PS11, the ink is subjected to a change in pressure to a degree that does not result in the ejection of ink, and the ink meniscus (the free surface of the ink that is exposed at the nozzle portion) is finely vibrated (refer to FIG. 22).

When the pixel data are 01, based on the 3-bit data 001 that has been latched by the first latch circuit 82A through the third latch circuit 82C, the signal selection section 83 selects the selection signal q1, and the third interval signal SS13 of the drive signal COM is applied to the piezo element 421, and the piezo element 421 is driven by the drive pulse PS13. When the piezo element 421 is driven according to the drive pulse PS13, a 3 pl ink droplet is ejected.

When the pixel data are 10, based on the 3-bit data 010 that has been latched by the first latch circuit 82A through the third latch circuit 82C, the signal selection section 83 selects the selection signal q2, and the second interval signal SS12 of the drive signal COM is applied to the piezo element 421, and the piezo element 421 is driven by the drive pulse PS12. When the piezo element 421 is driven according to the drive pulse PS12, a 7 pl ink droplet is ejected.

When the pixel data are 11, based on the 3-bit data 011 that has been latched by the first latch circuit 82A through the third latch circuit 82C, the signal selection section 83 selects the selection signal q3, and the second interval signal SS12 and the fourth interval signal SS14 of the drive signal COM are applied to the piezo element 421, and the piezo element 421 is driven by the drive pulse PS12 and the drive pulse PS14. When the piezo element 421 is driven according to the drive pulse PS12 and the drive pulse PS14, a 14 pl ink droplet is ejected.

It should be noted that since the upper order bit data of the 3-bit pixel data are 0 seen from the signal selection section 83, the selection signals q4 to q7, which are L level in all intervals, are not selected by the signal selection section 83.

The printer in this embodiment described above is a printer that prints black and yellow in four tones, and magenta and cyan in eight tones. In other words, the printer in this embodiment is a printer that is different from the six-color four tone printer shown in FIG. 14. However, the controller board CTR of this embodiment and the common controller board CTR of the four-color six tone printer can be made common. Thus, it becomes possible to cut down on costs of the printer.

Also in this embodiment, the head controller HC_K for black and the head controller HC_Y for yellow have same configuration as the head controller HC_M for magenta and the head controller HC_C for cyan. Thus, their parts can be made common, and it becomes possible to cut down on costs of the printer.

Second Embodiment

In the first embodiment described above, for cyan and magenta the eight tone printing is performed. However in the second embodiment described below, for cyan and magenta the six tone printing is performed. Further, in the first embodiment described above the setting data for generating the selection signals q0 to q3 are input only from the first input section 846A, however, in the second embodiment described below, some of the setting data for generating the selection signals q0 to q3 are input from the second input section 846B. In the first embodiment described above the type of the drive signal COM was only one, however, in the second embodiment described below, there are two types of drive signals COM.

Configuration of the Head Controller HC

Figure 25:
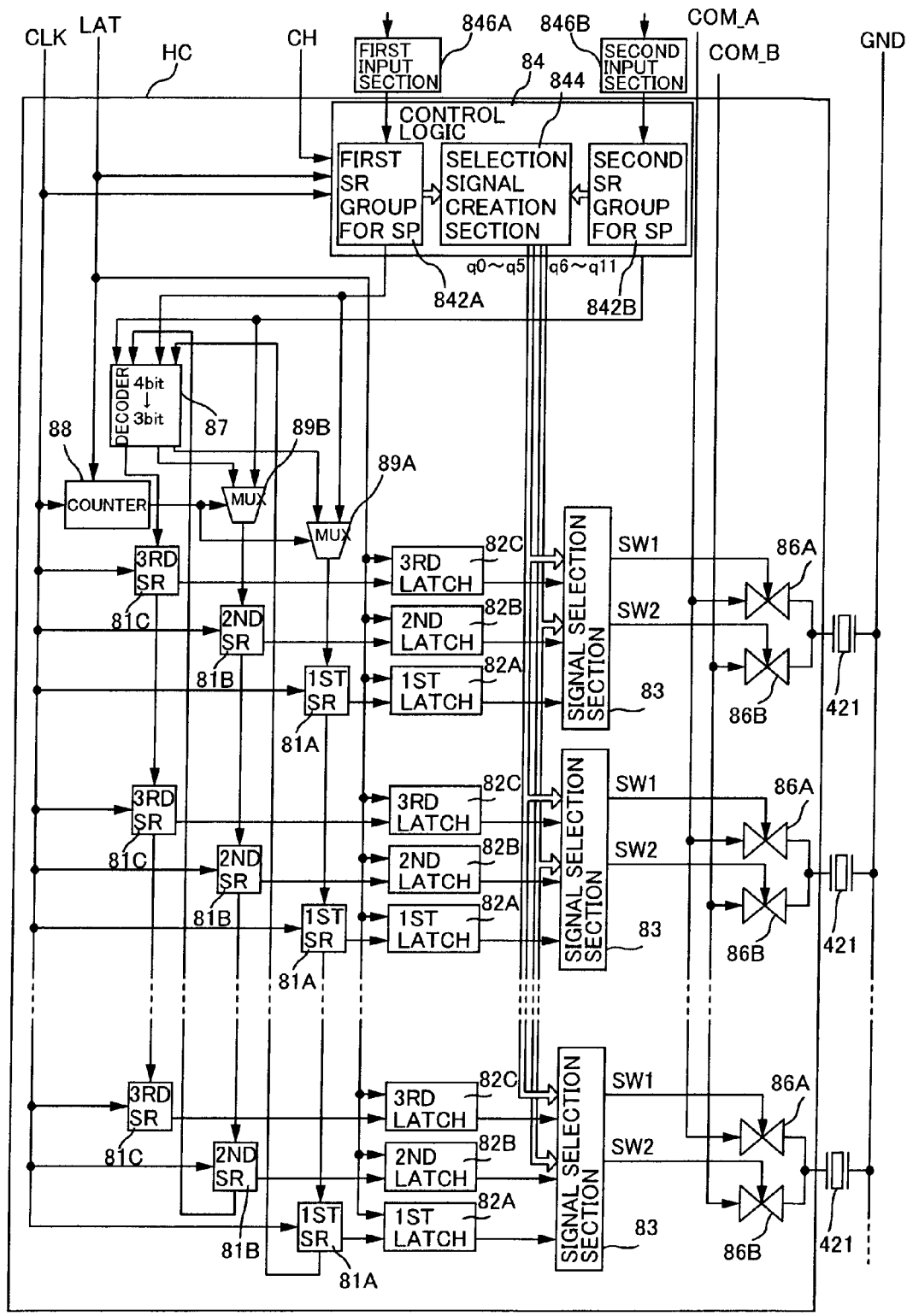
FIG. 25 is a block diagram of the head controller HC in the second embodiment.

FIG. 25 is a block diagram of the head controller HC of the second embodiment.

As compared with the first embodiment, in the second embodiment, two types of change signals (first change signal CH_A and second change signal CH_B) are input to the head controller HC (to be precise, to the control logic 84). Further, in the second embodiment, two types of the drive signals (first drive signal COM_A and second drive signal COM_B) are input to the head controller HC. Further, each of the piezo elements 421 are provided with two switches (a first switch 86A and a second switch 86B), and the first drive signal COM_A is input to one switch, and the second drive signal COM_B is input to the other switch. Each of the signal selection sections outputs two switch signals (a first switch signal SW_A and a second switch signal SW_B), and one switch signal is input to the first switch 86A and the other switch signal is input to the second switch 86B.

In the second embodiment as well, the common head controller HC is used for cyan and magenta for which six tone printing is performed, and for black and yellow for which four tone printing is performed. Hereinbelow, the six tone printing and the four tone printing in the second embodiment are described.

Movement of the Head Controller HC in Six Tone Printing

First, movement of the head controller HC performing six tone printing is explained. Here, the movement of the head controller HC for cyan is explained. Note that, the movement of the head controller HC for magenta is also almost the same.

Figure 26:
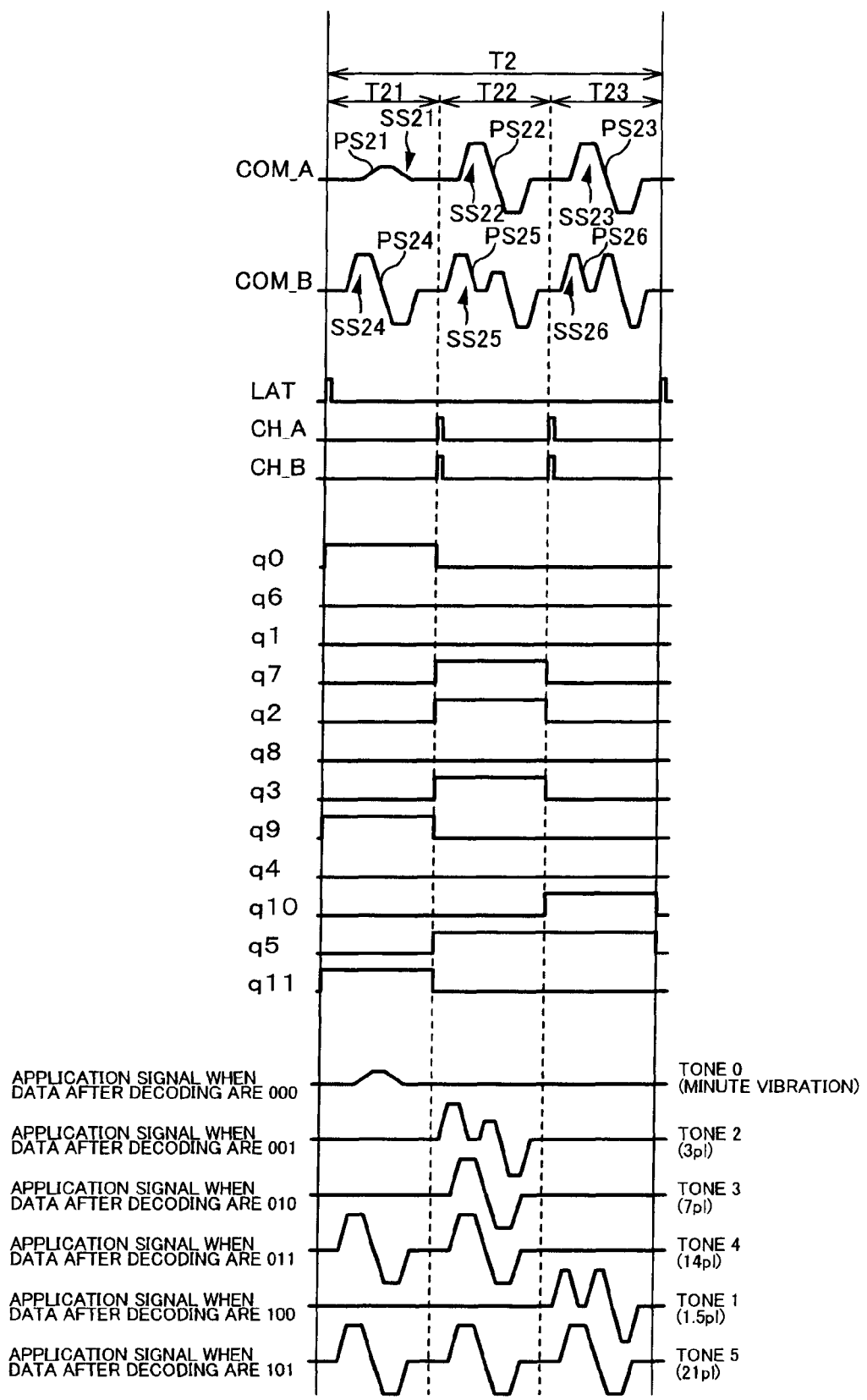
FIG. 26 is an explanatory diagram of the various signals concerning cyan in the second embodiment.

FIG. 26 is an explanatory diagram of the various signals concerning cyan in the second embodiment. FIG. 27A is an explanatory diagram of the dark cyan transfer signal TR_DC input to the first input section 846A, and the light cyan transfer signal TR_LC input to the second input section 846B. FIG. 27B is an explanatory diagram of the function of the selection signal creation section 844.

In the second embodiment, the first drive signal COM_A and the second drive signal COM_B are repeatedly generated for each repeating period T2 which is set by the latch signal LAT. The repeating period T2 is a period required for the carriage CR to move a predetermined distance. Each repeating period T2 can be divided into three intervals T21 to T23, with the first change signal CH_A and the second change signal CH_B. It should be noted that here for the sake of simplifying the description, the pulses of the first change signal CH_A and the second change signal CH_B have the same timing, but it is not absolutely necessary for to match their timings. Further, in the case where timing of the pulses of the first change signal CH_A and the second change signal CH_B do not match, the selection signal creation section 844 creates the selection signals q0 to q5 (described later on) in accordance with the interval based on the latch signal LAT and the first change signal CH_A, generates the selection signals q6 to q11 (described later on) in accordance with the interval based on the latch signal LAT and the second change signal CH_B.

As in the first embodiment described above, the dark cyan transfer signal TR_DC is input to the first input section 846A, and the light cyan transfer signal TR_LC is input to the second input section 846B. The setting data SI_DC of the dark cyan transfer signal TR_DC is set to the first shift register group 842A, the setting data SI_LC of the light cyan transfer signal TR_LC is set to the second shift register group 842B. And according to the pulse of the latch signal LAT, the setting signal TR_DC and the setting signal TR_LC are latched by the selection signal creation section 844. Movement up to here is almost the same as the first embodiment described above.

However, different from the first embodiment described above, the setting data SP_DC of the second embodiment are a data amount of 20 bits including 4 bits of dummy data. Also, different from the first embodiment described above, the setting data SP_DC are data for determining whether the selection signals q0 to q3 and the selection signals q6 to q9 are L level or H level in the first interval T21 and the second interval T22. It should be noted that the 4 bits of dummy data are for matching the data amount of the setting data SP_DC with the data amount of the setting data SP_LC. The setting data SP_LC of the second embodiment are a data amount of 20 bits, however, different from the first embodiment described above, the setting data SP_LC are configured from data for determining whether the selection signals q0 to q3 and the selection signals q6 to q9 are L level or H level in the third interval T23, and data for determining whether the selection signals q4, q5, q10, and q11 are L level or H level in the first interval T21 through the third interval T23.

The selection signal creation section 844 creates the selection signals q0 to q5, based on the setting data that have been latched and the first change signal CH_A for dividing the repeating period T into three intervals. Then, the selection signal creation section 844 creates the selection signals q6 to q11 based on the latched setting data and the second change signal CH_B for dividing the repeating period T into three intervals. It should be noted that here, for the sake of simplifying the description, the pulses of the first change signal CH_A and the second change signal CH_B have the same timing, but it is not absolutely necessary for their timings to match. The selection signals q0 to q3 and q6 to q9 are created based on the setting data SP_DC and the setting data SP_LC. On the other hand, the setting signals q4, q5, q10, and q11 are created based on the setting data SP_LC.

For example, the selection signal creation section 844 creates the selection signal q0 based on the data P000, data P100, and data P200. It should be noted that the data P000 and the data P100 are data included in the dark cyan transfer signal TR_DC, whereas the data P200 are data included in the light cyan transfer signal TR_LC. Similarly, the selection signal creation section 844 creates the selection signals q1 to q3 and q6 to q9, based on two bits of data included in the dark cyan transfer signal TR_DC and one bit of data included in the light cyan transfer signal TR_LC.

It should be noted that the selection signals q4, q5, q10, and q11 are created based on predetermined 3 bits of data that have been included in the light cyan transfer signal TR_LC. For example, the selection signal creation section 844 creates the selection signal q4, based on the data P004, data P104, and data P204.

As in the first embodiment described above, the dark cyan pixel data SI_DC are input from the first input section 846A, and the light cyan pixel data SI_LC are input from the second input section 846B. As in the first embodiment described above, the decoder 87 decodes 4 bits of data of each of the pixels to 3 bits of data, based on the dark cyan pixel data SI_DC and the light cyan pixel data SI_LC. However, in the second embodiment, the decoding of the decoder 87 differs from the first embodiment.

FIG. 28 is an explanatory diagram of the decoding by the decoder 87 of the second embodiment.

In the six tone printing of this embodiment, ink droplets are ejected in amounts of 0 pl (minute vibration only with no ejection of ink droplets) when the tone is 0, 1.5 pl (picoliter) when the tone is 1, 3 pl when the tone is 2, 7 pl when the tone is 3, 14 pl when the tone is 4, and 21 pl when the tone is 5.

Further, in the six tone printing, when showing tone 0 (minute vibration) of a certain pixel, 2 bits of pixel data for light cyan are 00, and 2 bits of pixel data for dark cyan are 00. Likewise, when showing tone 1 (3 pl) of a certain pixel, 2 bits of pixel data for light cyan are 01, and 2 bits of pixel data for dark cyan are 00 (other tones are as shown in FIG. 28 so explanation is omitted).

By the way, as described later, in the four tone printing of the second embodiment, ink droplets in amounts of 0 pl (minute vibration only with no ejection of ink droplets), 3 pl, 7 pl, and 14 pl are ejected. Namely, the ink droplets which are ejected in the case of tone 0, and tone 2 to tone 4 in the six tone printing of the second embodiment, are common with the ink droplets which are ejected in the case of the four tone printing.

Therefore, as for the 4 bits of data showing tone 0, and tone 2 to tone 4, the decoder 87 converts the 4 bits of data into 3 bits of data so that the upper order bit of the 3 bits of data after decoding become 0, and the lower 2 digits of the 3 bits of data after decoding is the same as 2 bits of pixel data in the four tone printing that has common ink droplets. For example, when 4 bits of data showing tone 2 (light cyan pixel data 10, dark cyan pixel data 00) are input, the pixel data of four tone printing which has common ink droplets is 01, and therefore the decoder 87 decodes them to 3 bits of data 001.

Also, as for the 4 bits of data showing tone 1 and tone 5, the decoder 87 converts the 4 bits of data into 3 bits of data so that the upper order bit of the 3 bits of data after decoding becomes 1, and the value of pixel data after decoding does not overlap. For example, when the 4 bits of data showing tone 5 (light cyan pixel data 01, dark cyan pixel data 01) are input, the decoder 87 decodes them to 3 bits of data 101.

As a result, also in the second embodiment, the values of the 3 bits of data after decoding are not values in order of tones.

The three bits of data decoded as mentioned above are, as in the first embodiment described above, set to the first shift registers 81A through the third shift registers 81C. According to the pulse of the latch signal LAT, the decoded three bits of data are latched in the first latch circuit 82A to the third latch circuit 82C. Movement up to here is almost same as the first embodiment described above.

FIG. 29 is a table of the relationship between the decoded 3-bit data and the selection signal that should be selected by the signal selection section.

The signal selection section 83 selects one of the selection signals q0 to q5 and one of the selection signals q6 to q11, according to the 3-bit data that have been latched by the first latch circuit 82A to the third latch circuit 82C. The selection signals q0 and q6 are selected if the 3-bit data are 000, the selection signals q1 and q7 are selected if the 3-bit data are 001, the selection signals q2 and q8 are selected if the 3-bit data are 010, the selection signals q3 and q9 are selected if the 3-bit data are 011, the selection signals q4 and q10 are selected if the 3-bit data are 100, and the selection signals q5 and q11 are selected if the 3-bit data are 101. It should be noted that if the upper order bit of the 3-bit data is 0, any of the selection signals q0 to q3 is selected, and any of the selection signals q6 to q9 is selected. If the upper order bit of the 3-bit pixel data (the pixel data after decoding) is 1, either the selection signal q4 or q5 is selected, and either the selection signal q10 or q11 is selected.

The selection signal selected from the selection signals q0 to q5 is output from the signal selection section 83 as the first switch signal SW_A. The selection signal selected from the selection signals q6 to q11 is output from the signal selection section 83 as the second switch signal SW_B.

The first drive signal COM_A and the first switch signal SW_A are input to the first switch 86A. When the first switch signal SW_A is H level, the first switch 86A becomes on, and the first drive signal COM_A is applied to the piezo element 421. When the first switch signal SW_A is L level, the first switch 86A becomes off, and the first drive signal COM_A is not applied to the piezo element 421.

Similarly, the second drive signal COM_B and the second switch signal SW_B are input to the second switch 86B. When the second switch signal SW_B is H level, the second switch 86B becomes on, and the second drive signal COM_B is applied to the piezo element 421. When the second switch signal SW_B is L level, the second switch 86B becomes off, and the second drive signal COM_B is not applied to the piezo element 421.

If the tone of cyan of a certain pixel is 0, when pixel data corresponding to the pixel are sent to the head unit 40 from the controller board CTR, they are sent as the pixel data of dark cyan 00 and the pixel data of light cyan 00. The pixel data of dark cyan 00 are input to the first input section 846A, the pixel data of light cyan 00 are input to the second input section 846B, and the total of 4 bits of pixel data are decoded to 3 bits of data 000 by the decoder 87. Since 3 bits of data after decoding are 000, the signal selection section 83 outputs the selection signal q0 as the first switch signal SW_A, and outputs the selection signal q6 as the second switch signal SW_B. As the result of the first switch 86A switching on or off based on the selection signal q0, and the second switch 86B switching on or off based on the selection signal q6, the piezo element 421 is driven according to the drive pulse PS21, and the ink is subjected to a change in pressure to a degree that does not result in the ejection of ink, and the ink meniscus (the free surface of the ink that is exposed at the nozzle portion) is finely vibrated.

If the tone of cyan of a certain pixel is 1, the pixel data of dark cyan 00 and the pixel data of light cyan 01 are decoded to 3 bits of data 100 by the decoder 87. Since the 3 bits of data after decoding are 100, the signal selection section 83 selects the selection signal q4 and the selection signal 10, and thus the piezo element 421 is driven according to the drive pulse PS26, and a 1.5 pl ink droplet is ejected from the nozzle (and a dot according to that amount of ink is formed).

If the tone of cyan of a certain pixel is 2, the pixel data of dark cyan 00 and the pixel data of light cyan 10 are decoded to 3 bits of data 001 by the decoder 87. Since the 3 bits of data after decoding are 001, the signal selection section 83 selects the selection signals q1 and q7, and thus the piezo element 421 is driven according to the drive pulse PS25, and a 3 pl ink droplet is ejected from the nozzle.

If the tone of cyan of a certain pixel is 3, the pixel data of dark cyan 00 and the pixel data of light cyan 11 are decoded to 3 bits of data 010 by the decoder 87. Since the 3 bits of data after decoding are 010, the signal selection section 83 selects the selection signals q2 and q8, and thus the piezo element 421 is driven according to the drive pulse PS22, and a 7 pl ink droplet is ejected from the nozzle.

If the tone of cyan of a certain pixel is 4, the pixel data of dark cyan 01 and the pixel data of light cyan 00 are decoded to 3 bits of data 011 by the decoder 87. Since the 3 bits of data after decoding are 011, the signal selection section 83 selects the selection signals q3 and q9, and the piezo element 421 is driven according to the drive signal PS24 and the drive pulse PS22, and a 14 pl ink droplet is ejected from the nozzle.

If the tone of cyan of a certain pixel is 5, the pixel data of dark cyan 01 and the pixel data of light cyan 01 are decoded to 3 bits of data 101 by the decoder 87. Since the 3 bits of data after decoding are 101, the signal selection section 83 selects the selection signal q4 and the selection signal 10, and thus the piezo element 421 is driven according to the drive pulse PS24, the drive pulse PS22, and the drive pulse PS23, and a 21 pl ink droplet is ejected from the nozzle.

Movement of the Head Controller HC in Four Tone Printing

Next, movement of the head controller HC performing four tone printing is explained. Here, the movement of the head controller HC for black is explained. Note that, the movement of the head controller HC for yellow is also almost the same.

Figure 30:
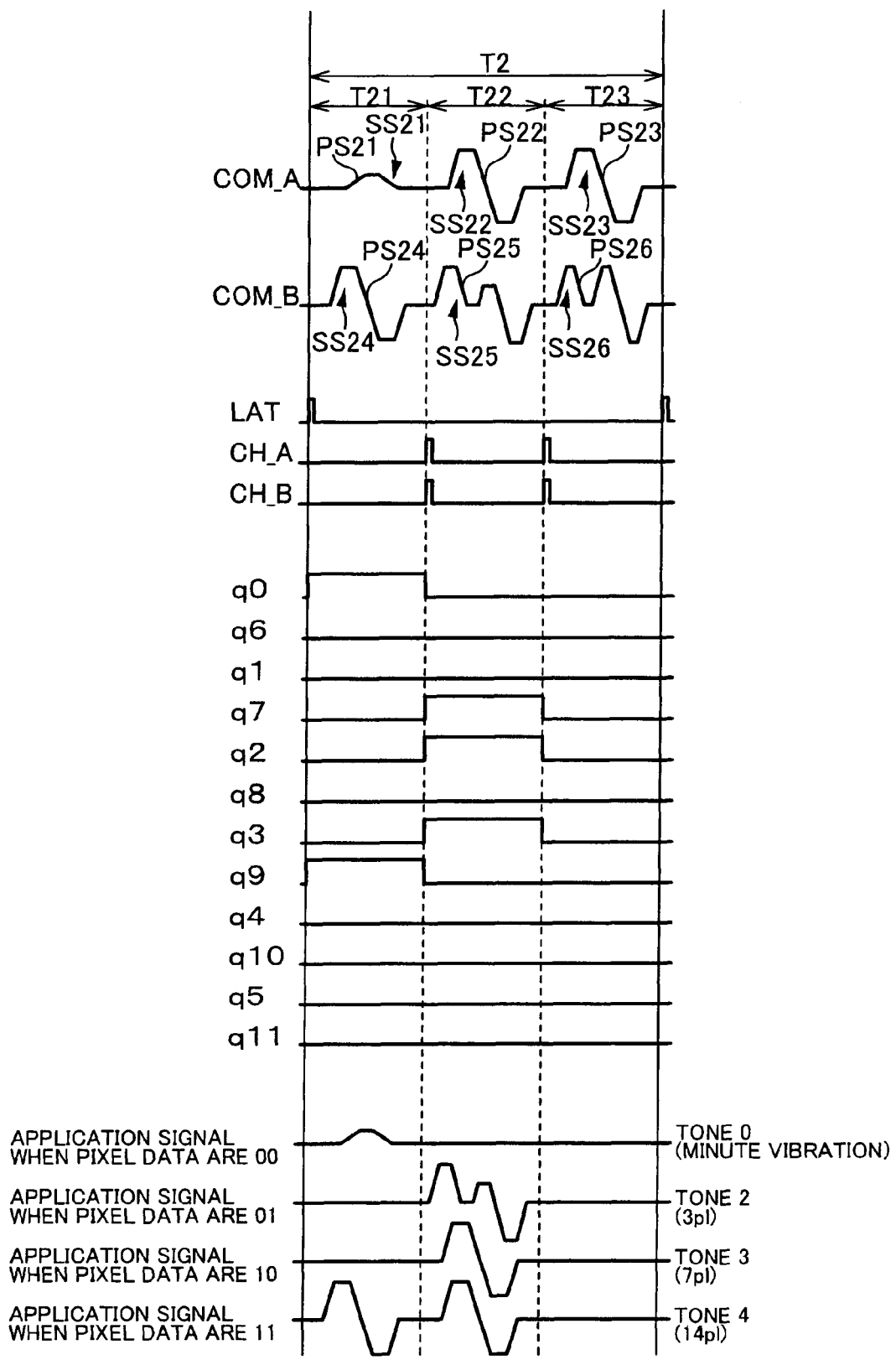
FIG. 30 is an explanatory diagram of the various signals concerning black in the second embodiment.
Figure 31A:
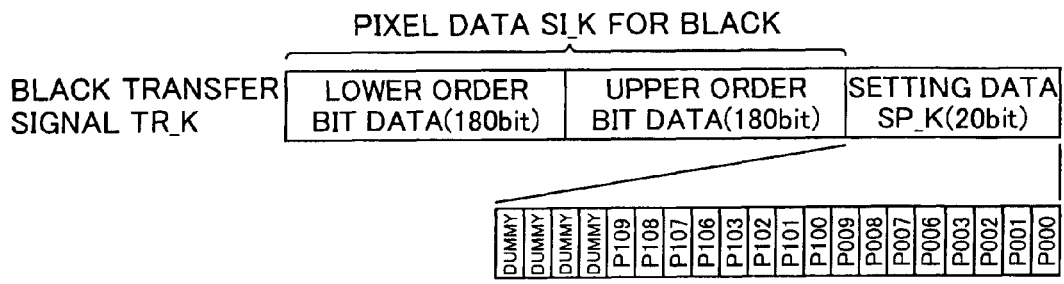
FIG. 31A is an explanatory diagram of the black transfer signal TR_K input to the first input section 846A.
Figure 31B:
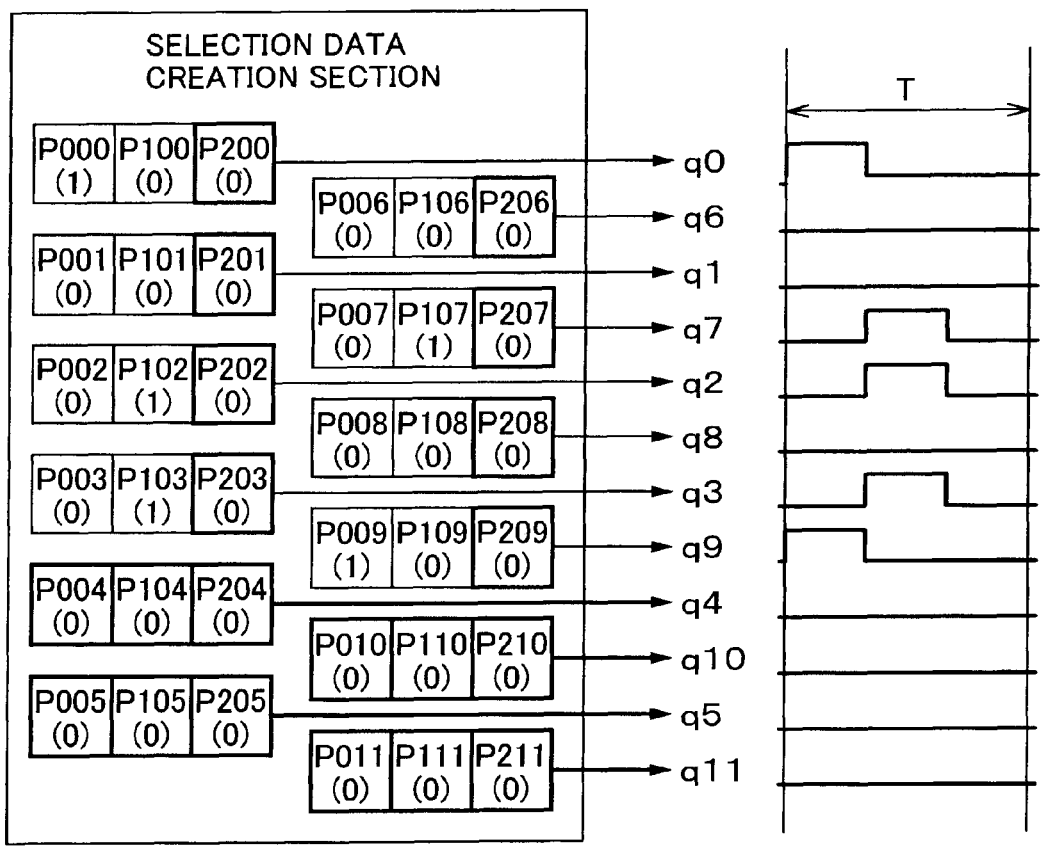
FIG. 31B is an explanatory diagram of the function of the selection signal creation section 844.

FIG. 30 is an explanatory diagram of the various signals concerning black in the second embodiment. FIG. 31A is an explanatory diagram of the black transfer signal TR_K input to the first input section 846A. FIG. 31B is an explanatory diagram of the function of the selection signal creation section 844.

Also in the second embodiment, the second input section 846B of the head controller HC of black is connected to the GND, and the potential of the second input section 846B is L level. Further, the decoder 87 is set so that a decode function is off.

The black transfer signal TR_K includes pixel data SI_K for black and setting data SP_K. The pixel data SI_K is configured with the lower order bit data and the upper order bit data. The lower order bit data are data of the lower bit of 2-bit pixel data, which are in number of 180, each corresponding to the 180 nozzles, and have a data amount of 180 bits. The upper order bit data are data of the upper bit of 2-bit pixel data, which are in number of 180, each corresponding to the 180 nozzles, and have a data amount of 180 bits. The setting data SP_K are 20 bits of data amount including 4 bits of dummy data. Also, the setting data SP_K are data for determining whether the selection signals q0 to q3 and the selection signals q6 to q9 are L level or H level in the first interval T21 and the second interval T22.

When the black transfer signal TR_K is input to the first input section 846A, ultimately, the setting data SP_K of the transfer signal TR_K are set to the first shift register group 842A. When the black transfer signal TR_K is input to the first input section 846A, the second input section 846B is connected to GND and is L level. Thus, 0 (data of L level) is set to the second shift register group 842B. After setting the setting data SP_K to the first shift register group 842A, in accordance with the pulse of the latch signal LAT input to the control logic 84, the setting data SP_K of the first shift register group 842A and 0 of the second shift register group 842B are latched by the selection signal creation section 844.

When generating the selection signals q0 to q3 and the selection signals q6 to q9, the selection signal creation section 844 sets the first interval T21 and the second interval T22 to L level or H level according to the setting data SP_K latched from the first shift register group 842A. The selection signal creation section 844 sets the third interval T25 of the selection signals q0 to q3 and the selection signals q6 to q9 to the L level, according to the L level data from the second shift register group 842B. Thus, the selection signal creation section 844 creates the same selection signals q0 to q3 and the selection signals q6 to q9 as in the six tone printing.

The selection signal creation section 844, like in the case of six tone printing, creates selection signals q4, q5, q10, and q11 based on the data latched from the second shift register group 842B. However, since the data latched from the second shift register group 842B are L level, the selection signals q4, q5, q10, and q11 become L level in all intervals from the first interval T21 through the third interval T23.

Like in the first embodiment described above, in the case of the black pixel data SI_K, ultimately, the lower order bit data are set to each of the first shift registers 81A, the upper order bit data are set to each of the second shift registers 81B, and the L level data 0 are set to each of the third shift registers. In such state, when the pulse of the latch signal LAT is input to each of the first latch circuits 82A to the third latch circuits 82C, the lower order bit data are latched by the first latch circuits 82A, the upper order bit data are latched by the second latch circuits 82B, and 0 are latched by the third latch circuits 82C.

Seeing the data that are latched by the first latch circuit 82A through the third latch circuit 82C from the signal selection section 83, the data are 3 bits of data with upper order bit data 0. Then, as in the case of cyan, the signal selection section 83 selects one of the selection signals q0 to q5, one of the selection signals q6 to q11, according to the 3-bit data that has been latched by the first latch circuit 82A to the third latch circuit 82C. However, since the upper order bit data are 0 when seen from the signal selection section 83, the selection signals q4, q5, q10, and q11 are not selected by the signal selection section 83. Thus, in practical terms, the signal selection section 83 selects one of the selection signals q0 to q3, and one of the selection signals q6 to q9.

Thus, the ink meniscus is finely vibrated if the pixel data are 00, a 3 pl ink droplet is ejected to form a small dot if the pixel data are 01, a 7 pl ink droplet is ejected to form a medium dot if the pixel data are 10, and a 14 pl ink droplet is ejected to form a large dot if the pixel data are 11 (refer to FIG. 30).

With the above second embodiment, it is possible to achieve the same effect as the aforementioned first embodiment.

It should be noted that when driving the piezo elements 421 by using two types of drive signals as in the second embodiment, the two drive signals can be divided into numerous different waveforms and input, and thus the repeating period T2 becomes shorter and the amount of data of setting data becomes larger because the amount of setting data increases. Regardless of this, during a given repeating period T2 it is necessary to set the pixel data and the setting data for the next repeating period T2. In the second embodiment, the time required for setting the data can be shortened, and thus during the short repeating period T2 it is possible to set the pixel data and the setting data for the next repeating period T2, and this is particularly effective.

Also, in the second embodiment, the selection signals q0 to q3 and the selection signals q6 to q9 are determined whether they are L level or H level, based on not only the setting data that are input to the first input section 846A but also the signal that is input to the second input section 846B. Thus, the amount of setting data to be input to the first input section 846A can be reduced, and thus, in the second embodiment, the time that is required for setting the data can be shortened even more.

Other Embodiments

The foregoing embodiments are for the purpose of facilitating understanding of the present invention, and are not to be interpreted as limiting the present invention. The invention can of course be altered and improved without departing from the gist thereof, and includes functional equivalents. In particular, embodiments mentioned below are also included in the present invention.

Regarding the Printer

In the foregoing embodiments, a printer which prints an image on a paper was described as describing the printing apparatus, but the printing apparatus is not limited to a printer. The printing technology of the foregoing embodiments can also be adopted for other types of printing apparatuses. As for the examples of other types of printing apparatuses (printing methods), there are textile printing apparatuses for printing patterns on a cloth, circuit pattern printing apparatuses that print circuit patterns on a circuit board, DNA chip printing apparatuses that print on DNA chips by applying onto a chip a solution with DNA dissolved therein, and display manufacture apparatuses of Organic Light Emitting Diode display and the like.

Regarding the Carriage

In the foregoing embodiments a head was mounted on a carriage, however, the head does not always have to be mounted on the carriage. For example, in the case of a so-called line printer, numerous heads are fixed along the width direction on a paper, and therefore the carriage is not needed. However, the technology of the foregoing embodiments can be adopted even in the case of such line printer.

Regarding the Nozzles

In the foregoing embodiments, the ink was ejected using piezoelectric elements. However, the method for ejecting liquid is not limited to such. For example, it is possible to employ other methods such as the method which uses a heater as the drive element to eject ink.

Regarding the Transfer Signal TR

In the foregoing embodiments, two transfer signals are input to each of the head controllers. In other words, each of the head controllers were provided with two input sections for inputting the transfer signal TR, but there is no limitation to this. For example, it is also possible that third input section is provided to each of the head controllers, as well as the first input section and the second input section, so that three transfer signals TR can be input. As a matter of course, more than three input sections can be provided to each of the head controllers. Thus, transfer data showing much more tones can be input to the head controller.

Regarding the Drive Signal COM

In the foregoing second embodiment, there were two types of drive signals. However there can be three or more types.

CONCLUSION (1) The printer discussed above is provided with a controller board CTR, a cable CBL, a head 41, and six or four head controllers HC (see FIGS. 14 and 16).

The controller board CTR discussed above is provided with six output terminals for outputting transfer signal TR (see FIGS. 14 and 16). And the transfer signal TR including pixel data SI is output from the output terminal. Namely, the controller board CTR discussed above corresponds to an output section that is provided with a predetermined number of output terminals, and that outputs pixel data from each of the output terminals respectively.

Furthermore, the cable CBL discussed above has six transmission lines for transmitting the transfer signal TR (including the pixel data) output from the six output terminals respectively (see FIGS. 14 and 16). Namely, the cable CBL discussed above has the predetermined number of transmission lines for transmitting the pixel data that are outputted from the predetermined number of the output terminals respectively.

Furthermore, the head 41 discussed above can eject four colors of ink of CMYK and has nozzle groups for each of the ink colors (FIG. 4B). Namely, the head 41 can eject a plurality of colors of inks, and has a nozzle group for each of the colors of the inks.

Furthermore, each of the head controllers HC discussed above causes the ink to be ejected from the nozzle group based on the pixel data (see FIGS. 17 to 19), and are provided corresponding to each of the colors of the inks (see FIGS. 14 and 16).

By the way, in the case of the six-color four tone printer discussed above, to output the transfer signal TR for four tone printing for six colors from the output terminal, the controller board CTR has six output terminals, and it is configured to output the transfer signal TR including 2 bits of pixel data for each of the nozzles from each of the output terminals.

Aside from such six-color four tone printer, there are cases where a printer which prints black and yellow in four tones, magenta and cyan in eight tones is manufactured. When manufacturing this printer, if the controller board CTR is configured as shown in FIG. 15, parts of the controller board CTR of this printer and that of the six-color four tone printer cannot be made common.

Here, same as the controller board CTR in FIG. 14, the common controller board CTR of the first embodiment and the second embodiment are configured to have six output terminals, and to output the transfer signal TR including 2 bits of pixel data for each nozzle from each of the output terminals (see FIG. 16). Therefore, for example, even though the head 41 ejects cyan ink and does not eject dark cyan ink or light cyan ink, this controller board CTR outputs transfer signal TR_DC for dark cyan and transfer signal TR_LC for light cyan. As a result, in this printer, the number of the output terminals that output the transfer signal TR in the controller board CTR (six) is larger than the number of the ink colors (four).

And, for example, in the case of the head controller HC for cyan discussed above, based on the transfer signal TR_DC for dark cyan and the transfer signal TR_LC for light cyan transmitted by the two transmission lines, an ink is ejected from the cyan nozzle group. Namely, at least one head controller HC of the four head controllers HC discussed above causes the ink to be ejected from the nozzle group of a corresponding color, based on the pixel data transmitted by two transmission lines.

By configuring the head controller HC in this way, the controller board CTR of this embodiment can have same configuration as the controller board CTR in FIG. 14. Thus, the parts can be made common.

In the embodiment discussed above, the pixel data transmitted by two transmission lines are input to the head controller HC for cyan and the head controller HC for magenta. However, there is no limitation to this, and the pixel data transmitted by two or more transmission lines can be input to the head controller HC.

(2) A first input section 846A and a second input section 846B are provided to each head controller HC discussed above. In the head controller HC of the color that performs eight tone printing (or six tone printing) like cyan or magenta, the transfer signal TR including pixel data are input to both of the first input section 846A and the second input section 846B respectively. Thus, printing with a high tone becomes possible.

On the other hand, in the head controller HC of the color that performs four tone printing like black or yellow, the transfer signal TR is input to the first input section 846A, however the second input section 846B is connected to GND, that is, a signal of a constant potential is input to the second input section 846B.

According to such a configuration, the head controller of black or yellow and the head controller of cyan or magenta, can be made common.

(3) In the embodiment discussed above, the head controller HC has the selection signal creation section 844, the signal selection section 83, and the switch 86 (or the first switch 86A and the second switch 86B). Here, the selection signal creation section 844 creates a plurality of selection signals (the selection signals q0 to q7 in the first embodiment, the selection signals q0 to q11 in the second embodiment). The signal selection section 83 selects the selection signal which corresponds to the pixel data from a plurality of selection signals. The switch 86 applies the drive signal COM to the piezo element 421 according to the switch signal SW (or the first switch signal SW_A and the second switch signal SW_B) which is a selection signal selected by the signal selection section 83.

For example, in the first embodiment, the signal selection section 83 of the head controller HC for black or the head controller HC for yellow (the head controller to which GND is input to the second input section 846B) selects the selection signal from selection signals q0 to q3, which is a part of selection signals q0 to q7. Further, for example, in the second embodiment, the signal selection section 83 of the head controller HC for black or the head controller HC for yellow selects the selection signal from the selection signals q0 to q3 and selection signals q6 to q9, which are a part of selection signals q0 to q11.

Thus, the head controller HC for black or the head controller HC for yellow can make the head 41 perform printing in low tones.

(4) In the first embodiment, the head controller for cyan or the head controller for magenta forms a dot in each pixel in eight tones, and the head controller for black or the head controller for yellow forms a dot in each pixel in four tones. In the second embodiment, the head controller for cyan or the head controller for magenta forms a dot in each pixel in six tones, and the head controller for black or the head controller for yellow forms a dot in each pixel in four tones. Thus, in the embodiment discussed above, the head controller HC for cyan or the head controller HC for magenta can form a dot in each pixel in a higher tone than the head controller HC for black or the head controller HC for yellow.

When assuming that it is possible to print black or yellow in a high tone, the pixel data needs to be input to the second input section 846B of the head controller HC for black or the head controller HC for yellow. However, in such a way, it will be necessary to prepare numerous transmission lines in the cable CBL. On the other hand, it is not required to express high tones in the monochrome printing and since yellow ink is light, it is hard to contribute to improvement of picture quality even if an expression in high tones is performed.

Therefore, in the embodiment discussed above, only the color which is needed to be in high tones is printed in high tones.

(5) The head controller HC discussed above has the decoder 87. The decoder 87 converts the 4 bits of pixel data (2 bits of pixel data for dark cyan and 2 bits of pixel data for light cyan) into 3 bits of data. Thus, the circuit that uses 3 bits of data, like the signal selection section 83, for example, can perform movement corresponding to the 4 bit of pixel data (2 bits of pixel data for dark cyan and 2 bits of pixel data for light cyan).

(6) The pixel data SI discussed above include the lower order bit data and the upper order bit data. Further, the head controller HC has the first shift registers 81A to the third shift registers 81C, as the pixel data storage section. The common controller board CTR outputs the lower order bit data first, and then the upper order bit data from the output terminal that outputs the transfer signal TR.

If the head controller HC stores the lower order bit data to the shift register when the lower order bit data are input, and after that when the upper order bit data are input, stores the upper order bit data to the other shift register, and inputs the lower order bit data stored in each of the shift registers and the upper order bit data to the decoder, it will be a configuration that needs a plurality of shift registers.

Therefore, the head controller HC discussed above stores the lower order bit data in the first shift register 81A (or in the second shift register 81B) when the lower order bit data are input, and after that when the upper order bit data are input, inputs the upper order bit data to the decoder and at the same time inputs the lower order bit data which are stored in the first shift register 81A (or in the second shift register 81B) to the decoder. And the decoder performs decoding based on the input data, and the head controller HC stores 1-bit data of the decoded 3-bit data which are output from the decoder in the first shift register 81A (or in the second shift register 81B).

Thus, the number of the shift registers can be reduced.

(7) In the embodiment discussed above, the controller board CTR outputs the pixel data for dark cyan from the output terminal, and at the same time outputs the pixel data for light cyan from another output terminal. On the other hand, in the case of the four-color printer, neither the dark cyan ink nor the light cyan ink is prepared in the head 41, and only the cyan ink is prepared.

Generally, it is preferable that the cyan ink that is prepared with dark and light ink in the six-color printer is printed in the high tone number even in the four-color printer. Therefore, in the printer discussed above, the cyan ink is ejected, based on the pixel data for dark cyan and the pixel data for light cyan.

Therefore, the information amount of the pixel data corresponding to the color that is preferred to be printed in a high tone number can be increased, and therefore printing in that color in a high tone number becomes possible.

Further, the light cyan ink (light ink) is lighter in density than the dark cyan ink (dark ink). Cyan has the character of absorbing red light which is a complementary color, and the light cyan dot (light dot) formed by the light cyan ink absorbs less amount of red light than the dot formed by the dark cyan ink (dark dot). Also, the light magenta ink is lighter in density than the dark magenta ink. Magenta has the character of absorbing green light which is a complementary color, and the dot formed by the light magenta ink (light dot) absorbs less amount of green light than the dot formed by the dark magenta ink (dark dot).

(8) By including all the component members of the above embodiments, it becomes possible to achieve all the effects. However, it does not always have to include all the component members.

(9) In the above described explanation, not only the embodiment of printer, but also the embodiment concerning the method of manufacturing the six-color printer and the four-color printer are included. And according to the embodiment discussed above, the configuration of the controller board CTR of the six-color printer (see FIG. 14) and the four-color printer (see FIG. 16) can be made common. Thus, it becomes possible to cut down on costs of the printer.

What is claimed is:

1. A printing apparatus comprising:
  an output section that has a predetermined number of output terminals, and that outputs pixel data from each of the output terminals respectively;
  a cable that has the predetermined number of transmission lines for transmitting the pixel data that are outputted from the predetermined number of the output terminals respectively;
  a head that can eject a plurality of colors of inks, and that has nozzle groups for the respective colors of the inks; and
  a plurality of head controllers that cause the ink to be ejected from the nozzle groups based on the pixel data, a plurality of the head controllers each being provided corresponding to each of the colors of the inks, wherein
  the number of the output terminals is larger than the number of the colors of the inks, and
  at least one of the head controllers causes the ink to be ejected from the nozzle group of a corresponding color, based on the pixel data transmitted via two or more of the transmission lines, wherein each head controller is provided with a first input section and a second input section respectively, wherein the first input section and the second input section of the head controller that corresponds to a certain color are inputted with the pixel data transmitted by the transmission line respectively, wherein, of the head controller that corresponds to another color, the first input section is inputted with the pixel data transmitted by the transmission line, and the second input section is inputted with a signal of a constant potential, and wherein the head controller has a selection signal creation section that creates a plurality of selection signals, a signal selection section that selects the selection signal corresponding to the pixel data, from a plurality of the selection signals, and a switch that applies a drive signal to a drive element according to the selection signal selected by the signal selection section, wherein the signal selection section of the head controller, which is inputted with the signal of the constant potential to the second input section, selects the selection signal from a part of the selection signals of a plurality of the selection signals.

2. A printing apparatus according to claim 1, wherein the head controller corresponding to a certain color forms a dot in each pixel with a first tone number, and wherein the head controller corresponding to another color forms a dot in each pixel with a second tone number that is lower than the first tone number.

3. A printing apparatus according to claim 1, wherein the head controller has a decoder that decodes the pixel data.

4. A printing apparatus according to claim 3, wherein the pixel data includes a first data and a second data, wherein the head controller includes a pixel data storage section, wherein the output section outputs, from the output terminal, the second data, after the first data has been outputted, wherein the head controller
  stores the first data in the pixel data storage section when the first data are inputted,
  inputs the second data to the decoder when the second data are inputted, and inputs the first data that are stored in the pixel data storage section to the decoder, and
  stores in the pixel data storage section at least a part of the data after decoding that are outputted from the decoder.

5. A printing apparatus according to claim 1, wherein the output section outputs pixel data for a dark color from the output terminal, and outputs pixel data for a light color from another output terminal, and wherein based on the pixel data for the dark color and the pixel data for the light color, ejects inks of colors relating to the pixel data for the dark color and the pixel data for the light color.

6. A printing method of a printing apparatus, wherein the printing apparatus includes an output section that has a predetermined number of output terminals, and that outputs pixel data from each of the output terminals respectively, a cable that has the predetermined number of transmission lines for transmitting the pixel data that are outputted from the predetermined number of the output terminals respectively, a head that can eject a plurality of colors of inks, and that has nozzle groups for the respective colors of the inks, and a plurality of head controllers that cause the ink to be ejected from the nozzle groups based on the pixel data, a plurality of the head controllers each being provided corresponding to each of the colors of the inks, wherein the printing method includes, in the case of manufacturing a printing apparatus with the number of the output terminals that is the same as the number of the colors of the inks, each of the head controllers causes the ink to be ejected from the nozzle group of a corresponding color, based on the pixel data transmitted by one transmission line, and in the case of manufacturing a printing apparatus with the number of the output terminals that is larger than the number of colors of the inks, at least one of the head controllers causes the ink to be ejected from the nozzle group of a corresponding color, based on the pixel data transmitted via two or more of the transmission lines, wherein each head controller is provided with a first input section and a second input section respectively, wherein the first input section and the second input section of the head controller that corresponds to a certain color are inputted with the pixel data transmitted by the transmission line respectively, wherein, of the head controller that corresponds to another color, the first input section is inputted with the pixel data transmitted by the transmission line, and the second input section is inputted with a signal of a constant potential, and wherein the head controller has a selection signal creation section that creates a plurality of selection signals, a signal selection section that selects the selection signal corresponding to the pixel data, from a plurality of the selection signals, and a switch that applies a drive signal to a drive element according to the selection signal selected by the signal selection section, wherein the signal selection section of the head controller, which is inputted with the signal of the constant potential to the second input section, selects the selection signal from a part of the selection signals of a plurality of the selection signals.

7. A manufacturing method of a printing apparatus, wherein the printing apparatus includes an output section that has a predetermined number of output terminals, and that outputs pixel data from each of the output terminals respectively, a cable that has the predetermined number of transmission lines for transmitting the pixel data that are outputted from the predetermined number of the output terminals respectively, a head that can eject a plurality of colors of inks, and that has nozzle groups for the respective colors of the inks, and a plurality of head controllers that cause the ink to be ejected from the nozzle groups based on the pixel data, a plurality of the head controllers each being provided corresponding to each of the colors of the inks, wherein the manufacturing method of the printing apparatus includes in the case of manufacturing the printing apparatus with the number of the output terminals that is the same as the number of the colors of the inks, each of the head controllers ejects the ink from the nozzle group of the corresponding color, based on the pixel data transmitted by one transmission line, and in the case of manufacturing the printing apparatus with the number of the output terminals that is larger than the number of the colors of the inks, at least one of the head controllers causes the ink to be ejected from the nozzle group of a corresponding color, based on the pixel data transmitted via two or more of the transmission lines, wherein each head controller is provided with a first input section and a second input section respectively, wherein the first input section and the second input section of the head controller that corresponds to a certain color are inputted with the pixel data transmitted by the transmission line respectively, wherein, of the head controller that corresponds to another color, the first input section is inputted with the pixel data transmitted by the transmission line, and the second input section is inputted with a signal of a constant potential, and wherein the head controller has a selection signal creation section that creates a plurality of selection signals, a signal selection section that selects the selection signal corresponding to the pixel data, from a plurality of the selection signals, and a switch that applies a drive signal to a drive element according to the selection signal selected by the signal selection section, wherein the signal selection section of the head controller, which is inputted with the signal of the constant potential to the second input section, selects the selection signal from a part of the selection signals of a plurality of the selection signals.

* * * * *